(12) United States Patent
Thomas

(10) Patent No.: US 8,864,165 B2
(45) Date of Patent: Oct. 21, 2014

(54) VEHICLE RECEIVER ASSEMBLY WITH CARGO ANCHOR POINT(S) FOR SUPPORTING AND SECURING CARGO, CARGO CARRIERS, CARGO CARRIER ACCESSORIES, AND TOW-HITCH RECEIVER ACCESSORIES

(71) Applicant: Daniel Alan Thomas, Aztec, NM (US)

(72) Inventor: Daniel Alan Thomas, Aztec, NM (US)

( * ) Notice: Subject to any disclaimer, the term of this patent is extended or adjusted under 35 U.S.C. 154(b) by 0 days.

(21) Appl. No.: 13/971,356

(22) Filed: Aug. 20, 2013

(65) Prior Publication Data

US 2014/0054876 A1   Feb. 27, 2014

Related U.S. Application Data

(60) Provisional application No. 61/693,472, filed on Aug. 27, 2012.

(51) Int. Cl.
*B60D 1/06* (2006.01)
*B60D 1/56* (2006.01)

(52) U.S. Cl.
CPC .................................. *B60D 1/565* (2013.01)
USPC ........... 280/511; 280/504; 280/515; 280/512; 280/480; 280/481; 280/457

(58) Field of Classification Search
USPC .......... 280/511, 504, 515, 512, 480, 481, 457
See application file for complete search history.

(56) References Cited

U.S. PATENT DOCUMENTS 6,155,587 A * 12/2000 Milazzo ........................ 280/457

* cited by examiner

*Primary Examiner* — Joseph M Rocca
*Assistant Examiner* — Marlon Arce

(57) ABSTRACT

A receiver assembly that attaches to a vehicles step-bumper, drop-center bumper, or other structurally sound mounting surface and provides at least an elongated horizontal box receiver to support cargo carriers, cargo carrier accessories, or other tow-hitch receiver accessories and leaves the vehicles frame mounted tow-hitch receiver available for trailer towing or additional tow-hitch receiver accessories, and in addition the receiver assembly provides at least one cargo anchor point to secure cargo, cargo carriers, cargo carrier accessories, or other tow-hitch receiver accessories.

44 Claims, 23 Drawing Sheets

VEHICLE RECEIVER ASSEMBLY WITH CARGO ANCHOR POINT(S) FOR SUPPORTING AND SECURING CARGO, CARGO CARRIERS, CARGO CARRIER ACCESSORIES, AND TOW-HITCH RECEIVER ACCESSORIES

CROSS-REFERENCE TO RELATED APPLICATIONS

This application claims the benefit of U.S. Provisional Application No. 61/693,472 filed on Aug. 27, 2012, which is incorporated herein by reference.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The present invention relates generally to the vehicle towing and cargo transportation field, and more particularly, to a receiver assembly that attaches to a vehicles step-bumper, drop-center bumper, or other structurally sound mounting surface and provides at least an elongated horizontal box receiver and at least one cargo anchor point.

Existing cargo carriers, cargo carrier accessories, and other tow-hitch receiver accessories tend to provide adapters to add cargo carrying capabilities or other useful attachments to a vehicles frame mounted tow-hitch receiver, but typically disregard cargo stability and sometimes decrease stability of the added cargo or towed load by moving the tow-shank and/or tow-ball further away from the vehicle or by integrating the cargo carrier or cargo carrier accessory with the tow-hitch receiver accessory. Examples of such are disclosed in a number of patents, including, for example, U.S. Pat. No. 6,874,804 to Reese et al., and U.S. Pat. No. 7,703,825 to Brown. Some cargo carriers require complete removal of any other tow-hitch receiver accessory which prevents towing trailers or equipment while using the tow-hitch receiver mounted cargo carrier. Examples of such are disclosed in a number of patents, including, for example, U.S. Pat. No. 7,195,262 to Chaudoin et al., and U.S. Pat. No. 5,458,389 to Young. Many vehicles have a step bumper, with an example disclosed in U.S. Pat. No. 4,266,817 to Mason et. al., drop-center bumper, or other structurally sound mounting surface such as a steel flatbed, for example, which provides an opportunity for a novel receiver assembly to be designed that uses the availability of the aforementioned surfaces to mount a receiver assembly with cargo anchor points. While there are some previous tow-hitch receivers designed to be attached to a step-hitch bumper, drop-center bumper, or other types of bumpers and structurally sound mounting surfaces, with examples disclosed in U.S. Pat. No. D372,892 to McCoy et. al., U.S. Pat. No. D463,346 to Pancheri et. al., U.S. Pat. No. 5,702,118 to Hanson et. al., U.S. Pat. No. 4,662,647 to Larry J. Calvert, and U.S. Pat. No. 4,280,713 to Larry C. Bruhn: (a) previous designs are typically designed to be installed beneath a bumper as an alternative to a frame mounted tow-hitch receiver, (b) a bumper mounted tow-hitch receiver that is mounted beneath a bumper and a frame mounted tow-hitch receiver would generally interfere with each other due to their designs and typically cannot be used simultaneously, and (c) the anchor points on previous designs, if present, are typically designed to attach trailer safety chains for a towed trailer and not as cargo anchor points.

A need is therefore identified for a structural arrangement whereby cargo carriers, cargo carrier accessories, and other tow-hitch receiver accessories can be removed from the vehicles frame mounted tow-hitch receiver and moved onto a receiver(s) supported by the vehicles step-bumper, drop-center bumper, or other structurally sound mounting surface, as well as the need to provide an anchor point(s) to secure cargo, cargo carriers, cargo carrier accessories, and other tow-hitch receiver accessories. The present invention addresses several issues related to decreased towing capability and/or decreased cargo stability due to the use of cargo carriers, cargo carrier accessories, and other tow-hitch receiver accessories: (a) an additional receiver or receivers allow cargo carriers, cargo carrier accessories, and other tow-hitch receiver accessories to be removed from the vehicles frame mounted tow-hitch receiver and moved onto a receiver(s) supported by the vehicles step-bumper, drop-center bumper, or other structurally sound mounting surface, which reduces stress on the vehicles frame mounted tow-hitch receiver and reduces the instability otherwise created by the added distance between the vehicle and towed load, (b) anchor points provided by the current invention allow cargo, cargo carriers, cargo carrier accessories, and other tow-hitch receiver accessories to be secured to the vehicle using fasteners and/or tie downs such as turnbuckles, quick links, chains, ropes, cables, or straps, for example, in order to increase stability and reduce movement of cargo, cargo carriers, cargo carrier accessories, or other tow-hitch receiver accessories, (c) cargo carriers, cargo carrier accessories, or other tow-hitch receiver accessories that require removal of any other tow-hitch receiver accessory in order to be used can be moved onto the receiver assembly of the present invention, therefore leaving the vehicles frame mounted tow-hitch receiver available for a tow-shank, cargo carrier, cargo carrier accessory, or other tow-hitch receiver accessory. The present invention may be designed for towing, depending on the strength of material used in construction and method of construction, which would leave the vehicles frame mounted tow-hitch receiver available for other accessories. A number of cargo carriers, cargo carrier accessories, and other tow-hitch receiver accessories may benefit from the availability of at least an added elongated horizontal box receiver and cargo anchor point(s) as provided by the present invention. Examples of such are disclosed in a number of patents, including, for example, U.S. Pat. No. 5,560,666 to Vieira et al. and U.S. Pat. No. 8,141,760 to Kuschmeader et al.

BRIEF SUMMARY OF THE INVENTION

The above objectives are accomplished according to the present invention by a receiver assembly that attaches to a vehicles step-bumper, drop-center bumper, or other structurally sound mounting surface and provides at least an elongated horizontal box receiver and at least one cargo anchor point. When a tow-hitch receiver accessory adapter is used between a vehicles frame mounted tow-hitch receiver and a towed load, such as a trailer, the tow-shank and/or tow-ball are moved rearward away from the vehicle, which tends to reduce stability of the towed load. In addition, the cargo supported by the tow-hitch receiver accessory adapter can place an increased load directly on the frame mounted tow-hitch receiver which can decrease stability of the towed load. Another problem contributing to cargo instability is that the support member of a cargo carrier, cargo carrier accessory, or other tow-hitch receiver accessory that is inserted into the center aperture of a tow-hitch receiver typically has a certain amount of movement due to spaces between the outer sides of the support member and inner surfaces of the center aperture of the tow-hitch receiver, which causes the cargo carrier, cargo carrier accessory, or other receiver hitch accessory to shift during transportation. Also, some cargo carriers, cargo carrier accessories, and other tow-hitch receiver accessories are designed to be placed into a vehicles frame mounted tow-hitch receiver by themselves and prevent simultaneous use of any other accessories. The present invention places the cargo carrier, cargo carrier accessory, or other tow-hitch receiver accessory into a receiver assembly that is mounted to a surface that is separate from the frame mounted tow-hitch receiver, therefore leaving the vehicles frame mounted tow-hitch receiver available for a tow-shank or other tow-hitch receiver accessory. The present invention provides at least one but preferably a plurality of cargo anchor points to secure and increase the stability of cargo, cargo carriers, cargo carrier accessories, and other tow-hitch receiver accessories. The present invention may be designed for towing, depending on the strength of material used in construction and method of construction, which would leave the vehicles frame mounted tow-hitch receiver available for other accessories. Some aspects of the present invention include an elongated vertical box receiver in addition to the elongated horizontal box receiver. The receiver assembly may be constructed by but not limited to: (a) individual components attached together by fasteners, welding, or bonding, for example, (b) components attached by a combination of fasteners, welding, casting, or bonding, for example, or (c) constructed as a single cast, injection molded, or machined component, for example. Materials that may be used in construction of the receiver assembly include but are not limited to metal, composite metals, cast metals, stamped metals, metal alloys, structural steel, and composite plastics, or any combination of the materials, which may vary depending on strength requirements, and are generally referred to in the discussion as metallic or composite materials.

The receiver assembly includes at least: (a) a channel mounting base with two parallel channel legs and having a u-shaped or bracket-shaped cross-section, such as but not limited to C-Shaped American Standard Channel, (b) at least one fastener mounting aperture of any size and geometric shape or shapes in the channel body of the channel mounting base, (c) at least one cargo anchor point, (d) an elongated horizontal box receiver with an elongated center aperture and being attached to the channel mounting base and/or any intermediate components attached between the elongated horizontal box receiver and the channel mounting base, (e) at least one transverse aperture pair in any opposing sides of the elongated horizontal box receiver, and (f) an acircular horizontal aperture generally being defined by the space between the channel mounting base and elongated horizontal box receiver including any intermediate components connecting the elongated horizontal box receiver to the channel mounting base, with the acircular horizontal aperture typically being of a size and shape that a fastener or fastener hardware such as but not limited to a nut, for example, can be placed in the aperture beneath the elongated horizontal box receiver for securing the receiver assembly to a mounting surface, and the acircular horizontal aperture may be closed on one end such as by a reinforcement member. Alternatively, the acircular horizontal aperture may be of a size and shape that a fastener such as but not limited to a u-bolt, strap, or band, can be placed through the acircular horizontal aperture and around the elongated horizontal box receiver to attach, for example, a data plate to the elongated horizontal box receiver. Typically, the acircular horizontal aperture is positioned over a fastener mounting aperture in the channel mounting base. Alternatively, the acircular horizontal aperture may not be positioned over a fastener mounting aperture in the channel mounting base, such as when an elongated vertical box receiver is attached to the channel mounting base.

More specifically describing the invention, the horizontal channel structure of the channel mounting base has a channel body, two parallel channel legs being a channel front leg and channel rear leg, and at least one fastener mounting aperture of any geometric shape(s) and size in the channel body. The size and shape of the channel mounting base of the receiver assembly is typically designed to be recessed within a vehicles step-bumper or drop-center bumper which typically has between one and three existing tow-ball mounting apertures. Alternatively, the size and shape of the channel mounting base of the receiver assembly may be designed to fit any other structurally sound mounting surface(s) such as but not limited to a flatbed, welding bed, or tool bed, for example. Some bumpers or other structurally sound mounting surfaces may have patterns of existing mounting apertures or may need to first have apertures cut prior to attaching the receiver assembly. To design the receiver assembly to be attached to a plurality of mounting surface aperture patterns additional fastener mounting apertures may be present at any position along the channel body. Typically, the receiver assembly is attached to a mounting surface by any suitable fasteners and hardware. Alternatively, the receiver assembly may be attached to a mounting surface by any suitable method, such as but not limited to welding, for example. The shape of the horizontal channel structure of the channel mounting base is acircular and may be any suitable geometric shape such as but not limited to rectangular, trapezoidal, or curved, for example, to design the receiver assembly to fit a plurality of mounting surface designs. Alternatively, the shape and size of the horizontal channel structure of the channel mounting base may be designed for aesthetics. The parallel channel legs of the horizontal channel structure may be of different lengths, such as but not limited to when the horizontal channel structure is a shape other than rectangular or square. The elongated horizontal box receiver is attached to the horizontal channel structure of the channel mounting base and/or any intermediate components between the elongated horizontal box receiver and horizontal channel structure, with the elongated horizontal box receiver comprising a tubular shape, elongated center aperture, and at least one transverse aperture pair in opposing sides, but preferably there are multiple transverse aperture pairs spaced along the elongated horizontal box receiver. A fastener and securing hardware such as but not limited to a receiver pin and clip may be aligned with and placed through a transverse aperture pair of the elongated horizontal box receiver and through a respective aperture or transverse aperture pair in the support member of a cargo carrier, cargo carrier accessory, or other tow-hitch receiver accessory, in order to secure the two together. The elongated horizontal box receiver is typically attached to the receiver assembly by welding. Alternatively, the elongated horizontal box receiver may be attached by any suitable means, such as but not limited to casting, bonding, or fasteners, for example.

A first embodiment of the invention described above provides for a receiver assembly with the at least one cargo anchor point being at least one horizontal transverse aperture pair(s) in the parallel channel legs of the channel mounting base with one aperture of the horizontal transverse aperture pair being on the channel front leg and the second aperture of the horizontal transverse aperture pair being on the channel rear leg. A fastener and securing hardware such as but not limited to a receiver pin and clip can be placed through a horizontal transverse aperture pair in the parallel channel legs of the channel mounting base to attach another anchor point component, provide an anchor point to attach another fastener such as but not limited to a quick link, or to secure a tie down such as but not limited to a ratchet strap, for example, in order to secure cargo, cargo carriers, cargo carrier accessories, or tow-hitch accessories. Alternatively, a fastener such as but not limited to a quick link can be placed through a single aperture of a transverse aperture pair to use the aperture as a cargo anchor point.

Another aspect of the receiver assembly provides at least one of the fastener mounting apertures in the channel body is a combination of at least two geometric shapes such as but not limited to an ellipse with a set(s) of arcs in opposing faces of the ellipse so that different size fasteners can be placed at multiple positions along the channel body.

Another aspect of the receiver assembly provides at least one tapered aperture in at least one of the parallel channel legs of the channel mounting base and being of a size and shape into which a fastener such as but not limited to a quick link can be placed. The tapered aperture(s) comprises shaping such as but not limited to tapering or rounding the edge(s) along part or the entire circumference of at least one opening of the tapered aperture, which may allow a fastener to rotate more freely within the tapered aperture when used as an anchor point.

Another aspect of the receiver assembly provides at least one cargo anchor point such as but not limited to a d-ring anchor attached at least one of the parallel channel legs of the receiver assembly into which a fastener such as but not limited to a quick link or a tie down such as but not limited to a chain can be placed. Typically the cargo anchor point is attached to the receiver assembly by using a fastener such as but not limited to a bolt(s) placed through a fastener aperture(s). Alternatively, the cargo anchor point may be attached by but not limited to welding, for example.

Another aspect of the receiver assembly provides at least one cargo anchor point such as but not limited to a d-ring anchor attached to the elongated horizontal box receiver of the receiver assembly into which a fastener such as but not limited to a quick link or a tie down such as but not limited to a chain can be placed. Typically the cargo anchor point is attached to the receiver assembly by welding. Alternatively, the cargo anchor point may be attached by any other suitable method, such as but not limited to casting or fasteners, for example.

Another aspect of the receiver assembly provides at least one vertical transverse aperture pair in the elongated horizontal box receiver with the vertical transverse aperture pair(s) being of a size and shape to allow an entire fastener such as but not limited to a bolt to be passed vertically through the elongated horizontal box receiver. The vertical transverse aperture pair is typically centered over a fastener mounting aperture in the channel body of the channel mounting base, so a fastener passed through the vertical transverse aperture pair of the elongated horizontal box receiver can be placed into the fastener mounting aperture in the channel body of the channel mounting base. Typically the head of a fastener such as but not limited to a bolt will be accessible with a tightening tool placed into the aforementioned acircular horizontal aperture. The head of a fastener passed vertically through the elongated horizontal box receiver and placed into a fastener mounting aperture in the channel body will typically be below the lower inside surface of the elongated center aperture of the elongated horizontal box receiver so the support member of a cargo carrier, cargo carrier accessory, or tow-hitch receiver accessory can be inserted into the elongated center aperture of the elongated horizontal box receiver without interference from the fastener.

Another aspect of the receiver assembly provides at least one notch beginning in the top surface of at least one of the parallel channel legs of the channel mounting base and extending down towards the channel body of the channel mounting base and being of a size and shape that the elongated horizontal box receiver is at least partially recessed within the notch(s). The design of the elongated horizontal box receiver being recessed into the notch(s) and being attached to the horizontal channel structure provides increased strength to resist vertical and/or lateral forces, depending on the method of attachment.

Another aspect of the receiver assembly provides an elongated vertical box receiver with one end attached perpendicular to the horizontal channel structure of the channel mounting base and one side of the elongated vertical box receiver attached perpendicular to one end of the elongated horizontal box receiver. The elongated vertical box receiver comprising: a tubular shape, elongated center aperture, and least one transverse aperture pair in opposing sides.

Another aspect of the receiver assembly provides at least one cargo anchor point such as but not limited to a d-ring anchor attached to the elongated vertical box receiver of the receiver assembly into which a fastener such as but not limited to a quick link or a tie down such as but not limited to a chain can be placed. Typically the cargo anchor point is attached to the receiver assembly by welding. Alternatively, the cargo anchor point may be attached by any other suitable method, such as but not limited to casting or fasteners.

Another aspect of the receiver assembly provides at least one vertical anchor channel attached to the receiver assembly. The vertical anchor channel comprising a channel structure with a u-shaped or bracket-shaped cross-section such as but not limited to C-Shaped American Standard Channel, with the channel structure having a channel body and two parallel channel legs, with the parallel channel legs being a channel top leg and a channel bottom leg. The channel body of the vertical anchor channel is attached perpendicular to a parallel channel leg of the channel mounting base. There is a plurality of transverse aperture pairs in the parallel channel legs of the vertical anchor channel with one aperture of the transverse aperture pair being in the channel top leg and the second aperture of the transverse aperture pair being in the channel bottom leg. A fastener such as but not limited to a receiver pin can be placed through both apertures of a transverse aperture pair to provide an anchor point, attach other fasteners such as but not limited to a quick link, or attach other components.

Another aspect(s) of the receiver assembly provides at least one reinforcement member(s), designed to increase the strength of the receiver assembly, attached to various component(s) of the receiver assembly.

Another aspect(s) of the receiver assembly provides at least one brace member(s), designed to increase the strength of the receiver assembly, attached to various component(s) of the receiver assembly.

Another aspect(s) of the receiver assembly provides at least one attachment member(s), designed to provide fastener attachment point(s) which may also be designed to provide additional strength to the receiver assembly, attached to various component(s) of the receiver assembly.

Another aspect of the receiver assembly provides a notch beginning in the top horizontal surface of the channel top leg of the vertical anchor channel and extending down into the channel body of the vertical anchor channel towards the channel bottom leg of the vertical anchor channel with the notch being of a size and shape that the elongated horizontal box receiver of the receiver assembly is at least partially recessed within the notch and the vertical anchor channel can extend above the parallel channel legs of the channel mounting base of the receiver assembly.

Another aspect of the receiver assembly provides at least one pivoting bolt sleeve anchor being of a size and shape that at least one can be placed between a transverse aperture pair in the parallel channel legs of a channel structure and attached by a fastener such as but not limited to a retainer pin inserted through both apertures of the transverse aperture pair and through the pivoting bolt sleeve anchor(s), with the pivoting bolt sleeve anchor(s) comprising: (a) a cylindrical bolt sleeve with a cylindrical aperture, and (b) an attachment member of any suitable geometric size and shape with at least one fastener aperture and being affixed to the outer surface of the cylindrical bolt sleeve.

Another aspect of the receiver assembly provides components of the channel mounting base being shaped such as but not limited to curving. The components are typically shaped to reduce pointed corners. Alternatively, the components may be shaped for aesthetics.

Another aspect of the receiver assembly provides for components of the vertical anchor channel being shaped such as but not limited to curving. The components are typically shaped to reduce pointed corners. Alternatively, the components may be shaped for aesthetics.

Another aspect(s) of the receiver assembly provides for a data plate attached to the elongated horizontal box receiver or elongated vertical box receiver.

The preceding descriptions are not intended to be a comprehensive representation of the invention and it is to be understood that design changes, modifications, and variations may be made without departing from the spirit or scope of the invention.

BRIEF DESCRIPTION OF THE DRAWINGS

The accompanying drawings and descriptions incorporated in and forming a part of the specification illustrate the preferred embodiment of the present invention and together with all descriptions of the Invention serve to explain certain principles of the invention. The drawings and any descriptions are not intended to be comprehensive or to limit the invention to the precise form disclosed and it is to be understood that design changes, modifications, and variations may be made without departing from the spirit or scope of the invention. In the drawings.

DETAILED DESCRIPTION OF THE INVENTION

Figure 1A:
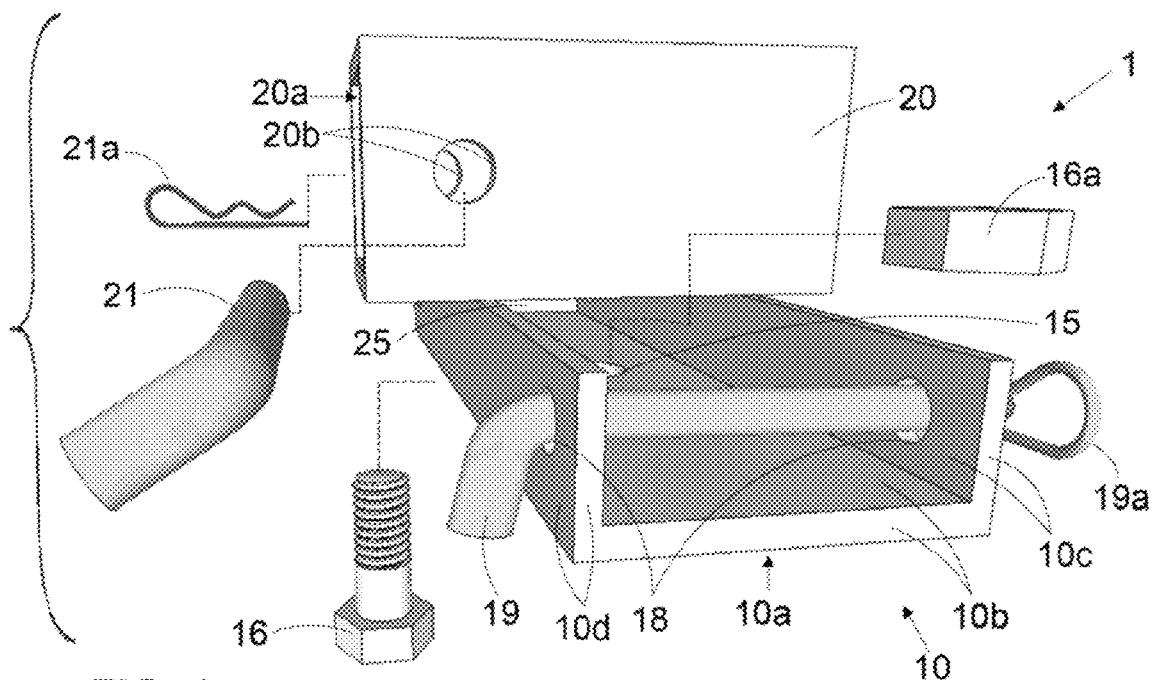
FIG. 1a is a perspective view showing a first embodiment of the present invention along with receiver pins and clips for use in the transverse aperture pairs in the parallel channel legs of the channel mounting base and the elongated horizontal box receiver, plus a bolt and nut to secure the receiver assembly to a mounting surface.
Figure 1B:
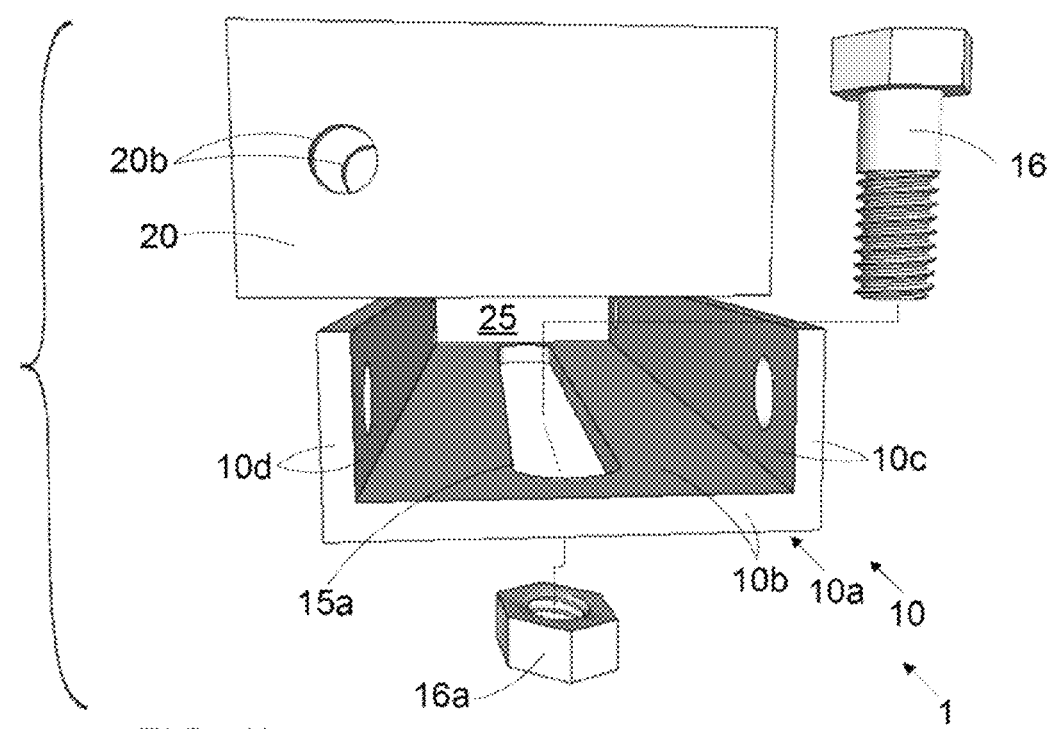
FIG. 1b is a perspective view showing the present invention with the fastener aperture in the channel body of the horizontal channel structure being an acircular elliptical shape, plus a bolt and nut to secure the receiver assembly to a mounting surface.
Figure 1C:
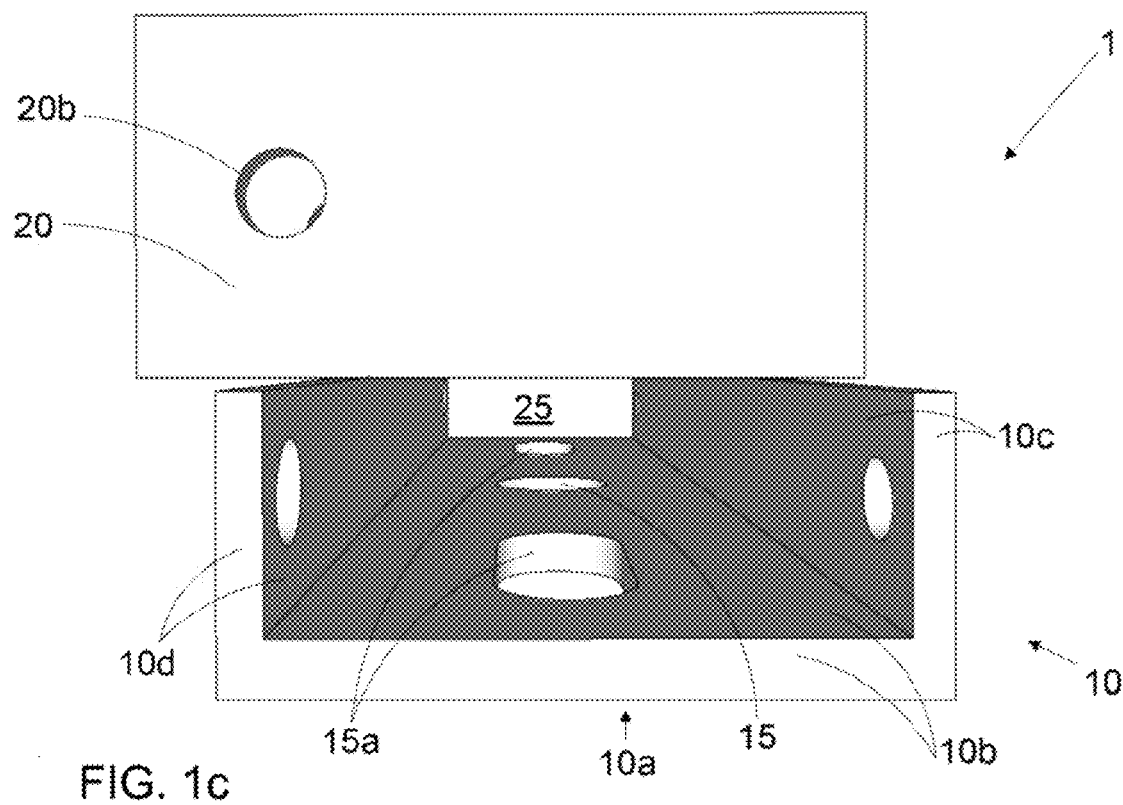
FIG. 1c is a side perspective view showing the present invention with a plurality of fastener apertures in the channel body of the horizontal channel structure, and with the fastener apertures being circular and acircular elliptical shapes.
Figure 1D:
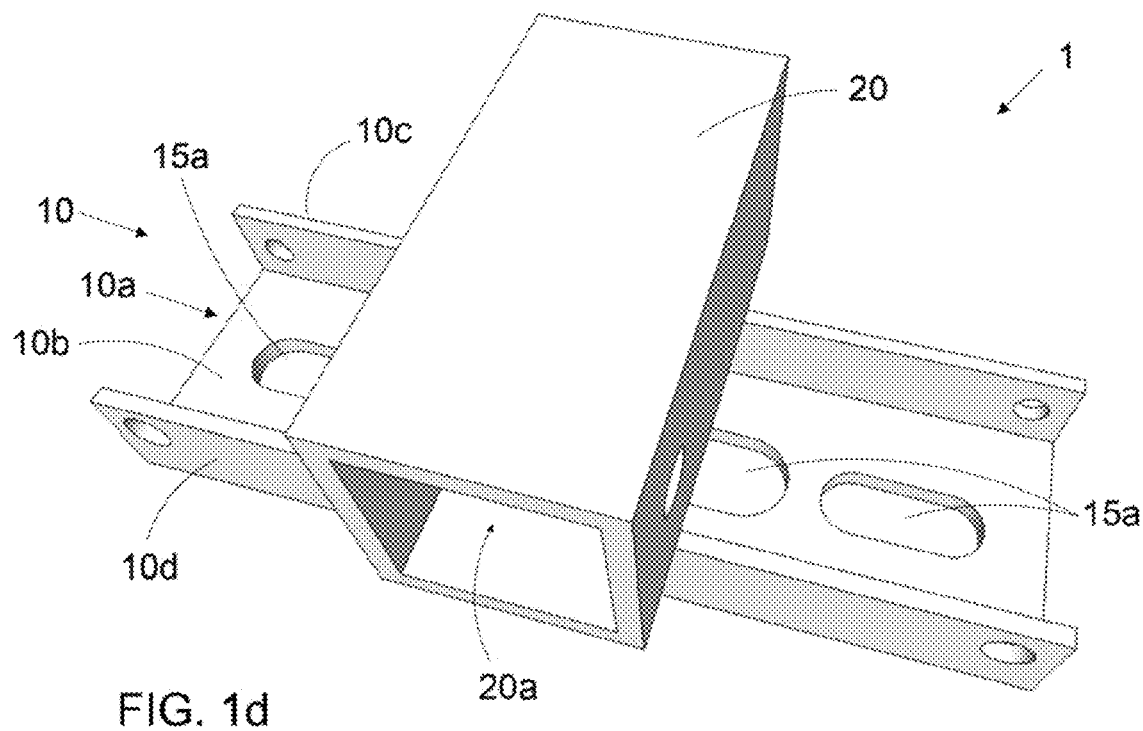
FIG. 1d is a perspective view showing the present invention with a plurality of fastener apertures in the channel body of the horizontal channel structure, with the fastener apertures being elliptical shapes and the fastener apertures are of two different sizes for different size fasteners, and also showing an elliptical center aperture designed to extend past the vertical plane of a side of the elongated horizontal box receiver which allows a fastener such as a bolt to be placed beneath the elongated horizontal box receiver to be used to secure the receiver assembly to a mounting surface.
Figure 1E:
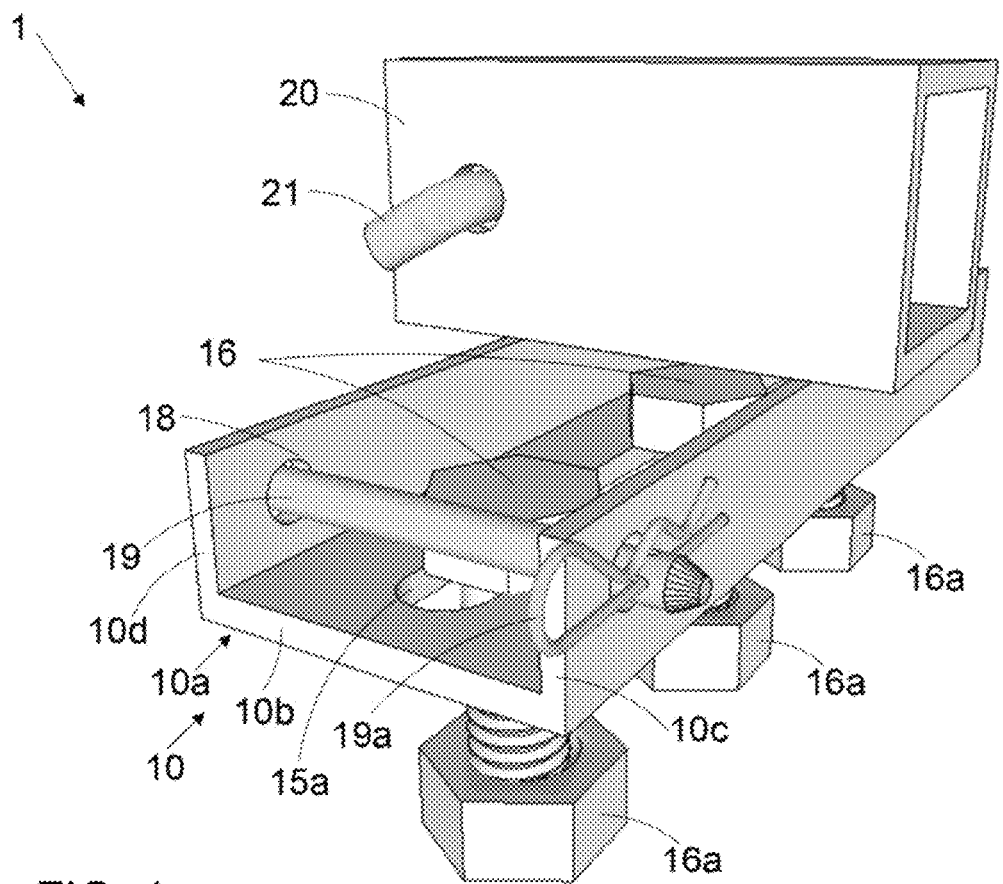
FIG. 1e is a perspective view showing the present invention with three fasteners and nuts placed in an elliptical aperture in the channel body of the horizontal channel structure, and also showing receiver pins and clips in the transverse aperture pairs of the channel mounting base and elongated horizontal box receiver.
Figure 1F:
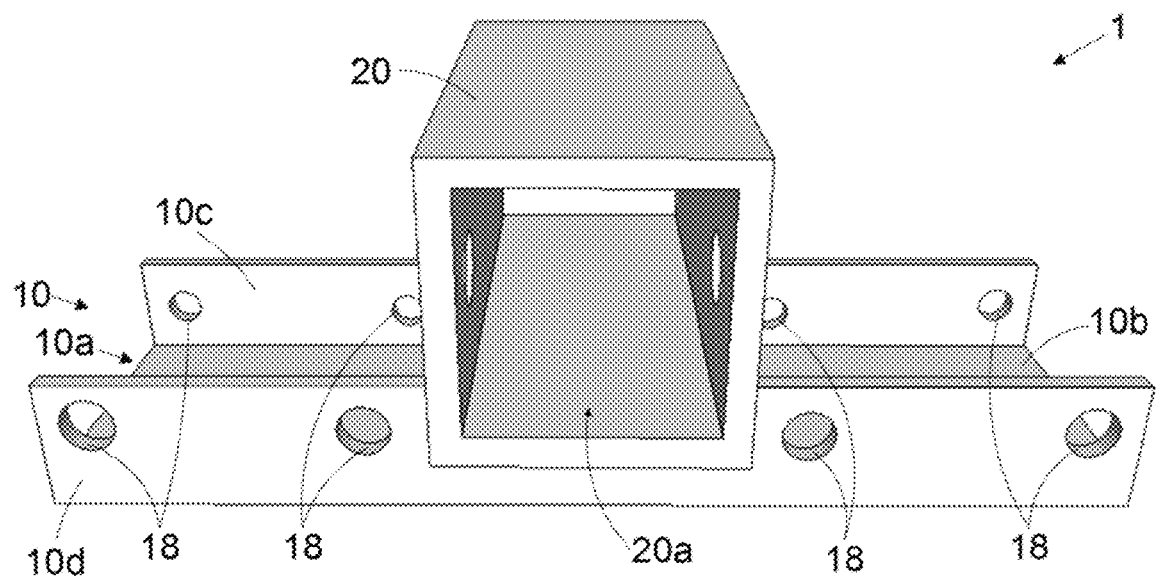
FIG. 1f is a perspective view showing the present invention with multiple transverse aperture pairs along the parallel channel legs of the horizontal channel structure.
Figure 1G:
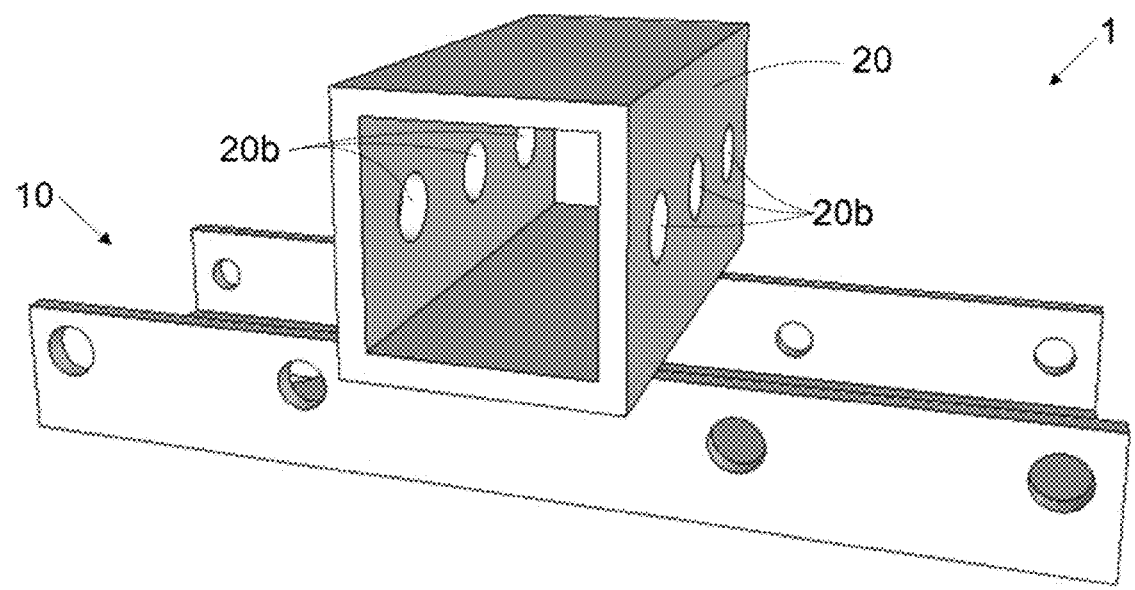
FIG. 1g is a perspective view showing the present invention with multiple transverse aperture pairs in opposing sides of the elongated horizontal box receiver.
Figure 1H:
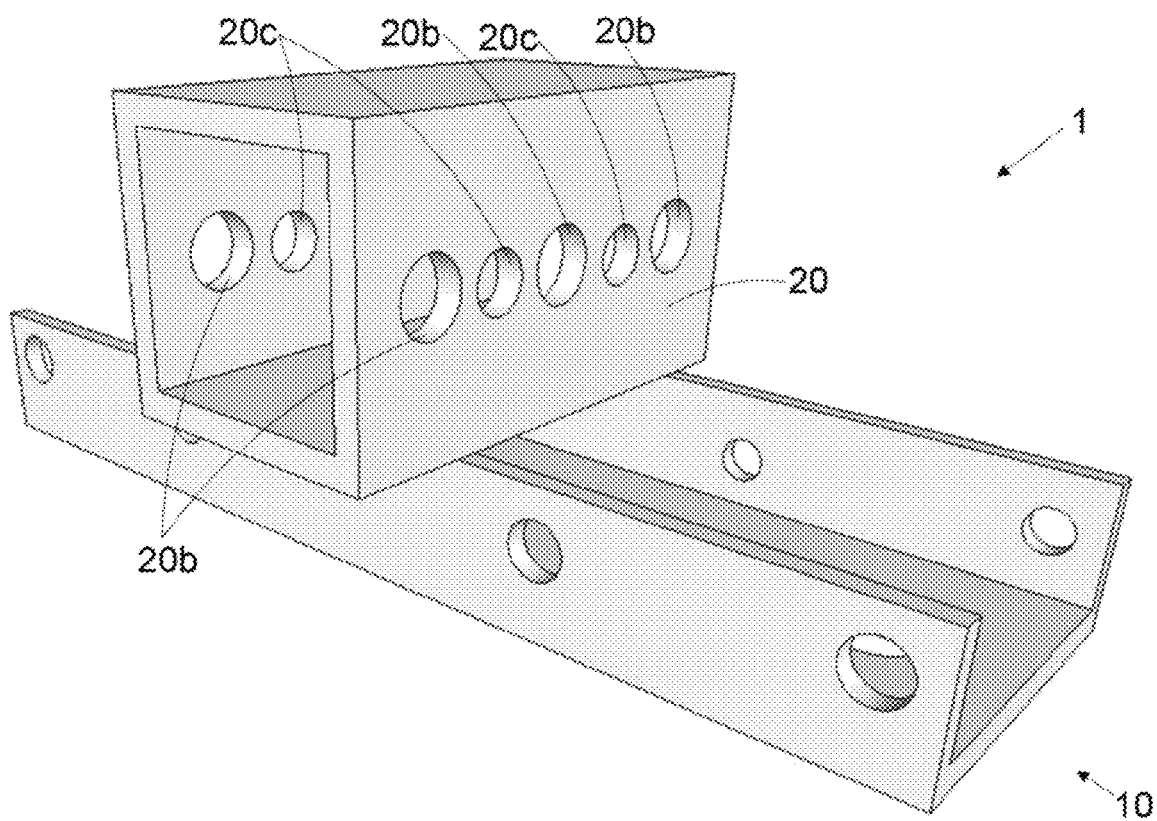
FIG. 1h is a perspective view showing the present invention with multiple transverse aperture pairs in opposing sides of the elongated horizontal box receiver, and with the transverse aperture pairs being a combination of different diameters to fit a plurality of diameters of fasteners.
Figure 1I:
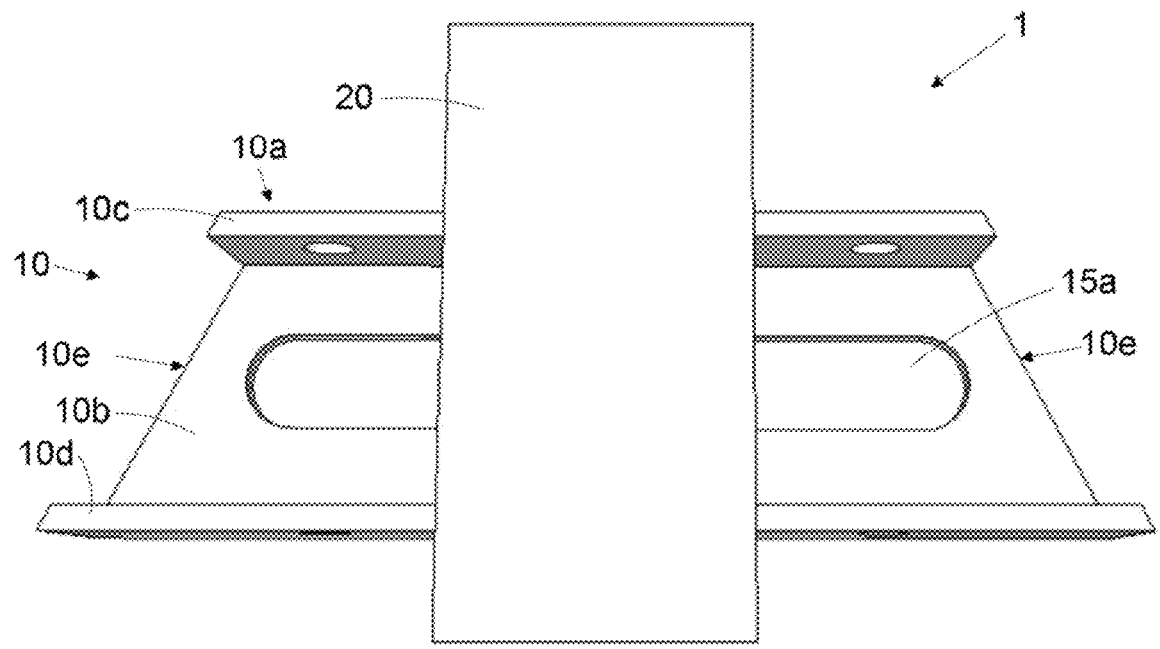
FIG. 1i is a top perspective view showing the present invention with the horizontal channel structure being shaped by angling to fit a generally similar shaped mounting surface.
Figure 1J:
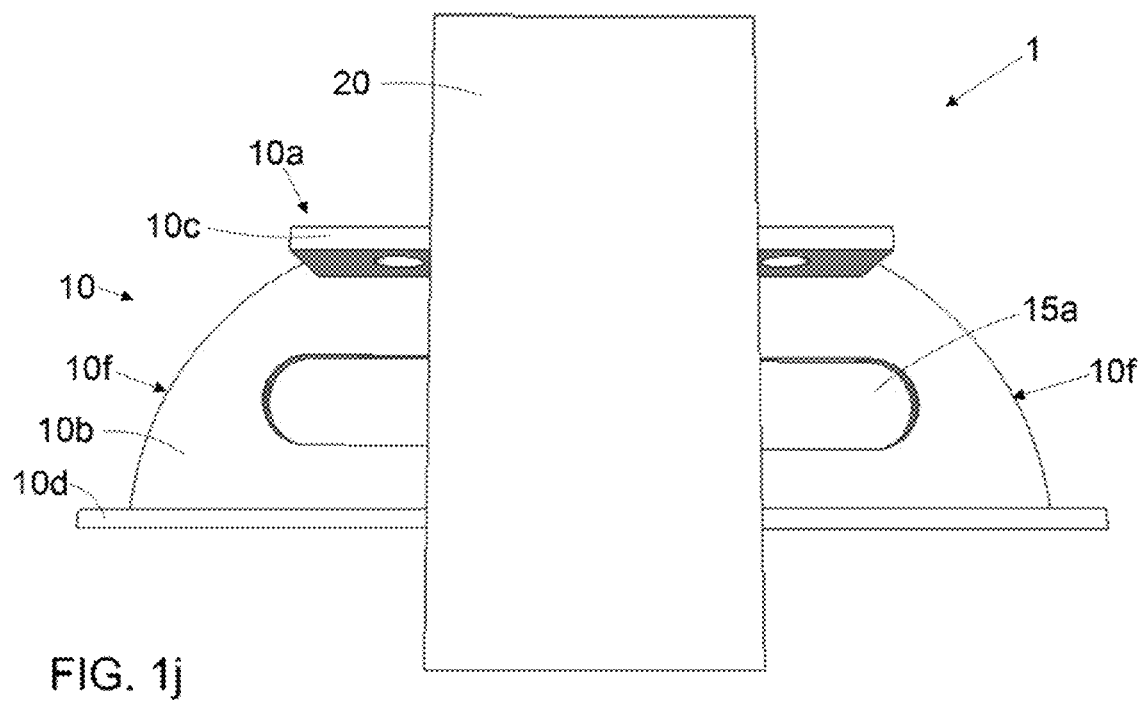
FIG. 1j is a top perspective view showing the present invention with the horizontal channel structure being shaped by curving to fit a generally similar shaped mounting surface.

The following terms are defined as referred to in this document. Any terms defined here are not intended to be limited solely to the specific definitions provided and are also intended to include but not be limited to any commonly accepted definition(s).

The term "acircular", for purposes of this document, is defined as "any geometric shape or combination of geometric shapes other than circular" or "a surface defined by a non-circular cross section".

The term "affixed", for purposes of this document, is considered synonymous with "attached".

The term "any", for purposes of this document, includes but is not limited to "every, all, and at least one".

The term "aperture", for purposes of this document, is defined as "an open space or opening of any geometric shape or combination of geometric shapes as between parts or sections of solid matter" and is also synonymous with "hole". An aperture also refers to any opening or receptacle that can receive or accommodate other material and may be closed on one end (or side if horizontal) such as being covered by a reinforcement member.

The term "attached", for purposes of this document, includes but is not limited to "being connected or held in place by at least one fastener, welding, or bonding, for example, or integrating separate design components together, such as but not limited to casting a plurality of separate design components as one piece". Components attached together may be separable as in the case of a bolt and hardware used to attach separate components or may be permanent as in the case of a plurality of components being welded together. The term "attached" is also considered synonymous with "affixed". Attached can also reference a tie down such as but not limited to a chain temporarily secured to an anchor point.

The term "bar", for purposes of this document, includes but is not limited to a typically rectangular shaped piece of material, but may include any other geometric shapes such as but not limited to a trapezoid and may include any combination of geometric shapes. A bar may or may not have apertures.

The term "bracket shaped", for purposes of this document, includes but is not limited to a channel shape that typically has right angles at the intersection between a channel body and channel legs.

The term "can" for the purposes of this document, includes but is not limited to "capable of" and is synonymous with "may".

The term "channel", for purposes of this document, includes but is not limited to "a channel structure with a u-shaped or bracket-shaped cross-section such as but not limited to C-Shaped American Standard Channel structural steel". The channel structure may be constructed from but not limited to a single integrated component such as rolled steel or casting, or constructed from individual components attached together such as by welding.

The term "design", for purposes of this document, is synonymous with "adapt" or "modify".

The term "fastener", for purposes of this document, includes but is not limited to a shackle with hardware, carabiner, hook, snap hook, quick link, connecting link, eye-bolt with hardware, turnbuckle, retainer pin with hardware, bolt with hardware, strap, or band, for example.

The terms "front, back, rear, left, right, top, bottom, above, below, and lower" as well as general variations of similar descriptive terms, such as narrow, for purposes of this document, are used for descriptive purposes only to define the relationship between components or aspects of the invention and do not limit the definitions, components, or installation of the invention to any specific geometric shape, design, position, or orientation.

The term "generally", for the purposes of this document, includes but is not limited to "usually or normally but not always" and is synonymous with "typically".

The terms "horizontal" and "vertical", for purposes of this document, are used for describing the relationship between individual components of the invention as viewed attached to a horizontal surface and do not limit the design or attachment of the receiver assembly to any specific position or orientation on a mounting surface.

The term "integrated", for the purposes of this document, is defined as "to join with something else, to unite, or to make part of a larger unit".

The term "material", for the purposes of this document, is defined as "relating to or consisting of solid physical matter", such as but not limited to metal, composite metals, cast metals, stamped metals, metal alloys, structural steel, and composite plastics, or a combination of the materials.

The term "member", for purposes of this document, refers to a component of an assembly or structure and may include but is not limited to a bar, plate, or other structure of various sizes, shapes, and forms. A member may have various regular or irregular shapes, for example, portions of a member may be straight, angled, curved, or a combination of geometric shapes. A member may or may not have one or more apertures. A member may be attached to a single component, multiple components, or any combination of adjacent components.

The term "secured", for purposes of this document, is defined to include but not be limited to an object temporarily fastened to another object. The object may be secured by fasteners or by an intermediate tie-down, such as but not limited to a ratchet strap attached to an anchor point on one end and attached to a cargo carrier on the other end, for example.

The term "specific", for purposes of this document, is defined as "explicitly set forth, definite, or a distinguishing quality or attribute".

The term "such as" includes the meaning "such as but not limited to".

The term "tie-down", for purposes of this document, includes but is not limited to a chain, cable, strap, or ratchet strap, for example.

The term "typically", for purposes of this document, includes but is not limited to "usually or normally but not always" and is synonymous with "generally".

The term "U shaped", for purposes of this document, includes but is not limited to a channel shape that typically has curved or angled corners at the intersection between a channel body and channel legs.

Referring now to the drawings, the invention will now be described in more detail. The invention described and illustrated below is a receiver assembly that attaches to a vehicles step-bumper, drop-center bumper, or other structurally sound mounting surface and provides at least an elongated horizontal box receiver to support cargo carriers, cargo carrier accessories, or other tow-hitch receiver accessories and leaves the vehicles frame mounted tow-hitch receiver available for trailer towing or additional tow-hitch receiver accessories, and in addition the receiver assembly provides at least one anchor point to secure cargo, cargo carriers, cargo carrier accessories, or other tow-hitch receiver accessories. Due to the design that moves cargo carriers, cargo carrier accessories, or other tow-hitch receiver accessories from the vehicles frame mounted tow-hitch receiver and onto a different structurally sound mounting surface, while leaving the frame mounted tow-hitch receiver available for towing or other receiver accessories, the present invention is novel and distinguishable from previous designs of cargo carrier attachment assemblies and tow-hitch receiver adapters that are designed to be installed directly into the frame mounted tow-hitch receiver of a vehicle. The present invention is also novel and distinguishable from previous designs of tow-hitch receivers designed to be attached to a step-hitch bumper or drop-center bumper, due to: (a) previous designs are typically designed to be installed beneath a bumper as an alternative to a frame mounted tow-hitch receiver, (b) a bumper mounted tow-hitch receiver that is mounted beneath a bumper and a frame mounted tow-hitch receiver would generally interfere with each other due to their designs and typically cannot be used simultaneously, and (c) the anchor points on previous designs are typically designed to attach trailer safety chains for a towed trailer and not as cargo anchor points. The previous designs of tow-hitch receiver adapters or bumper mounted tow-hitch adapters typically disregard stability of the cargo and some previous designs may contribute to a decrease in cargo stability. The present invention addresses both the need for increased cargo carrying capabilities for a vehicle and increasing the stability of cargo. The present invention may be designed for towing, depending on the strength of a suitable material used in construction and a suitable method of construction, which would leave the vehicles frame mounted tow-hitch receiver available for other receiver hitch accessories. The receiver assembly and/or any individual components may be constructed by but not limited to: (a) individual components attached together by fasteners, welding, or bonding, for example, (b) components attached or integrated together by any combination of fasteners, welding, casting, injection molding, machining components, or bonding, for example, or (c) constructed as a single cast, injection molded, or machined component, for example. Materials that may be used in construction of the receiver assembly include but are not limited to metal, composite metals, cast metals, stamped metals, metal alloys, structural steel, and composite plastics, or any combination of the materials, which may vary depending on strength requirements, and are generally referred to in the discussion as metallic or composite materials. Typically, the material, components or individual parts, apertures, and shaped material or edges of the receiver assembly are cut by a machine such as but not limited to a water jet cutting machine, for example. Alternatively, the material, components or individual parts, apertures, and shaped material or edges of the receiver assembly can be made or shaped by any one or a combination of casting, injection molding, machining, grinding, drilling, plasma cutting, or any other suitable method, tool, or machinery. It is to be understood that the preceding description of methods of construction, types of suitable material used, and methods of cutting or shaping any parts, components, or apertures, are not comprehensive, and are to be applicable individually or wholly to each part, group of parts, or component(s) of the invention as is suitable, even if specific reference to such is not specified while discussing each embodiment, aspect, component, or part of the invention. While a preferred embodiment of the invention has been described using specific terms, such descriptions are for illustration purposes and it is not intended to be exhaustive or to limit the invention to the precise form disclosed. It is to be understood that other embodiments and aspects may be utilized and design changes, modifications, and functional variations may be made without departing from the spirit or scope of the present invention.

In the description of the illustrations, some components or features referenced together may be described with the reference characters separated by an oblique line, such as but not limited to, for example, the "channel front leg 10$c$ and channel rear leg 10$d$" being referenced as "parallel channel legs 10$c$/10$d$", and it is to be understood that this does not change the meaning, definition, spirit, scope, or design of the invention.

Figure 2:
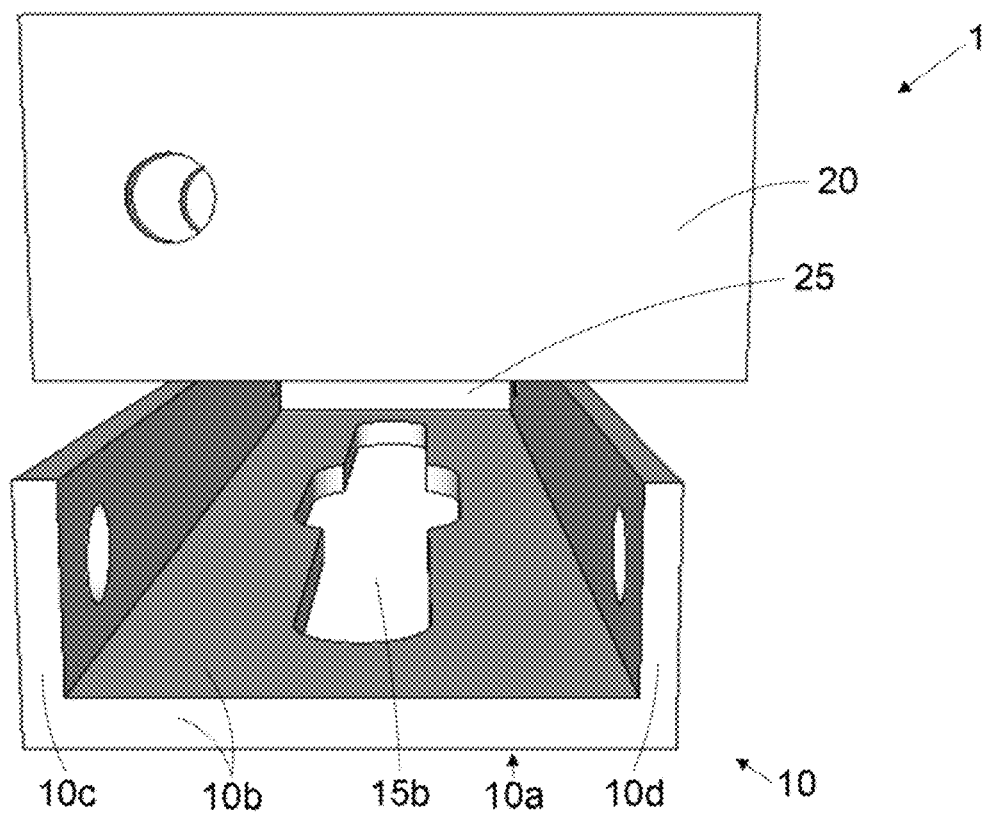
FIG. 2 is a side perspective view showing an aspect of the present invention with a fastener mounting aperture in the channel body of the horizontal channel structure being a combination of geometric shapes to fit different diameter fasteners, with the example illustrated being an elliptical aperture with one set of arcs in opposing faces.

Referring to FIGS. 1$a$-1$j$ and FIG. 2, the first embodiment of the present receiver assembly 1 includes at least: (a) a channel mounting base 10 with two parallel channel legs 10$c$/10$d$, (b) at least one fastener mounting aperture 15/15$a$/15$b$, for example, of any size and geometric shape or shapes in the channel body 10$b$ of the channel mounting base 10, (c) at least one cargo anchor point, (d) an elongated horizontal box receiver 20, (e) at least one transverse aperture pair 20$b$/20$c$, for example, in any opposing sides of the elongated horizontal box receiver 20, and (f) an acircular horizontal aperture 25 in which a fastener can be placed generally being defined by the space between the channel mounting base 10 and elongated horizontal box receiver 20 including any intermediate components connecting the elongated horizontal box receiver 20 to the channel mounting base 10. Further describing the receiver assembly 1, the channel mounting base 10 typically being a size and shape to be mounted within the recessed tow-ball mounting surface of a vehicles step-bumper or drop-center bumper with the recessed tow-ball mounting surface typically having at least one existing fastener aperture, or the channel mounting base to be mounted to any other structurally sound mounting surface, such as but not limited to a bumper, flatbed, welding bed, or tool bed, for example. The channel mounting base 10 comprises a horizontal channel structure 10$a$ with a u-shaped or bracket-shaped cross-section such as but not limited to C-Shaped American Standard Channel, with the horizontal channel structure 10$a$ comprising a channel body 10$b$ and two parallel channel legs being a channel front leg 10$c$ and a channel rear leg 10$d$. Typically, the horizontal channel structure 10$a$ of the channel mounting base 10 is comprised of a single channel structure, such as the C-Shaped American Standard Channel mentioned above. Alternatively, the channel body 10$b$, channel front leg 10$c$, and channel rear leg 10$d$ of the horizontal channel structure 10$a$ of the channel mounting base 10 may be constructed by any other suitable method and material, such as but not limited to individual metal components welded together or as integrated cast components, for example. The channel mounting base 10 can be designed to be any suitable geometric shape, or any combination of geometric shapes, such as but not limited to angling 10$e$ (see FIG. 1$i$) or curving 10$f$ (see FIG. 1$j$) the horizontal channel structure 10$a$ to design the channel mounting base 10 to fit any suitable shapes or designs of step-bumpers, drop-center bumpers, or other structurally sound mounting surfaces. Alternatively, the geometric shape(s) of the channel mounting base 10 may be designed for aesthetics. There is at least one fastener mounting aperture 15 (see FIG. 1a) in the channel body 10b which can be of any size and geometric shape or combination of geometric shapes, such as but not limited to an elliptical aperture 15a (see FIG. 1b-1e and 1i-1j), in which a fastener(s) such as but not limited to a bolt 16 and nut 16a (see FIG. 1a-1b and 1e) and additional hardware such as but not limited to a washer can be placed to attach the receiver assembly 1 to a vehicles step-bumper, drop-center bumper, or other structurally sound mounting surface (not shown). The elliptical aperture(s) 15a may be designed to extend past the vertical plane of either one or both sides of the elongated horizontal box receiver 20 (see FIGS. 1b, 1d and 1e) which allows a fastener such as a bolt 16 (see FIGS. 1b and 1e) to be placed into the elliptical aperture 15a and in a position beneath the elongated horizontal box receiver 20 (see FIGS. 1b and 1e) to be used to secure the receiver assembly 1 to a mounting surface. This design allows the invention to be attached using at least one aperture of the one to three aperture mounting patterns typically present in a step-hitch or drop-center bumper. While a typical mounting surface for the receiver assembly 1 is the recessed tow-ball mounting surface of a step-bumper or drop-center bumper, which typically has between one and three existing tow-ball mounting apertures, some bumpers or other structurally sound mounting surfaces may have other patterns of existing mounting apertures or may need to first have apertures cut prior to attaching the receiver assembly 1. To design the receiver assembly 1 to be attached to a plurality of mounting surface aperture patterns, additional fastener mounting apertures may be present at any position along the channel body 10b. Typically, the receiver assembly 1 is attached to a mounting surface using any suitable fasteners and hardware. Alternatively, the receiver assembly 1 can be attached to a mounting surface by but not limited to welding, for example. Typically, the fastener mounting aperture(s) is cut by a machine such as but not limited to a water jet cutting machine. Alternatively, the aperture(s) may be made by any other suitable tool or method, such as a plasma cutter, drilling, machining, or casting, for example. There is an elongated horizontal box receiver 20 attached to the horizontal channel structure 10a and/or any intermediate components between the elongated horizontal box receiver 20 and the horizontal channel structure 10a such as but not limited to an elongated vertical box receiver 59 (see FIGS. 12a-12c and 13e) and/or a vertical anchor channel 65 (see FIG. 13e) which are described later. The elongated horizontal box receiver 20 comprises a tubular shape with an elongated center aperture 20a and at least one transverse aperture pair 20b in opposing sides. Preferably, there is a plurality of transverse aperture pairs 20b spaced apart (see FIG. 1g) and the transverse aperture pairs can be any combination of different sizes, such as for example, the different size transverse aperture pairs 20b and 20c shown in FIG. 1h. A transverse aperture pair can be located at any position or on any opposing sides of the elongated horizontal box receiver 20. Any transverse aperture pair can be any geometric shape or combination of geometric shapes such as but not limited to an ellipse. The receiver assembly has an acircular horizontal aperture 25 (see FIGS. 1a-1c) which is generally defined by the space between the channel mounting base 10 and elongated horizontal box receiver 20 including any intermediate components attached between the elongated horizontal box receiver 20 and the channel mounting base 10, such as but not limited to an elongated vertical box receiver 59 (see FIGS. 12a-12c and 13e) and a vertical anchor channel 65 (see FIG. 13e) which are described later. The acircular horizontal aperture 25 is typically of a size and shape(s) that the head of a fastener such as but not limited to a bolt 16 (see FIGS. 1b and 1e) or that fastener hardware such as but not limited to a nut 16a (see FIG. 1a) can be placed within the aperture, and the acircular horizontal aperture may be closed on one end, such as being covered by a reinforcement member. Alternatively, the acircular horizontal aperture 25 may be of a size and shape that a fastener such as but not limited to a u-bolt, strap, or band, for example, can be placed through the acircular horizontal aperture 25 and around the elongated horizontal box receiver 20 to attach, for example, a data plate 103 (see FIG. 18) to the elongated horizontal box receiver 20. Typically, the acircular horizontal aperture 25 is positioned over a fastener mounting aperture in the channel mounting base 10. Alternatively, the acircular horizontal aperture 25 may not be positioned over a fastener mounting aperture in the channel mounting base 10, such as when an elongated vertical box receiver 59 is attached to the channel mounting base (see FIGS. 12a-12b and 13e). Clip 21a is used to secure receiver pin 21 (see FIGS. 1a and 1e) which can be placed through a transverse aperture pair 20b in the elongated horizontal box receiver 20 and a corresponding aperture or transverse aperture pair in the support member of a cargo carrier, cargo carrier accessory, or tow-hitch accessory to attach both assemblies together. Different size receiver pins and clips can be used in different size transverse aperture pairs, such as but not limited to the two different diameter transverse aperture pairs 20b/20c illustrated in FIG. 1h. Alternatively, a fastener and hardware such as but not limited to a bolt, nut, and washer, for example, can be used in place of the receiver pin 21 and clip 21a described above. The at least one cargo anchor point is provided by at least one horizontal transverse aperture pair(s) 18 (see FIGS. 1a, 1e, and 1f) in the parallel channel legs 10c/10d with one aperture of the horizontal transverse aperture pair 18 being on the channel front leg 10c and the second aperture of the horizontal transverse aperture pair 18 being on the channel rear leg 10d. Typically, a fastener such as but not limited to a receiver pin 19 (see FIGS. 1a and 1e) is placed through a transverse aperture pair 18 in the channel mounting base 10 and secured with clip 19a to attach another component or to provide an anchor point to attach another fastener such as but not limited to a quick link or to secure a tie down such as but not limited to a ratchet strap, for example, to secure cargo, cargo carriers, cargo carrier accessories, or tow-hitch accessories. Alternatively, a fastener and hardware such as but not limited to a bolt, nut, and washer, for example, can be used in place of receiver pin 19 and clip 19a. Typically, multiple fastener(s) and hardware such as but not limited to a receiver pin 19 and clip 19a are placed in multiple transverse aperture pairs 18 in the channel mounting base 10. Alternatively, a fastener such as but not limited to a quick link can be placed in any single aperture of a transverse aperture pair to provide an anchor point to secure cargo, cargo carriers, cargo carrier accessories, or tow-hitch accessories. Typically, the components of the channel mounting base 10 and the elongated horizontal box receiver 20 of the receiver assembly 1 are made of mild steel material. Alternatively, the components can be made of any suitable metallic or composite materials. Typically, the components of the channel mounting base 10 and the elongated horizontal box receiver 20 are welded together. Alternatively, the components may be attached or integrated by any suitable method, such as but not limited to casting, injection molding, machining, fasteners, or bonding, for example.

Referring to FIG. 2, another aspect of the receiver assembly 1 comprises at least one fastener mounting aperture 15b of the at least one fastener mounting aperture in the channel body 10b referenced above is a combination of at least two geometric shapes such as but not limited to the illustrated example of a generally elliptical aperture with a set of arcs in opposing faces of the aperture so different size fasteners such as but not limited to bolts can be placed at multiple positions along the channel body 10b. Typically, the fastener mounting aperture(s) is cut by a machine such as but not limited to a water jet cutting machine. Alternatively, the aperture(s) may be made by any other suitable tool or method, such as a plasma cutter, machining, drilling, or casting, for example.

Figure 3:
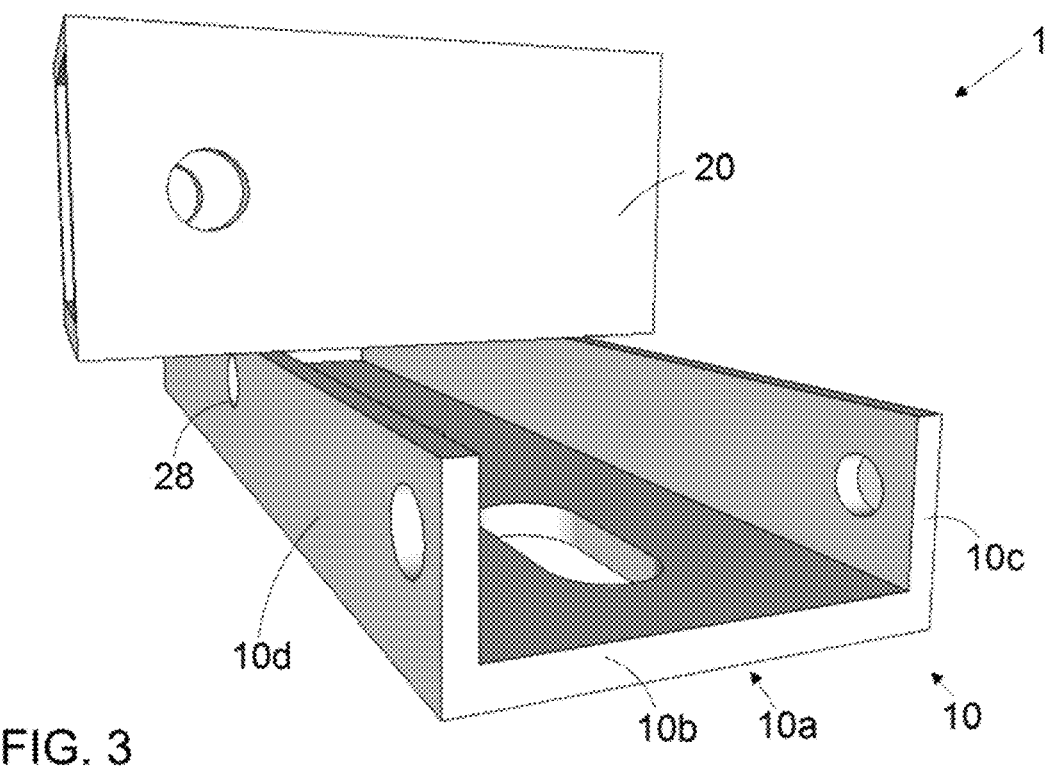
FIG. 3 is a perspective view showing an aspect of the present invention with a fastener aperture in the channel front leg of the horizontal channel structure into which a fastener such as but not limited to a bolt or eye bolt, for example, can be placed to attach other components or fasteners to provide a cargo anchor point(s)

Referring to FIG. 3, another aspect of the receiver assembly 1 comprises at least one fastener aperture 28 in at least one of the channel front leg 10c and/or the channel rear leg 10d of the channel mounting base 10 and being of a size and shape into which a fastener such as but not limited to a bolt or eye bolt, for example, can be placed to attach other components or fasteners to provide a cargo anchor point(s). The fastener aperture(s) 28 can be of any shape, such as but not limited to an elliptical aperture. The fastener aperture(s) 28 can be at any position in the parallel channel legs 10c/10d. The illustrated example shows one circular fastener aperture 28 in the channel rear leg 10d of the channel mounting base 10. Typically, the fastener aperture(s) is cut by a machine such as but not limited to a water jet cutting machine. Alternatively, the fastener aperture(s) may be made by any other suitable tool or method, such as a plasma cutter, machining, drilling, or casting, for example.

Figure 4:
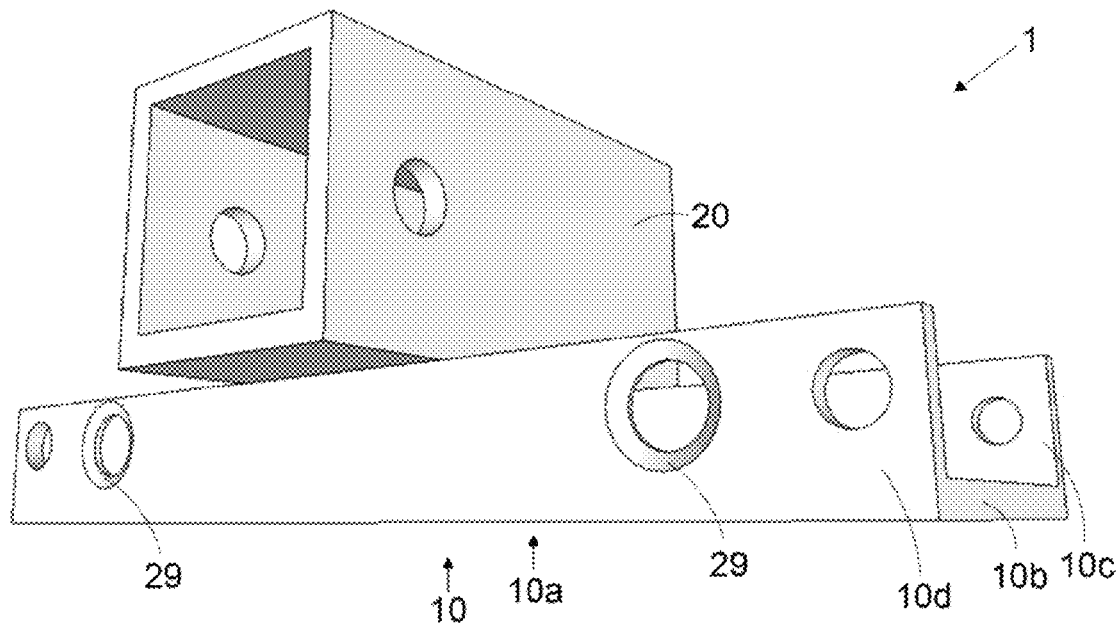
FIG. 4 is a perspective view showing an aspect of the present invention with two tapered apertures in the channel front leg of the channel mounting base, which may allow a fastener attached to secure cargo, such as but not limited to a quick link, to rotate more freely within a tapered aperture and reduce the potential for the edges of the fastener to bind on the generally angle shaped edges of a typical non-tapered aperture.

Referring to FIG. 4, another aspect of the receiver assembly 1 comprises at least one tapered aperture 29 in at least one of the channel front leg 10c and/or the channel rear leg 10d of the channel mounting base 10 and being of a size and shape into which a fastener such as but not limited to a quick link can be placed to secure cargo, cargo carriers, cargo carrier accessories, and other tow-hitch receiver accessories. The tapered aperture(s) 29 comprises an aperture shaped such as but not limited to tapering or rounding the edge along part or the entire circumference of at least one opening of the aperture(s). The tapered edge(s) may allow a fastener attached to secure cargo, such as but not limited to a quick link, to rotate more freely within a tapered aperture 29 and reduce the potential for the edges of the fastener to bind on the generally angle shaped edges of a typical non-tapered aperture. The illustrated example shows two of the tapered apertures 29 in the channel rear leg 10d. Typically, the aperture is cut into the parallel channel leg(s) 10c/10d by but not limited to using a water jet cutting machine and then being shaped by grinding along the aperture rims. Alternatively, the apertures and tapered edges can be made by any suitable method such as but not limited to casting, injection molding, drilling, machining, or plasma cutting, for example.

Figure 5A:
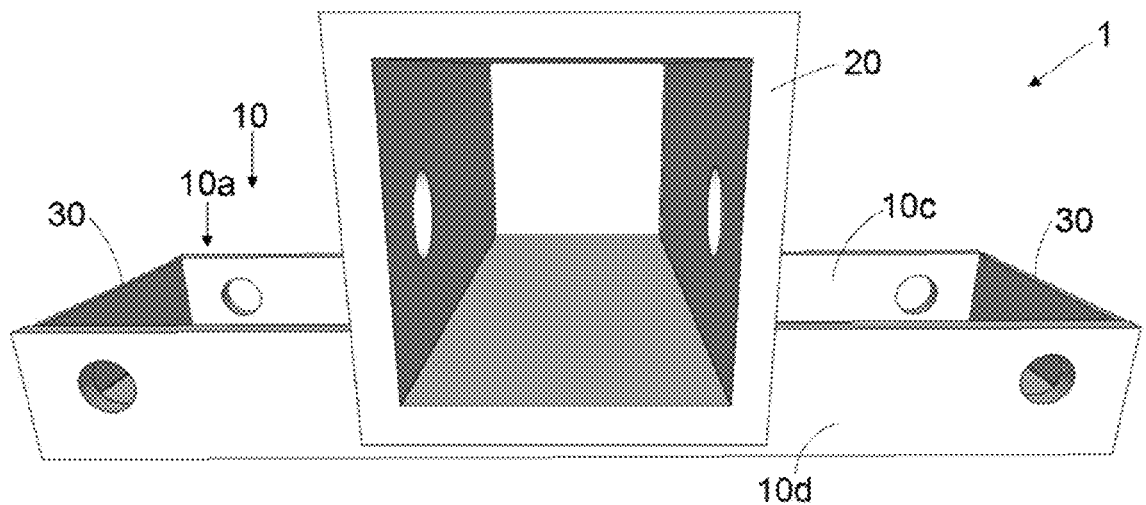
FIGS. 5a and 5b are perspective views showing an aspect of the present invention with reinforcement members attached to the channel body, channel front leg, and channel rear leg of the channel mounting base.
Figure 5B:
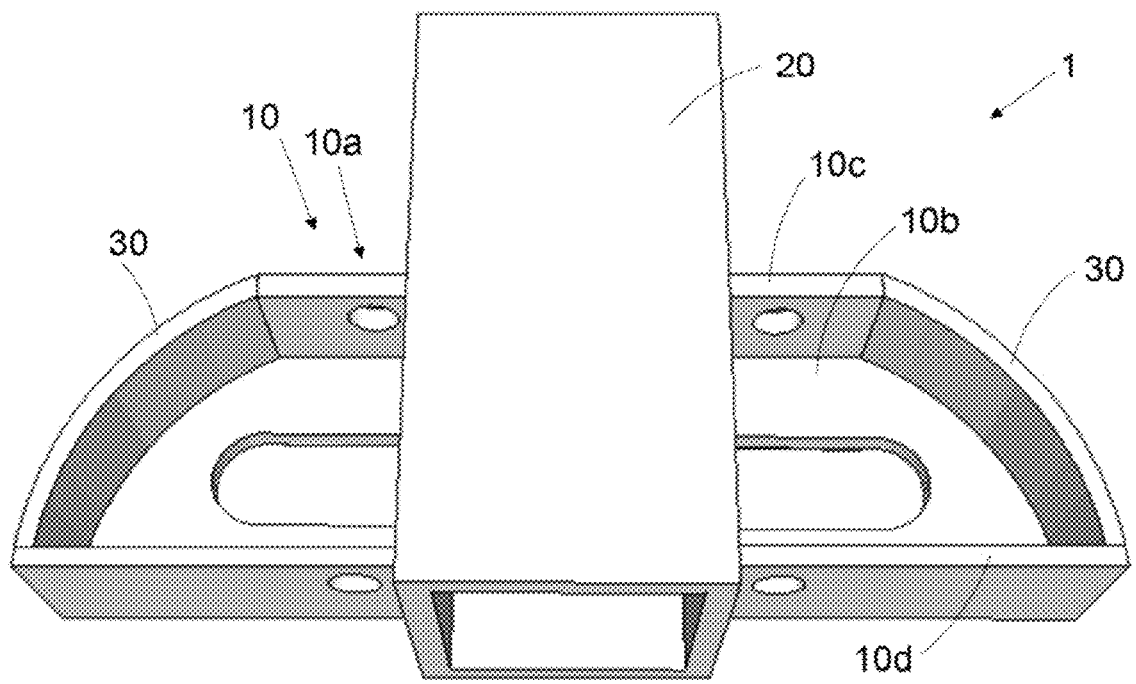

Referring to FIGS. 5a and 5b, another aspect of the receiver assembly 1 comprises at least one reinforcement member 30, designed to increase the strength of the receiver assembly 1, attached to at least one surface of the horizontal channel structure 10a and may be attached to any adjacent components of the receiver assembly 1. The reinforcement member(s) 30 comprises a bar being of any geometric shape and size such as but not limited to a trapezoid, or any combination of geometric shapes (see FIG. 5b) to design the reinforcement member(s) 30 to attach to a combination of different or irregular shaped surfaces. Typically, as illustrated in the examples in FIGS. 5a and 5b, the reinforcement member(s) 30 is attached between the components of the horizontal channel structure 10a, with the components being the channel body 10b, channel front leg 10c, and channel rear leg 10d. Alternatively, the reinforcement member(s) 30 can include being attached to any adjacent components of the receiver assembly 1. The reinforcement member may be attached as a plate or fish-plate to strengthen a component. Typically, the reinforcement member(s) is made of mild steel material. Alternatively, the reinforcement member(s) can be made of any suitable metallic or composite materials. Typically, the reinforcement member(s) is attached by welding. Alternatively, the reinforcement member(s) may be attached or integrated by any suitable method such as casting, injection molding, machining, or bonding, for example.

Figure 6A:
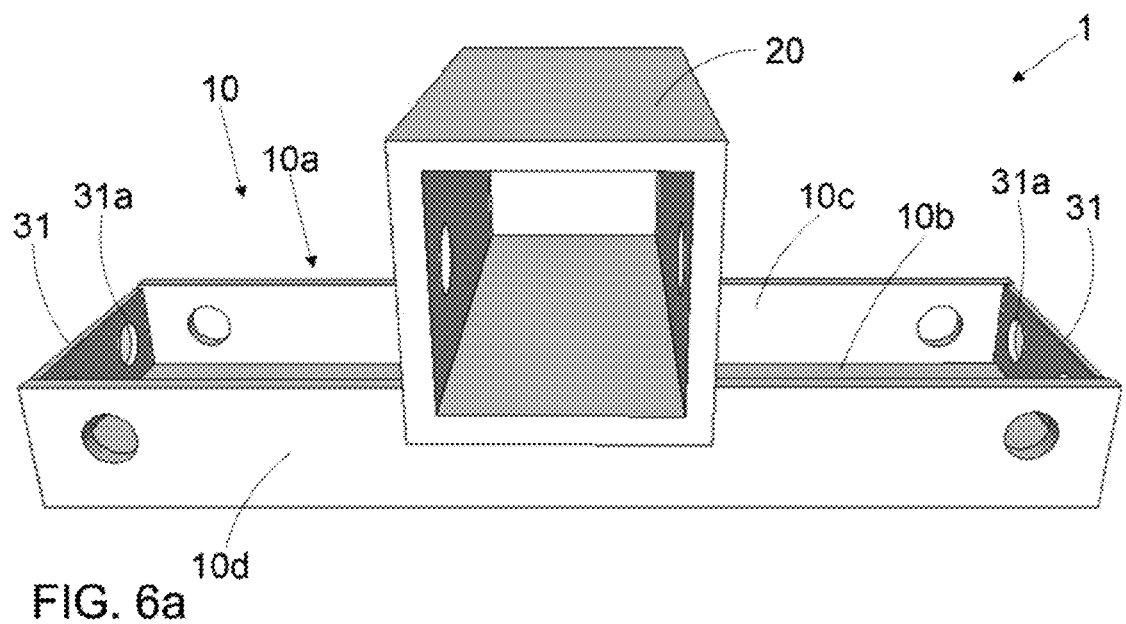
FIGS. 6a and 6b are perspective views showing an aspect of the present invention with attachment members affixed to the channel body, channel front leg, and channel rear leg of the channel mounting base.
Figure 6B:
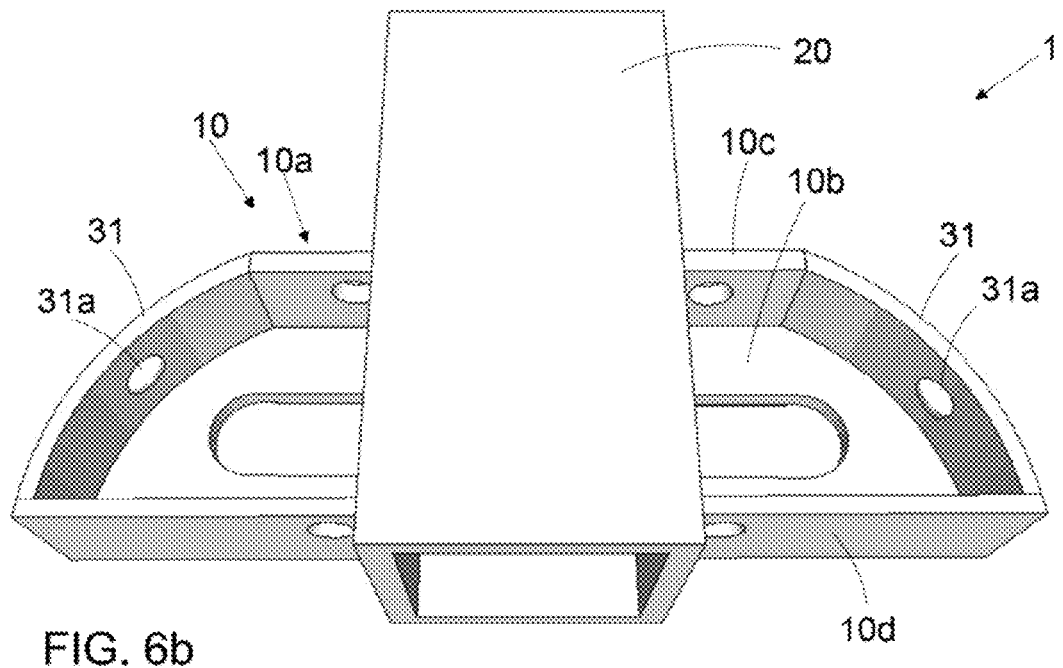
Figure 12A:
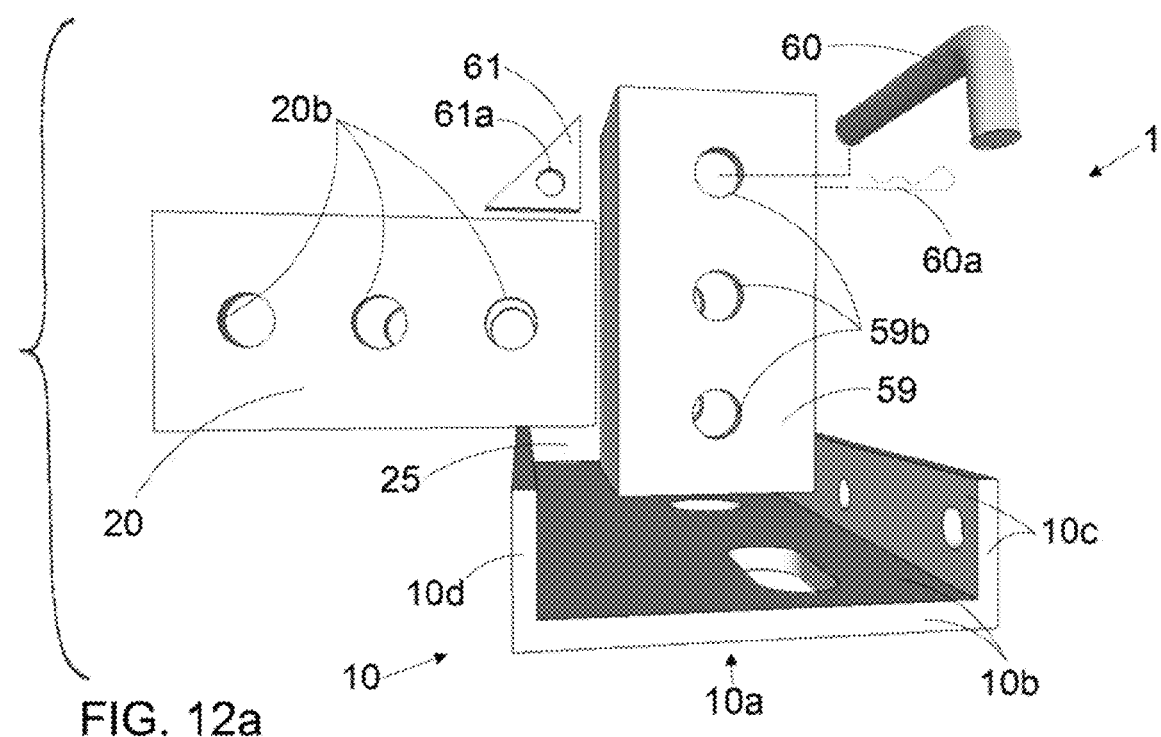
FIGS. 12*a*-12*d* are exploded perspective views of the present invention showing an elongated vertical box receiver with one end attached perpendicular to the horizontal channel structure of the channel mounting base and one side of the elongated vertical box receiver attached perpendicular to one end of the elongated horizontal box receiver; with FIG. 12*a* also showing an attachment member affixed to a surface of the elongated vertical box receiver and an adjacent surface of the elongated horizontal box receiver, and also showing a receiver pin and clip to be placed through a transverse aperture pair in the elongated vertical box receiver; with FIG. 12*b* also showing a reinforcement member attached to a surface of the elongated vertical box receiver and an adjacent surface of the elongated horizontal box receiver, and also showing the elongated vertical box receiver being designed by shaping the rear side to follow the shape of the channel front leg of the channel mounting base; with FIG. 12*c* also showing an attachment member affixed to a surface of the channel mounting base and an adjacent surface of the elongated vertical box receiver, and also showing the elongated horizontal box receiver recessed in a notch in the channel rear leg of the channel mounting base, and also showing a channel mounting base designed to be generally of a square shape with multiple circular and acircular fastener mounting apertures in the channel mounting base, and with FIG. 12*d* showing a cargo anchor point attached to the elongated vertical box receiver.
Figure 12B:
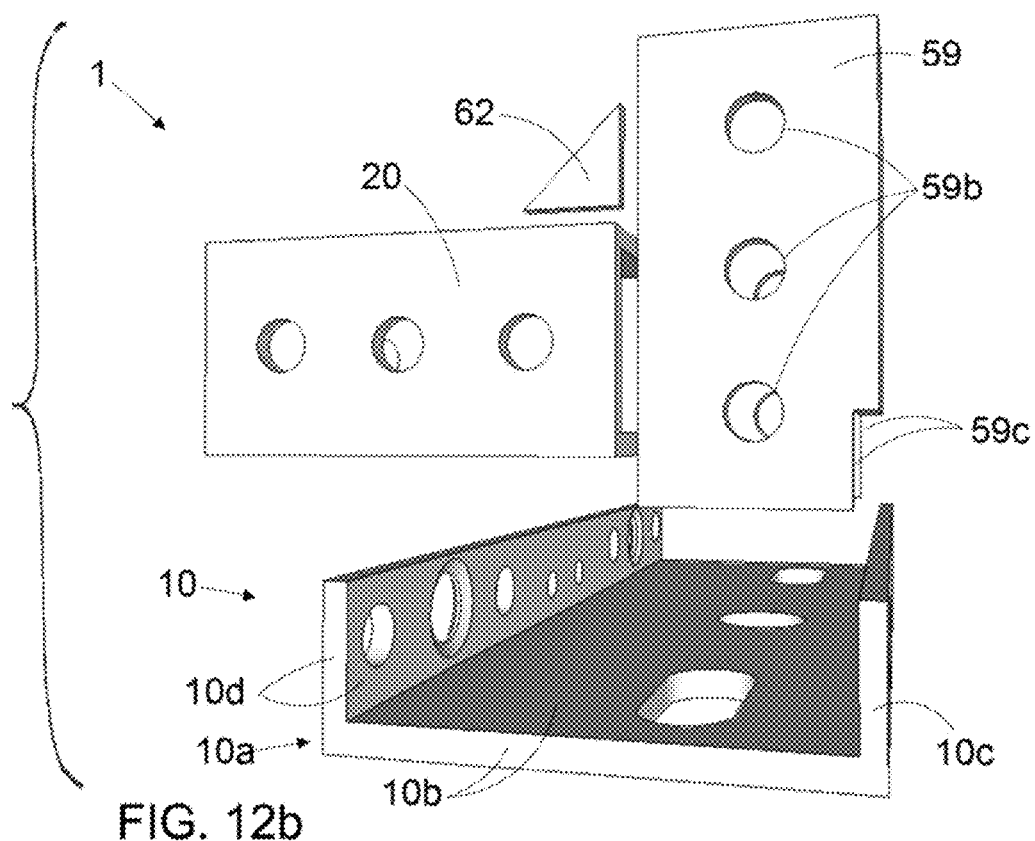
Figure 12C:
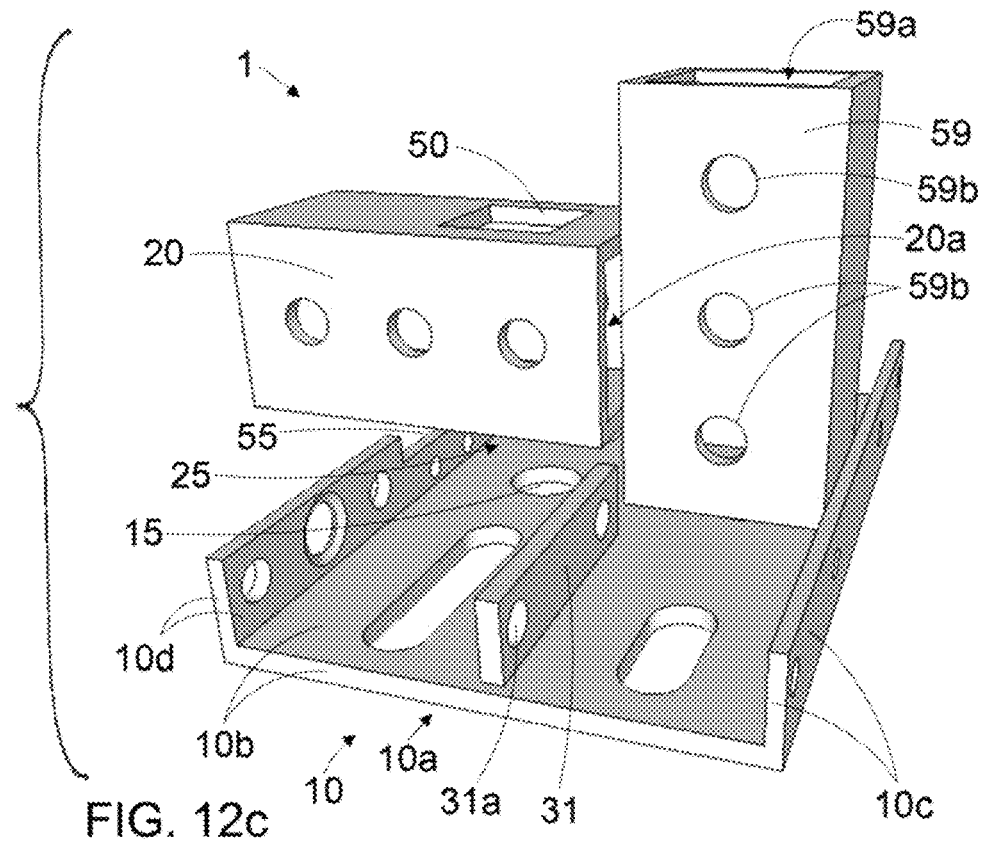

Referring to FIGS. 6a and 6b, another aspect of the receiver assembly 1 comprises at least one attachment member 31 affixed to at least one surface of the horizontal channel structure 10a and may be affixed to any adjacent components (see also FIG. 12c). The attachment member(s) 31 comprises a bar of any geometric shape or size with at least one aperture 31a being of a size and shape into which a fastener such as but not limited to a quick link can be placed. The attachment member(s) 31 can be of any geometric shape and size such as but not limited to a trapezoid, or any combination of geometric shapes (see FIG. 6b) to design the attachment member(s) 31 to attach to a combination of different or irregular shaped surfaces. Typically, as illustrated in the examples, attachment member(s) 31 is affixed between the components of the horizontal channel structure 10a, with the components being the channel body 10b, channel front leg 10c, and channel rear leg 10d. Alternatively, the attachment member(s) 31 can include being affixed to any adjacent components of the receiver assembly 1. The attachment member may increase the strength of the receiver assembly and can be affixed as a plate or fish-plate around an aperture(s) to strengthen a component. Typically, the attachment member(s) is made of mild steel material. Alternatively, the attachment member(s) can be made of any suitable metallic or composite materials. Typically, the attachment member is affixed by welding. Alternatively, the attachment member may be affixed or integrated by any suitable method such as casting, injection molding, machining, or bonding, for example. Typically, a fastener such as but not limited to a quick link or a tie down such as but not limited to a ratchet strap, for example, can be attached to the attachment member(s) 31 to secure cargo, cargo carriers, or cargo carrier accessories.

Figure 7:
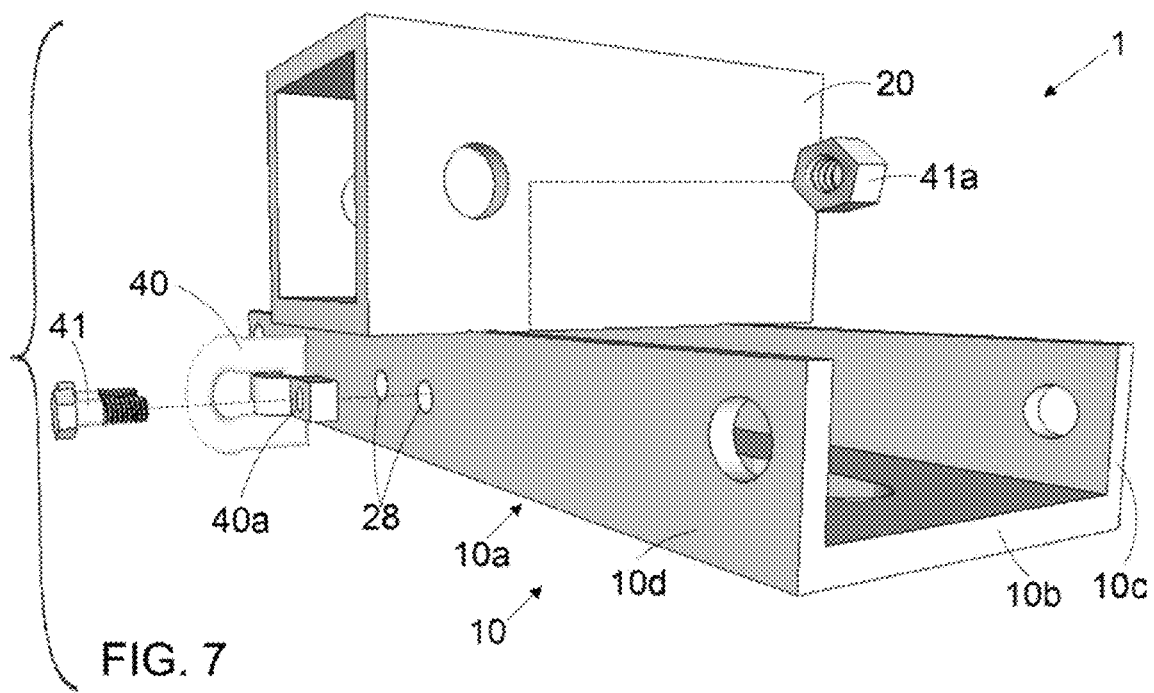
FIG. 7 is an exploded perspective view showing an aspect of the present invention with a bolt on type d-ring anchor attached to the channel rear leg of the channel mounting base.

Referring to FIG. 7, another aspect of the receiver assembly 1 comprises at least one cargo anchor point such as but not limited to a bolt on type d-ring anchor attached to the channel front leg 10c and/or the channel rear leg 10d of the channel mounting base 10, with the illustrated example showing a bolt on type d-ring anchor 40 attached to the channel rear leg 10d by a two bolts 41 inserted through apertures 40a in the d-ring anchor 40 and through corresponding apertures 28 in the channel rear leg 10d of the channel mounting base 10 and secured with nuts 41a. Typically, a bolt on type cargo anchor point(s) is attached with any suitable fastener and hardware, such as but not limited to a bolt 41 and nut 41a, and may also be welded on for additional strength. Alternatively, the cargo anchor point(s) and bolt may be one piece, such as but not limited to an eye bolt or a d-ring with an integrated bolt shaft, for example. Typically, the cargo anchor point is any suitable manufactured metal anchor component attached to the receiver assembly, which are readily available from a number of manufacturers. Alternatively, the cargo anchor point may be made from any suitable material, such as but not limited to metallic or composite material, for example. Typically, a fastener such as but not limited to a quick link or a tie down such as but not limited to a ratchet strap, for example, can be attached to the cargo anchor point(s) 40 to secure cargo, cargo carriers, or cargo carrier accessories.

Figure 8:
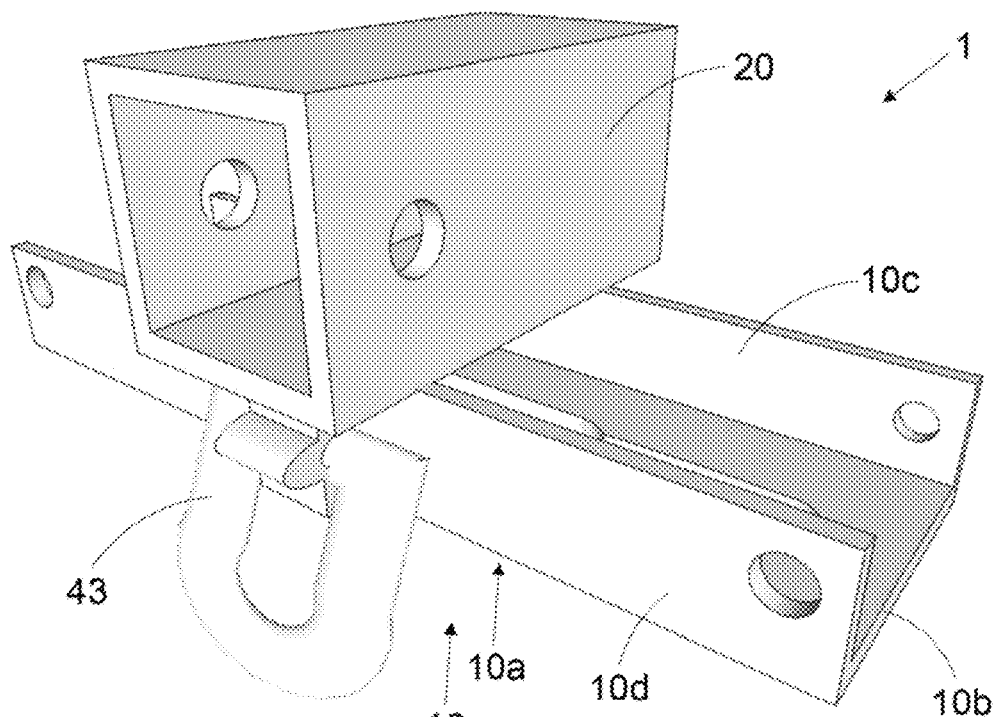
FIG. 8 is a perspective view showing an aspect of the present invention with a weld on type d-ring anchor attached to the channel rear leg of the channel mounting base.

Referring to FIG. 8, another aspect of the receiver assembly 1 comprises at least one cargo anchor point such as but not limited to a weld on type d-ring anchor attached to at least one of the channel front leg 10*c* or the channel rear leg 10*d* of the channel mounting base 10, with the illustrated example showing a weld on type d-ring anchor 43 attached to the channel rear leg 10*d*. Typically, the cargo anchor point(s) is any suitable manufactured metal anchor component attached to at least one of the parallel channel legs 10*c*/10*d*, which are readily available from a number of manufacturers. Alternatively, the cargo anchor point(s) may be made from any suitable material, such as but not limited to metallic or composite material, for example. The cargo anchor point may be any size and shape or combination of shapes, such as but not limited to a shackle tab, bent/shaped bar, or bent/shaped strap, for example. Typically, the cargo anchor point(s) is attached by welding. Alternatively, the cargo anchor point(s) may be attached or integrated by any suitable method such as casting, injection molding, fasteners, or bonding, for example. Typically, a fastener such as but not limited to a quick link or a tie down such as but not limited to a ratchet strap, for example, can be attached to the cargo anchor point(s) 43 to secure cargo, cargo carriers, or cargo carrier accessories.

Figure 9:
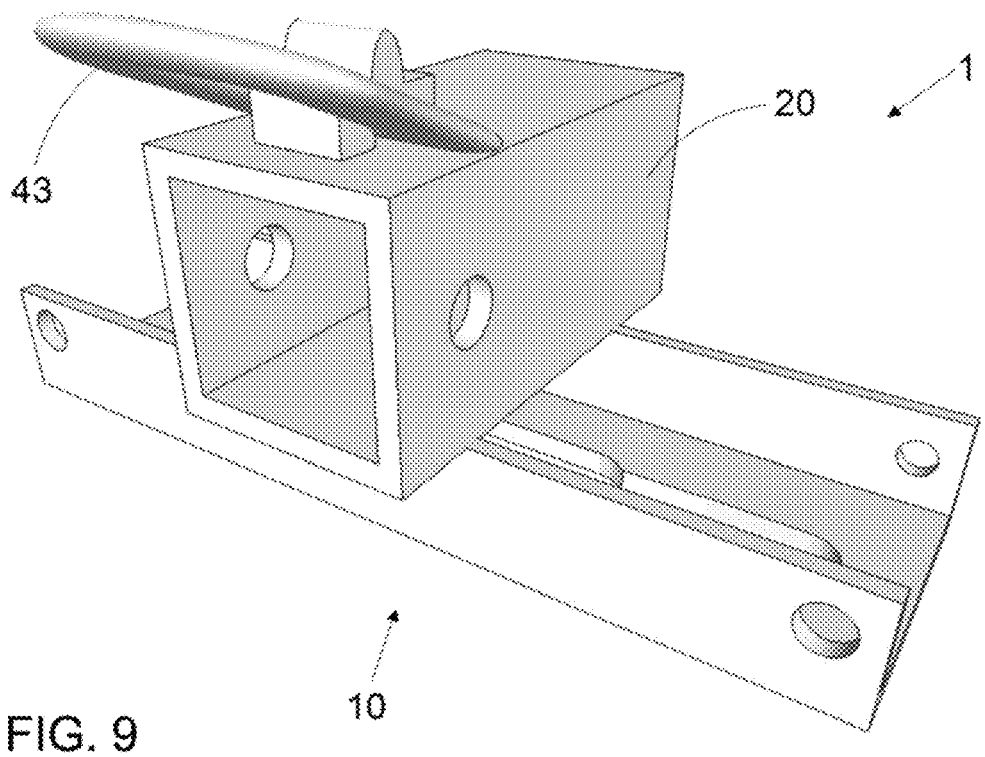
FIG. 9 is a perspective view showing an aspect of the present invention with a weld on type d-ring anchor attached to the top surface of the elongated horizontal box receiver.

Referring to FIG. 9, another aspect of the receiver assembly 1 comprises at least one cargo anchor point such as but not limited to a weld on type d-ring anchor attached to at least one side of the elongated horizontal box receiver 20, with the illustrated example showing a weld on type d-ring anchor 43 attached to the top horizontal side. Typically, the cargo anchor point(s) is any suitable manufactured metal anchor component attached to the elongated horizontal box receiver 20, which are readily available from a number of manufacturers. Alternatively, the cargo anchor point(s) may be made from any suitable material, such as but not limited to metallic or composite material, for example. The cargo anchor point may be any size and shape or combination of shapes, such as but not limited to a shackle tab, bent/shaped bar, or bent/shaped strap, for example. Typically, the cargo anchor point(s) is attached to the elongated horizontal box receiver 20 by welding. Alternatively, the cargo anchor point(s) can be attached to or integrated with the elongated horizontal box receiver 20 by but not limited to casting, injection molding, fasteners, or bonding, for example. Typically, a fastener such as but not limited to a quick link or a tie down such as but not limited to a ratchet strap, for example, can be attached to the cargo anchor point(s) to secure cargo, cargo carriers, or cargo carrier accessories.

Figure 10A:
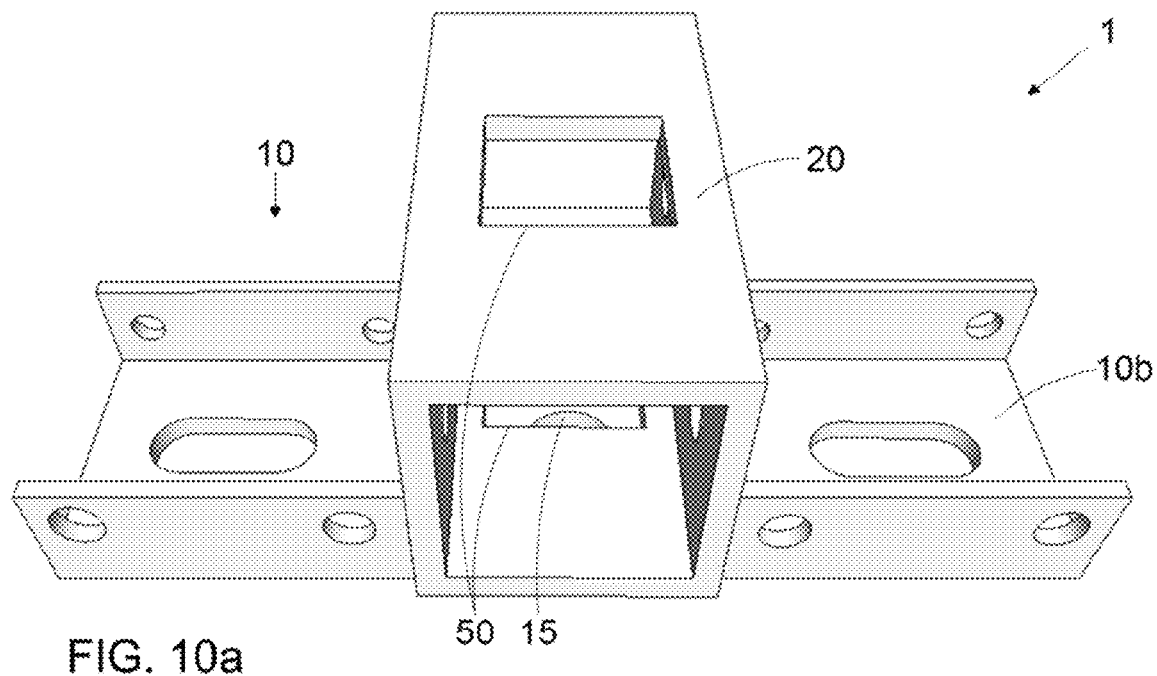
FIGS. 10*a*-10*c* are perspective views showing an aspect of the present invention with a vertical transverse aperture pair in the elongated horizontal box receiver, with the vertical transverse aperture pair being of a size and shape to allow an entire fastener to be passed vertically through the elongated horizontal box receiver and be placed in a fastener mounting aperture in the horizontal channel structure of the channel mounting base.
Figure 10B:
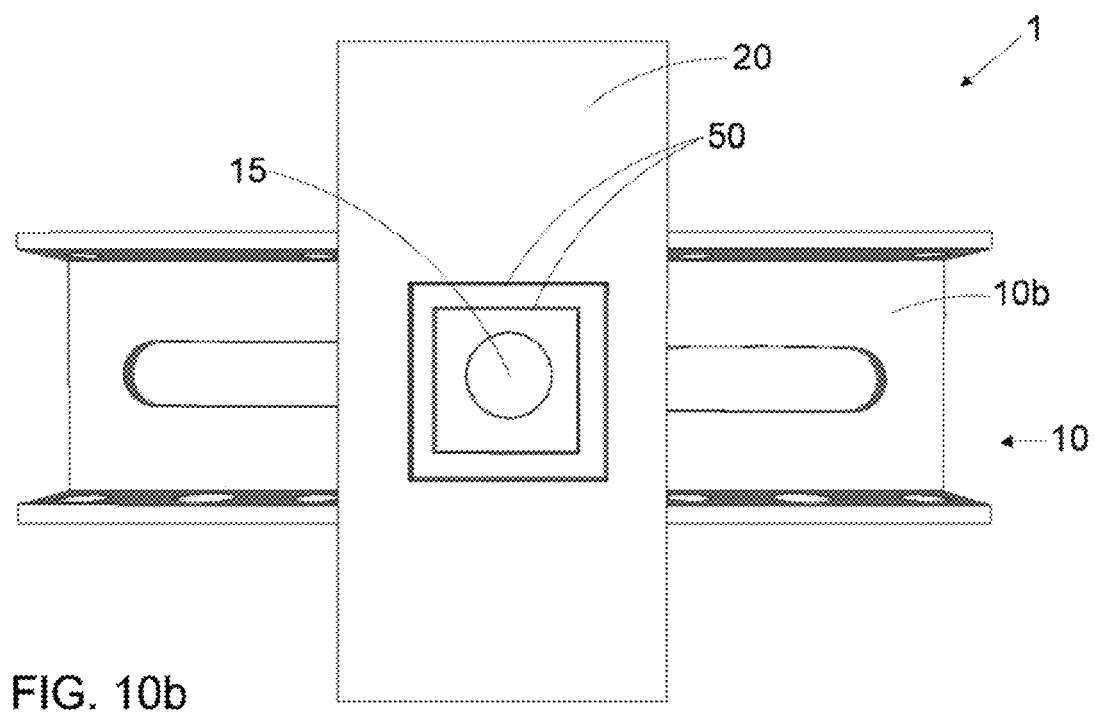
Figure 10C:
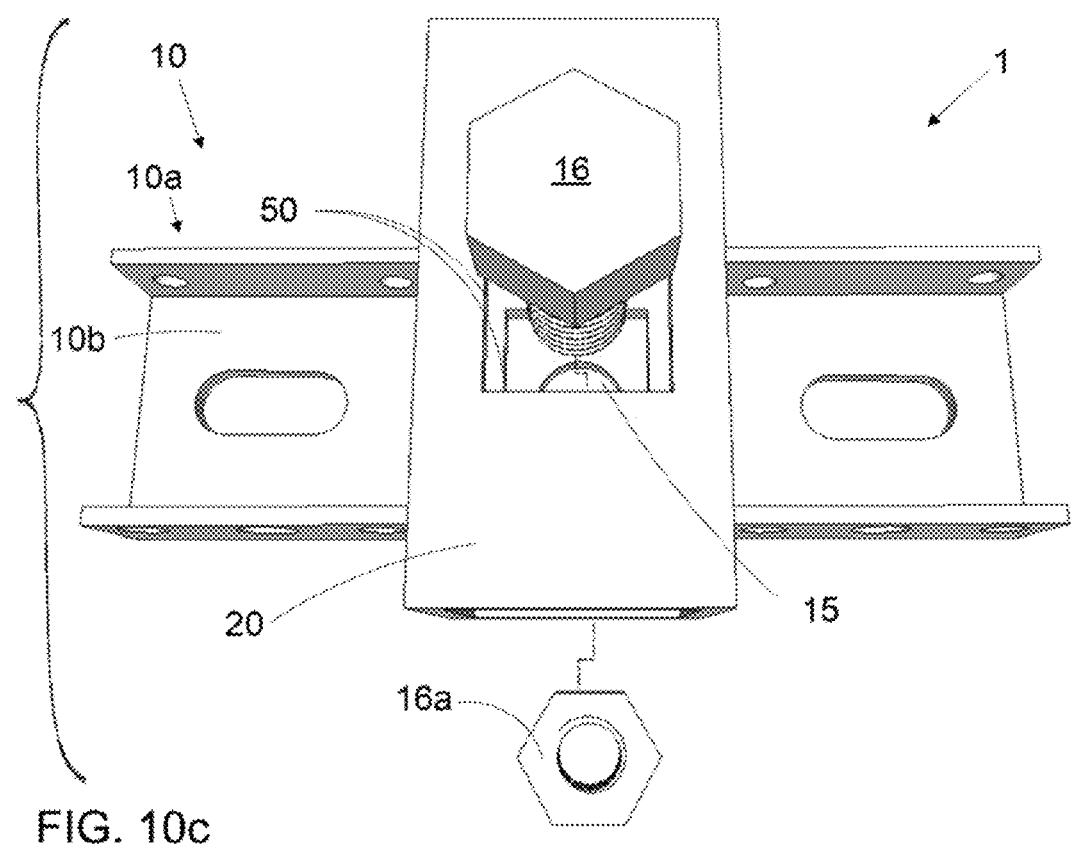

Referring to FIGS. 10*a*-10*c*, another aspect of the receiver assembly 1, as illustrated in the examples, comprises at least one vertical transverse aperture pair 50 in the elongated horizontal box receiver 20 with the vertical transverse aperture pair(s) 50 being of a size and shape to allow an entire fastener such as but not limited to a bolt 16 (see FIG. 10*c*) to be passed vertically through the elongated horizontal box receiver 20 and placed in a fastener aperture 15 in the channel body 10*b* of the channel mounting base 10, and secured to a mounting surface with a nut 16*a*. The vertical transverse aperture pair(s) 50 comprises any geometric shape such as but not limited to a square, rectangle, circle, or hexagon, for example, or any combination of geometric shapes. Typically, the vertical transverse aperture pair(s) 50 is positioned over a fastener mounting aperture in the channel mounting base. Alternatively, the vertical transverse aperture pair(s) 50 may be placed at any position in the elongated horizontal box receiver. Typically, the vertical transverse aperture pair(s) is cut into the elongated horizontal box receiver 20 using a machine such as but not limited to a water jet cutting machine. Alternatively, the transverse aperture pair(s) can be made by any suitable tool or method such as but not limited to casting, injection molding, drilling, machining, or plasma cutting, for example.

Figure 11A:
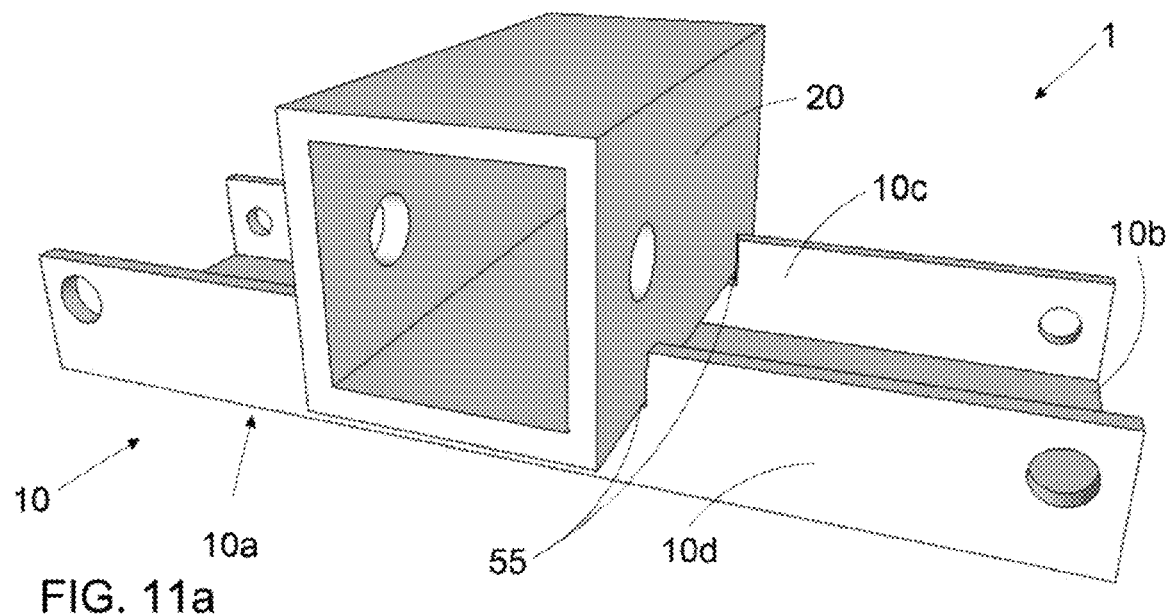
FIGS. 11*a* and 11*b* are perspective views showing an aspect of the present invention with a notch in both of the parallel channel legs of the channel mounting base and with the elongated horizontal box receiver recessed in the notches, where the design of the elongated horizontal box receiver being recessed into the notch(s) and being attached to the horizontal channel structure provides increased strength to resist vertical and/or lateral forces, depending on the method of attachment.
Figure 11B:
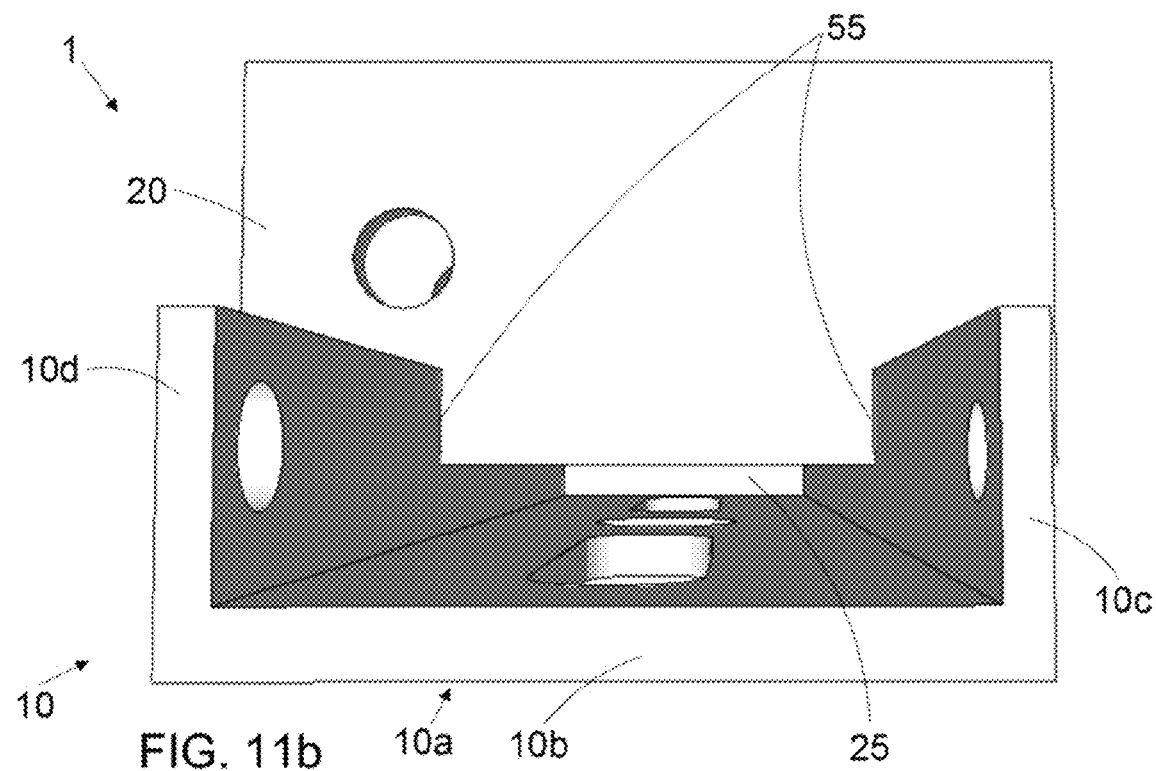

Referring to FIGS. 11*a* and 11*b*, another aspect of the receiver assembly 1 comprises a notch 55 (see also FIG. 12*c*) beginning in the top surface of at least one of the channel front leg 10*c* and/or the channel rear leg 10*d* of the channel mounting base 10 and extending down towards the channel body 10*b* and being of a size and shape that the elongated horizontal box receiver 20 is at least partially recessed within the notch(s) 55. Typically, the notch(s) 55 is cut into one or both of the parallel channel legs 10*c*/10*d* using a machine such as but not limited to a water jet cutting machine. Alternatively, the notch(s) can be made by any suitable tool or method such as but not limited to casting, injection molding, machining, or plasma cutting, for example. Typically, the portion(s) of the elongated horizontal box receiver 20 that is recessed in the notch(s) 55 is attached to the channel mounting base 10 by welding. Alternatively, the elongated horizontal box receiver 20 can be attached to or integrated with the channel mounting base 10 by any suitable method such as but not limited to casting, injection molding, machining, fasteners, or bonding, for example. The design of the elongated horizontal box receiver 20 being recessed into the notch(s) 55 and being attached to the horizontal channel structure 10*a* provides increased strength to resist vertical and/or lateral forces, depending on the method of attachment. Alternatively, depending on the method of attachment there may be no additional strength to resist vertical or lateral forces.

Referring to FIGS. 12*a*-12*c*, another aspect of the receiver assembly 1 comprises an elongated vertical box receiver 59 with one end attached perpendicular to the horizontal channel structure 10*a* of the channel mounting base 10 and one side of the elongated vertical box receiver 59 attached perpendicular to one end of the elongated horizontal box receiver 20, with the elongated vertical box receiver 59 comprising a tubular shape, an elongated center aperture 59*a* (see FIG. 12*c*), and at least one transverse aperture pair 59*b* in opposing sides. A transverse aperture pair 59*b* can be located at any position in any opposing sides of the elongated vertical box receiver 59. Any transverse aperture pair 59*b* can be of any geometric shape and size such as but not limited to an ellipse. The elongated center aperture 59*a* of the elongated vertical box receiver 59 is typically centered over a fastener mounting aperture 15 in the channel mounting base 10. The acircular horizontal aperture 25 (see FIGS. 12*a* and 12*c*) is defined by the space between the elongated vertical box receiver 59, channel mounting base 10, and elongated horizontal box receiver 20 including any intermediate components attached between the elongated horizontal box receiver 20 and channel mounting base 10, such as a vertical anchor channel 65 (see FIG. 13*e*). Typically, with an elongated vertical box receiver 59 attached to the channel mounting base 10, the acircular horizontal aperture 25 is not positioned over a fastener mounting aperture in the channel mounting base 10, (see FIGS. 12*a*, 12*b* and 13*e*), and the acircular horizontal aperture 25 may be of a size and shape that a fastener such as but not limited to a u-bolt, strap, or band, for example, can be placed through the acircular horizontal aperture 25 and around the elongated horizontal box receiver 20 to attach, for example, a data plate 103 (see FIG. 18) to the elongated horizontal box receiver 20. Alternatively, the acircular horizontal aperture 25 may be positioned over a fastener mounting aperture 15 in the channel mounting base 10 (see FIG. 12*c*) and being of a size and shape(s) that a fastener or fastener hardware such as but not limited to a nut 16*a* (see FIG. 1*a*) can be placed within the aperture, and the acircular horizontal aperture may be closed on one end, such as being covered by a reinforcement member. Clip 60a is used with receiver pin 60 (see FIG. 12a) which can be placed through a transverse aperture pair 59b of the elongated vertical box receiver 59 and a corresponding aperture or transverse aperture pair in the support member of a cargo carrier, cargo carrier accessory, or tow-hitch accessory to attach both assemblies together. Alternatively, a fastener and hardware such as but not limited to a bolt and nut can be used in place of receiver pin 60 and clip 60a. Typically, the elongated vertical box receiver 59 is made of mild steel material. Alternatively, the elongated vertical box receiver can be made of any suitable metallic or composite materials. Typically, the elongated vertical box receiver 59 is attached to the horizontal channel structure 10a and the elongated horizontal box receiver 20 by welding. Alternatively, the elongated vertical box receiver 59 can be attached to or integrated with the horizontal channel structure 10a and the elongated horizontal box receiver 20 by any suitable method such as casting, injection molding, machining, or bonding, for example. Typically, the transverse aperture pair(s) 59b are cut by but not limited to using a water jet cutting machine. Alternatively, the transverse aperture pair(s) can be made by any suitable method such as but not limited to casting, injection molding, drilling, machining, or plasma cutting, for example.

Referring to FIG. 12b, another aspect of the receiver assembly 1 comprises the end of the elongated vertical box receiver 59 attached perpendicular to the horizontal channel structure 10a is designed by shaping such as but not limited to notching 59c, angling, or tapering at least one side of the elongated vertical box receiver 59 to follow the shape of one of the parallel channel legs 10c/10d, as in the illustrated example showing the channel front leg 10c being attached recessed into one side of the elongated vertical box receiver 59. Typically, the end of the elongated vertical box receiver 59 is shaped using a machine such as but not limited to a water jet cutting machine. Alternatively, the elongated vertical box receiver can be shaped by any suitable tool or method such as but not limited to casting, injection molding, machining, grinding, or plasma cutting, for example.

Referring to FIG. 12a, another aspect of the receiver assembly 1 comprises at least one attachment member 61 affixed to at least one surface of the elongated vertical box receiver 59 and may be attached to any adjacent components such as but not limited to the elongated horizontal box receiver 20 as illustrated in the example. The attachment member(s) 61 comprises a bar of any geometric shape or size with at least one aperture 61a being of a size and shape into which a fastener such as but not limited to a quick link can be placed, such as the triangular attachment member 61 illustrated in the example. The attachment member may increase the strength of the receiver assembly and can be affixed as a plate or fish-plate around an aperture(s) to strengthen a component. Typically, the attachment member(s) 61 is made of mild steel material. Alternatively, the attachment member(s) can be made of any suitable metallic or composite materials. Typically, the attachment member(s) is attached by welding. Alternatively, the attachment member(s) may be attached or integrated by any suitable method such as but not limited to casting, injection molding, machining, or bonding, for example. Typically, a fastener such as but not limited to a quick link or a tie down such as but not limited to a ratchet strap, for example, can be attached to the attachment member(s) 61 to secure cargo, cargo carriers, or cargo carrier accessories.

Referring to FIG. 12b, another aspect of the receiver assembly 1 comprises at least one reinforcement member 62, designed to increase the strength of the receiver assembly 1, attached to at least one surface of the elongated vertical box receiver 59 and attached to at least one adjacent component such as but not limited to the elongated horizontal box receiver 20 as illustrated in the example. The reinforcement member(s) 62 comprises a bar of any geometric shape and size to attach a plurality of adjacent surfaces together, such as the triangular reinforcement member 62 illustrated in the example. The reinforcement member may be attached as a fish-plate to strengthen components. Typically, the reinforcement member(s) 62 is made of mild steel material. Alternatively, the reinforcement member(s) can be made of any suitable metallic or composite materials. Typically, the reinforcement member(s) is attached by welding. Alternatively, the reinforcement member(s) may be attached or integrated by any suitable method such as but not limited to casting, injection molding, machining, or bonding, for example.

Figure 12D:
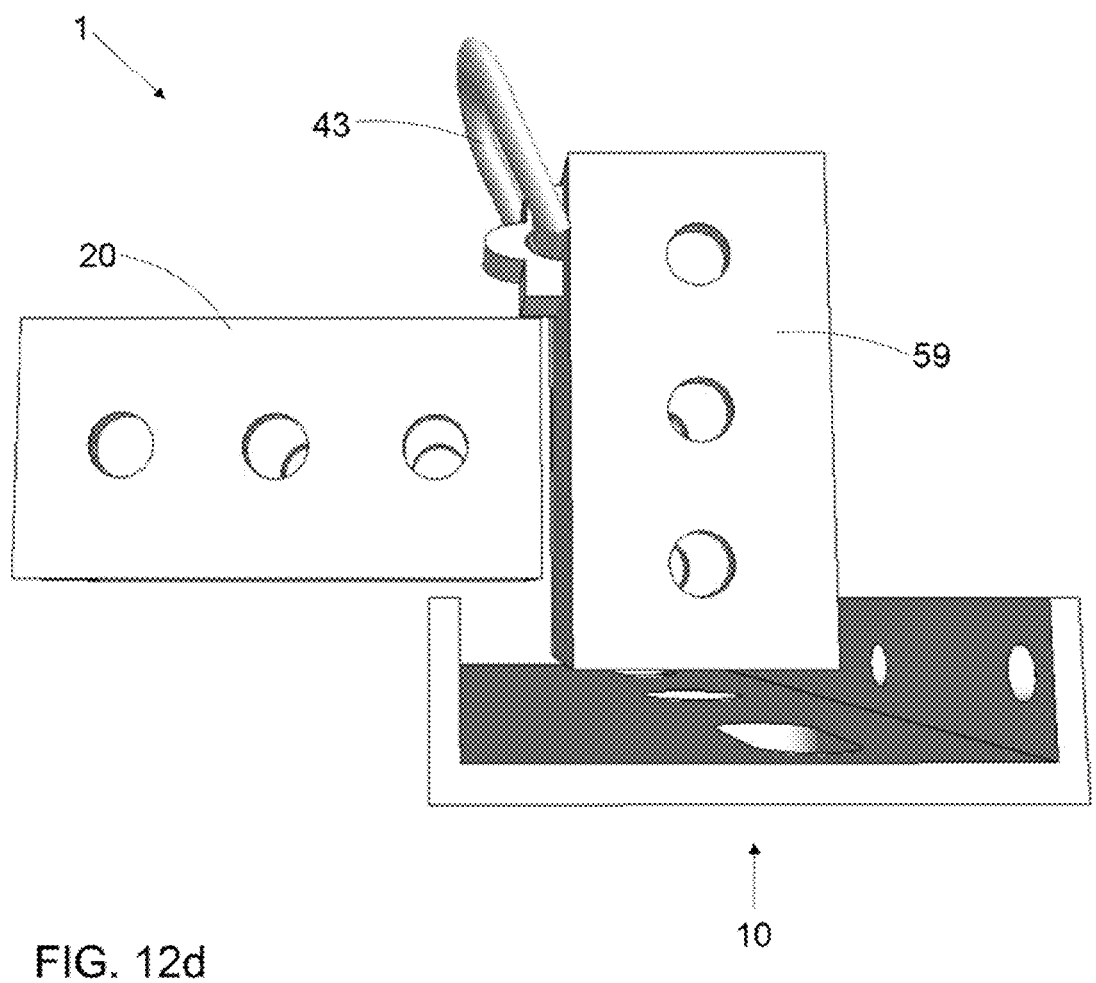

Referring to FIG. 12d, another aspect of the receiver assembly 1 comprises at least one cargo anchor point such as but not limited to a weld on type d-ring anchor attached to at least one side of the elongated vertical box receiver 59, with the illustrated example showing a weld on type d-ring anchor 43 attached to the rear vertical side. Typically, the cargo anchor point(s) is any suitable manufactured metal anchor component attached to the elongated vertical box receiver 59, which are readily available from a number of manufacturers. Alternatively, the cargo anchor point(s) may be made from any suitable material, such as but not limited to metallic or composite material, for example. The cargo anchor point may be any size and shape or combination of shapes, such as but not limited to a shackle tab, bent/shaped bar, or bent/shaped strap, for example. Typically, the cargo anchor point(s) is attached to the elongated vertical box receiver 59 by welding. Alternatively, the cargo anchor point(s) can be attached to or integrated with the elongated vertical box receiver 59 by but not limited to casting, injection molding, fasteners, or bonding, for example. Typically, a fastener such as but not limited to a quick link or a tie down such as but not limited to a ratchet strap, for example, can be attached to the cargo anchor point(s) to secure cargo, cargo carriers, or cargo carrier accessories.

Referring to FIGS. 13a-13d, another aspect of the receiver assembly 1 comprises at least one vertical anchor channel 65 attached to at least one the channel front leg 10c or the channel rear leg 10d of the channel mounting base 10, with the illustrated example being attached to the channel rear leg 10d. The vertical anchor channel 65 comprises a channel structure 65a with a u-shaped or bracket-shaped cross-section such as but not limited to C-Shaped American Standard Channel, with the channel structure 65a comprising a channel body 65b with a plurality of fastener apertures of any geometric shape and size, two parallel channel legs being a channel top leg 65c and channel bottom leg 65d, and a plurality of transverse aperture pairs 70 in the parallel channel legs 65c/65d with one aperture of the transverse aperture pair being on the channel top leg 65c and the second aperture of the transverse aperture pair being on the channel bottom leg 65d. The fastener apertures in the channel body 65b are of a shape and size into which a fastener such as but not limited to a bolt 66 can be placed and can be of any geometric shape such as but not limited to a round fastener aperture 65e (see FIGS. 13a-13c) or an elliptical fastener aperture 65g (see FIG. 13c), for example. In the examples, the channel body 65b of the vertical anchor channel 65 is attached perpendicular to a vertical surface of the channel rear leg 10d of the channel mounting base 10 with the channel top leg 65c and channel bottom leg 65d of the vertical anchor channel 65 being parallel to the parallel channel legs 10c/10d of the channel mounting base 10. A second vertical anchor channel 65 (see FIG. 13d) may be attached to the channel mounting base 10 so there is a vertical anchor channel 65 attached to each of the channel front leg 10c and channel rear leg 10d. The two vertical anchor channels 65 may be of similar shape and size such as the two illustrated in FIG. 13d, for example. Alternatively, the two vertical anchor channels 65 may be designed with different shapes and sizes. Typically, the channel structure 65a of the vertical anchor channel 65 is comprised of a single channel structure, such as the C-Shaped American Standard Channel mentioned above. Alternatively, the channel body 65b, channel top leg 65c, and channel bottom leg 65d of the channel structure 65a of the vertical anchor channel 65 may be constructed by any other suitable method and material, such as but not limited to individual metal components welded together or cast as a single integrated component, for example. Each of the two vertical anchor channels 65 may be made by different methods of construction and/or material, such as one vertical anchor channel 65 may be cast integrated with the channel mounting base 10 as a single component and the second vertical anchor channel 65 may be made from the C-Shaped American Standard Channel mentioned above and attached using fasteners, for example. The anchor channels 65 may be of any suitable size and shape. The vertical anchor channel(s) 65 may be attached to any adjacent components of the receiver assembly. The position of the fastener apertures 65e/65g in the channel body 65b of the vertical anchor channel 65 are typically designed to correspond to the position of a plurality of fastener apertures and/or transverse aperture pairs 18 in at least one of the channel front leg 10c and/or channel rear leg 10d of the channel mounting base 10, which allows, for example, a fastener such as but not limited to a receiver pin 19 (see FIG. 13a) to be passed through both apertures of a transverse aperture pair 18 in the parallel channel legs 10c/10d of the channel mounting base 10 and through a corresponding fastener aperture 65e/65g in the channel body 65b of the vertical anchor channel 65 and secured with a clip 19a. A fastener such as but not limited to a bolt, nut, and hardware, for example, can be used in place of the receiver pin 19 and clip 19a, which would also attach the vertical anchor channel(s) 65 to the channel mounting base 10. On the vertical anchor channel 65 a fastener such as but not limited to a receiver pin 71 (see FIG. 13a) is placed through a transverse aperture pair 70 and secured with hardware such as but not limited to a clip 71a, which provides an anchor point to attach another component or fastener such as but not limited to a quick link or to secure a tie down such as but not limited to a ratchet strap, for example, to secure cargo, cargo carriers, cargo carrier accessories, or tow-hitch accessories. Typically, at least one fastener and hardware such as but not limited to a receiver pin 71 and clip 71a is placed in any transverse aperture pair 70 of the vertical anchor channel 65. Alternatively, a plurality of fasteners and hardware are placed in a plurality of transverse aperture pairs 70. The receiver pin 71 and clip 71a may be replaced with another type of suitable fastener and hardware such as but not limited to a bolt and nut. Typically, the vertical anchor channel 65 is made of mild steel material. Alternatively, the vertical anchor channel 65 can be made of any suitable metallic or composite materials. Typically, the vertical anchor channel 65 is attached by fasteners. Alternatively, the vertical anchor channel 65 may be attached or integrated by any suitable method such as but not limited to welding, casting, injection molding, machining, or bonding, for example. Typically, the fastener apertures are cut by but not limited to using a water jet cutting machine. Alternatively, the fastener apertures can be made by any suitable method such as but not limited to casting, injection molding, drilling, machining, or plasma cutting, for example.

Referring to FIGS. 13a-13d, another aspect of the receiver assembly 1 comprises a plurality of fastener apertures in at least one of the channel front leg 10c and/or channel rear leg 10d of the channel mounting base 10 and being of a size and shape into which a fastener such as but not limited to a bolt 66 and nut 66a, for example, can be placed to attach the vertical anchor channel 65 to at least one of the parallel channel legs 10c/10d. The fastener apertures can be of any geometric shape and size such as but not limited to a circular fastener aperture 63 (see FIGS. 13a and 13c) or an elliptical fastener aperture 63a (see FIGS. 13c and 13d), for example. The vertical anchor channel 65 can be attached to the channel mounting base 10 by a plurality of fasteners such as but not limited to bolts 66 placed through a plurality of fastener apertures 65e/65g in the channel body 65b and through corresponding fastener apertures 63/63a in at least one of the parallel channel legs 10c/10d, and secured with nuts 66a and any additional fastener hardware such as but not limited to a washer, for example. A fastener such as but not limited to a suitable length of bolt can be placed through any combination of fastener apertures 63/63a or transverse aperture pairs 18 in the parallel channel legs 10c/10d of the channel mounting base 10 and any corresponding fastener apertures 65e/65g in the channel body 65b of the vertical anchor channel 65 to attach the components together. Typically, the fastener apertures are cut using a machine such as but not limited to a water jet cutting machine. Alternatively, the transverse aperture pair(s) can be made by any suitable tool or method such as but not limited to casting, injection molding, drilling, machining, or plasma cutting, for example.

Figure 13A:
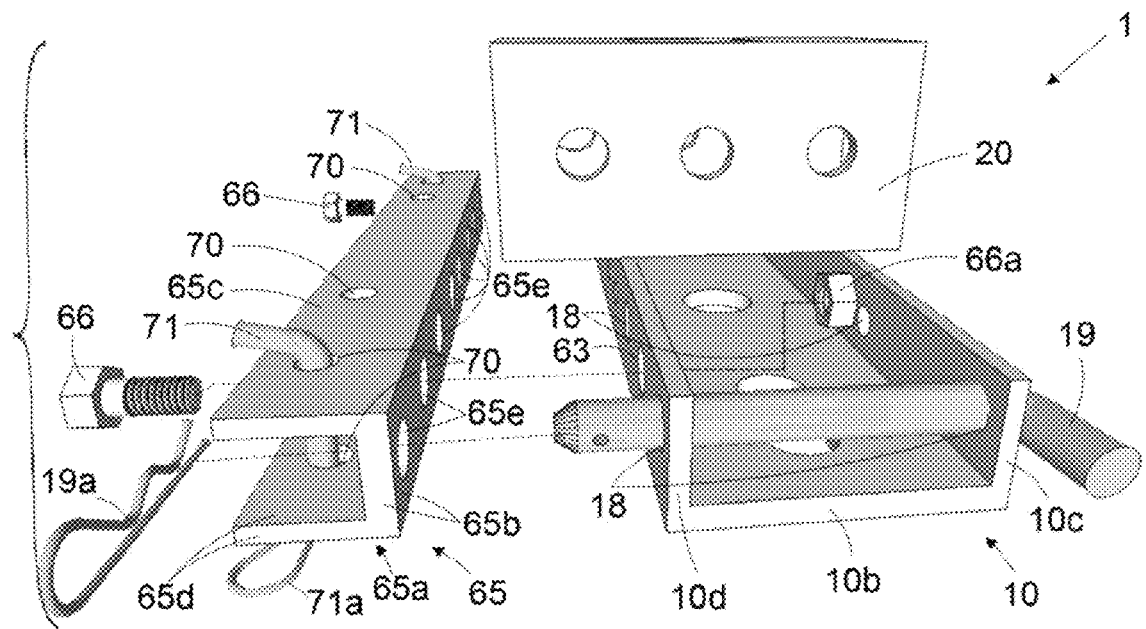
FIG. 13*a* is an exploded perspective view of the present invention showing a vertical anchor channel attached to the channel rear leg of the channel mounting base, and also showing the position of fastener apertures in both the vertical anchor channel and parallel channel legs of the channel mounting base, and also showing bolts and nut attaching the vertical anchor channel to the channel rear leg of the channel mounting base, and also showing receiver pins and clips placed in transverse aperture pairs in both the vertical anchor channel and channel mounting base to provide cargo anchor points.
Figure 13B:
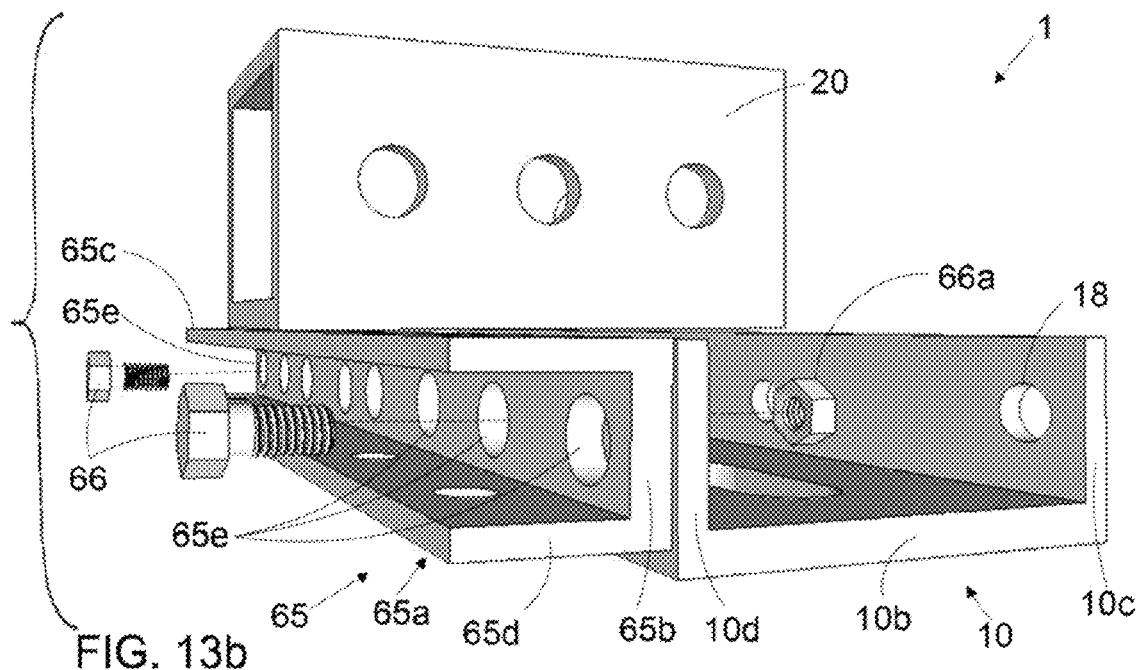
FIG. 13*b* is a perspective view of the present invention showing the position of fastener apertures in the channel body of the vertical anchor channel and showing bolts and nut attaching the vertical anchor channel to the channel rear leg of the channel mounting base.
Figure 13C:
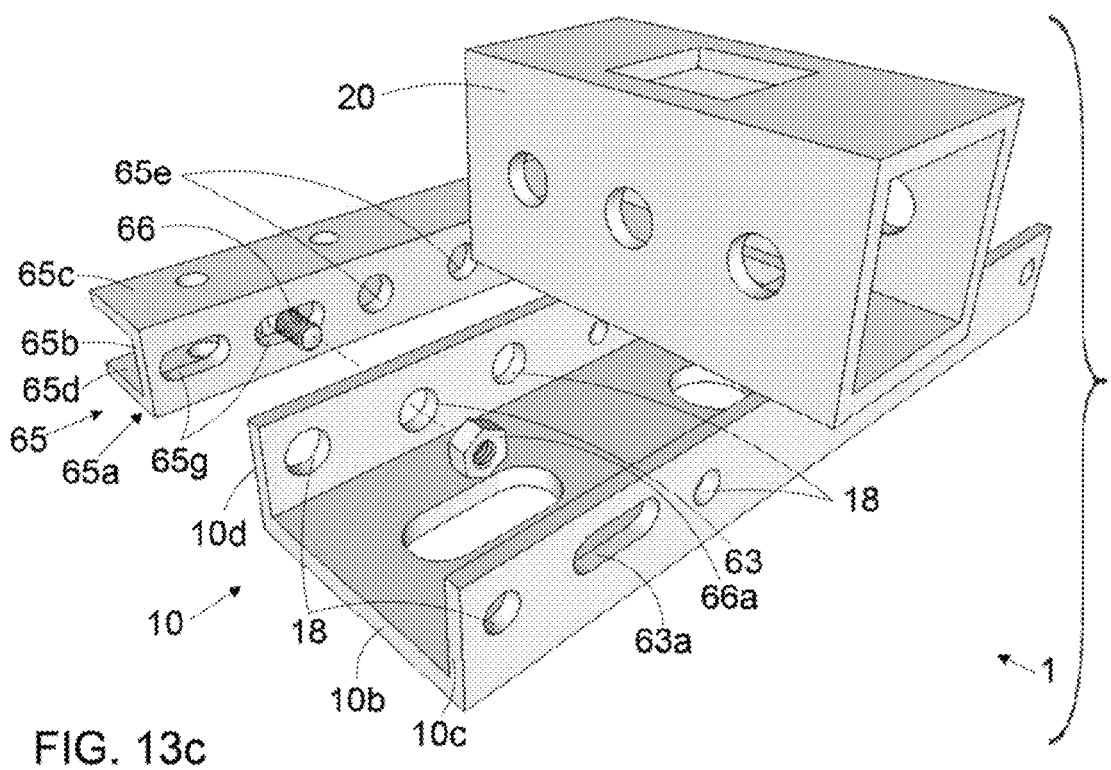
FIG. 13*c* is an exploded perspective view of the present invention showing the position of circular and acircular fastener apertures in the channel body of the vertical anchor channel and in the parallel channel legs of the channel mounting base, and also showing a bolt and nut attaching the vertical anchor channel to the channel rear leg of the channel mounting base.
Figure 13D:
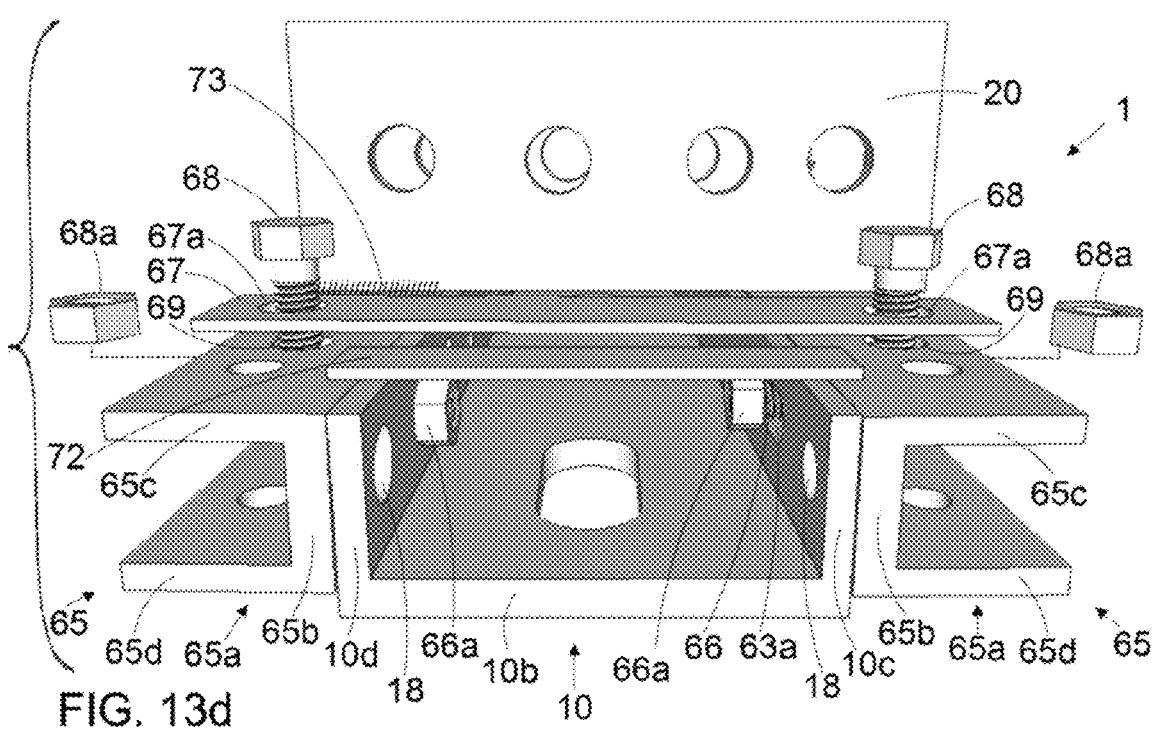
FIG. 13*d* is a side perspective view showing the present invention with two vertical anchor channels attached to the channel mounting base, and also showing a brace member with apertures attached by bolts and nuts between the two vertical anchor channels, and also showing a brace member attached between the two vertical anchor channels by a method such as welding, and also showing a surface of one of the vertical anchor channels attached to the elongated horizontal box receiver by a method such as welding.

Referring to FIG. 13d, another aspect of the receiver assembly 1 comprises two of the vertical anchor channels 65 previously described with one being attached to the channel front leg 10c and the other being attached to the channel rear leg 10d of the channel mounting base 10, along with a plurality of brace members 67 designed to increase the strength of the receiver assembly 1 by attaching the two channel top legs 65c of the two vertical anchor channels 65 together. The brace members 67 comprise a bar of a size and shape to attach two of the vertical anchor channels 65 to each other, with at least one fastener aperture 67a in each end of the bar and with the fastener apertures 67a being of a size and shape into which a fastener such as but not limited to a bolt 68 can be placed. The brace members 67 and fastener apertures 67a can be of any suitable size and shape. There is a plurality of fastener apertures 69 in the channel top leg 65c of both the first and second vertical anchor channels 65 and being of a size and shape into which a fastener such as bolt 68 can be placed. The fastener apertures 69 in the channel top legs 65c can be of any suitable size and shape. The first and second vertical anchor channels 65 are attached together by fasteners such as bolts 68 placed through a fastener aperture 67a in each end of a brace member 67 and through a corresponding aperture 69 in each of the channel top legs 65c of the two vertical anchor channels 65 and secured with hardware such as but not limited to nuts 68a, for example. Typically, the brace members 67 are made of mild steel material. Alternatively, the brace members 67 can be made of any suitable metallic or composite materials. Typically, the fastener apertures 67a in the brace members 67 and the fastener apertures 69 in the vertical anchor channels 65 are cut using a machine such as but not limited to a water jet cutting machine. Alternatively, the fastener apertures can be made by any suitable tool or method such as but not limited to casting, injection molding, drilling, machining, or plasma cutting, for example.

Referring to FIG. 13d, another aspect of the receiver assembly 1 comprises two of the vertical anchor channels 65 previously described with one being attached to the channel front leg 10c and the other being attached to the channel rear leg 10d of the channel mounting base 10, along with a plurality of brace members 72 designed to increase the strength of the receiver assembly 1 by attaching the two channel top legs 65c of the two vertical anchor channels 65 together. The brace members 72 comprising a bar of a size and shape to connect two of the vertical anchor channels 65 to each other. The brace members 72 can be of any geometric shape and size. Typically, the brace members 72 are made of mild steel material. Alternatively, the brace members 72 can be made of any suitable metallic or composite materials. Typically, the brace members 72 are attached by welding. Alternatively, the brace members 72 may be attached or integrated by any suitable method such as but not limited to casting, injection molding, or bonding, for example.

Referring to FIG. 13d, another aspect of the receiver assembly 1 comprises at least one surface of the elongated horizontal box receiver 20 is attached to an adjacent surface of a vertical anchor channel 65 as indicated, for example, by the hash marks 73 on the illustration. Typically, the components are attached together by welding. Alternatively, the components may be attached or integrated by any suitable method such as but not limited to casting, injection molding, or bonding, for example.

Figure 13E:
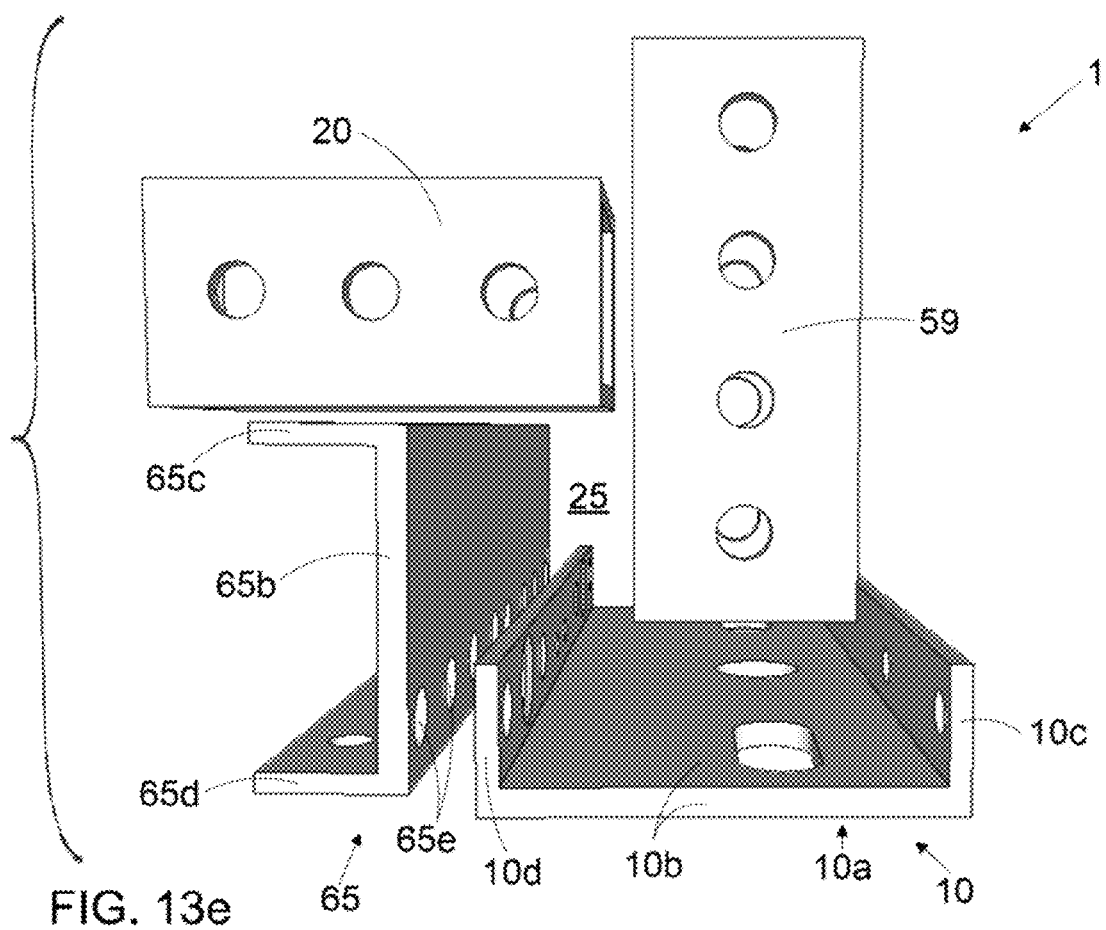
FIG. 13*e* is an exploded side perspective view of the present invention showing the elongated horizontal box receiver attached to intermediate components between the channel mounting base and elongated horizontal box receiver, with the illustrated intermediate components being the vertical anchor channel that is extending above the top surface of the channel rear leg of the channel mounting base and the elongated vertical box receiver attached to the channel mounting base, and also showing the acircular horizontal aperture being defined by the space between the elongated horizontal box receiver, elongated vertical box receiver, channel body of the channel mounting base, channel rear leg of the channel mounting base, and vertical anchor channel.

Referring to FIG. 13e, another aspect of the receiver assembly 1 comprises the elongated horizontal box receiver 20 is attached to intermediate components between the channel mounting base 10 and elongated horizontal box receiver 20, with the intermediate components being the elongated vertical box receiver 59 and a vertical anchor channel 65 that extends above the top surface of the channel rear leg 10d of the channel mounting base 10. The acircular horizontal aperture 25 is defined by the space between the elongated vertical box receiver 59, channel body 10b, channel rear leg 10d, vertical anchor channel 65, and elongated horizontal box receiver 20. The acircular horizontal aperture 25 may or may not be positioned over a fastener mounting aperture in the channel body of the horizontal channel structure 10a. Typically, the components are attached together by welding. Alternatively, the components may be attached or integrated by any suitable method such as but not limited to fasteners, casting, injection molding, or bonding, for example.

Figure 14A:
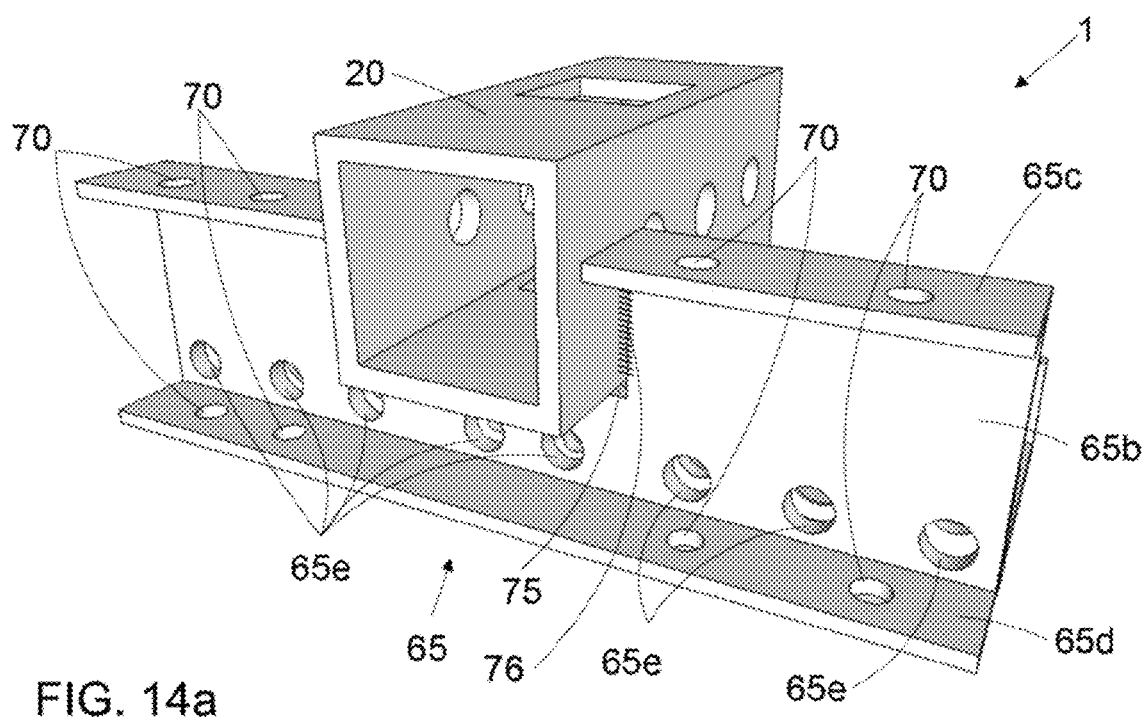
FIGS. 14*a*-14*c* are perspective views of the present invention showing the elongated horizontal box receiver partially recessed in a notch in the vertical anchor channel that is attached to the channel rear leg of the channel mounting base; with FIG. 14*a* also showing a surface of the elongated horizontal box receiver that is recessed in the notch being attached by a method such as welding the adjacent surfaces together; with FIG. 14*b* also showing an attachment member affixed to a narrow vertical anchor channel and to the adjacent elongated horizontal box receiver; and with FIG. 14*c* also showing an attachment member affixed to the right end of the vertical anchor channel, and showing a reinforcement member affixed to the left end of the vertical anchor channel, and also showing an attachment member affixed to the channel mounting base.
Figure 14B:
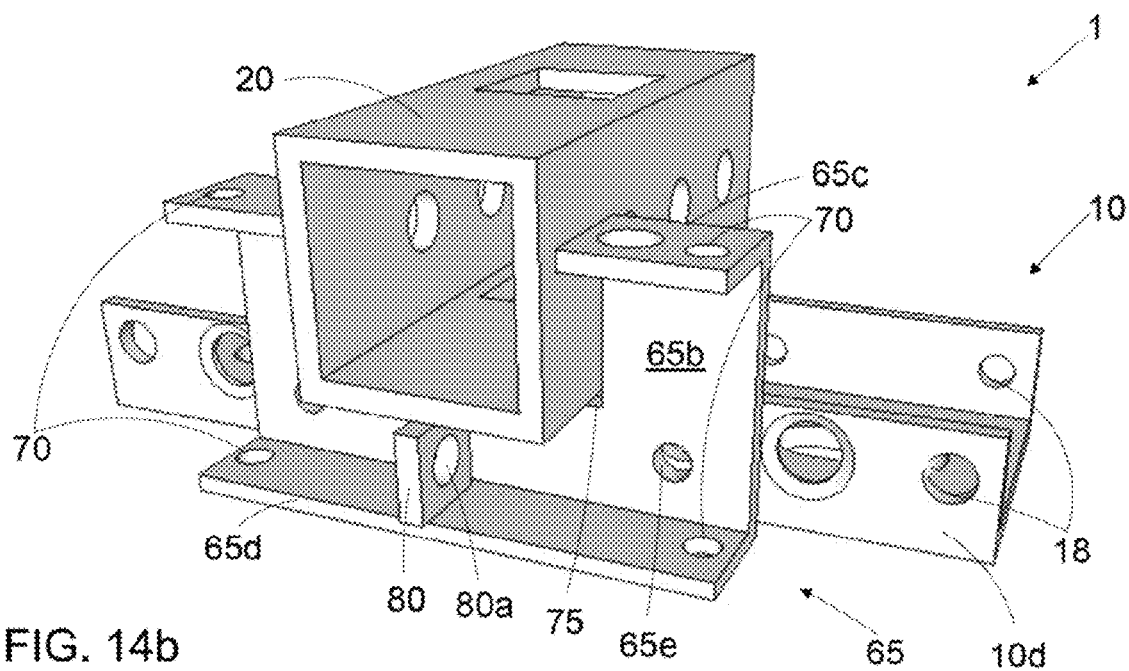
Figure 14C:
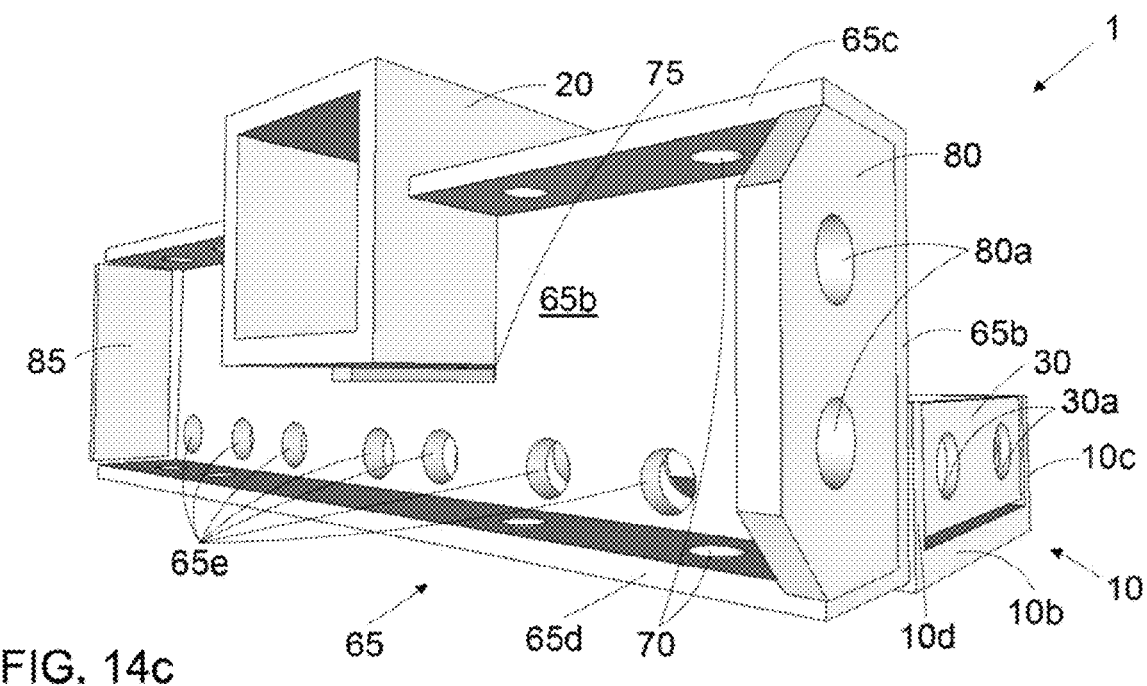

Referring to FIGS. 14a-14c, another aspect of the receiver assembly 1 comprises a notch 75 beginning in the top horizontal surface of the channel top leg 65c of the vertical anchor channel 65 and extending down into the channel body 65b towards the channel bottom leg 65d with the notch 75 being of a size and shape that the elongated horizontal box receiver 20 of the receiver assembly 1 is at least partially recessed within the notch 75, and the channel body 65b and channel top leg 65c of vertical anchor channel 65 can extend above the top surface of the attached channel rear leg 10d of the channel mounting base 10. Typically, the notch is cut into the vertical anchor channel 65 using a machine such as but not limited to a water jet cutting machine. Alternatively, the notch can be made or integrated by any suitable tool or method such as but not limited to casting, injection molding, machining, or plasma cutting, for example. Typically, the portion of the elongated horizontal box receiver 20 that is recessed in the notch 75 is not connected to the vertical anchor channel 65. Alternatively, the elongated horizontal box receiver 20 may be attached to or integrated with the vertical anchor channel by any suitable method such as but not limited to welding, casting, injection molding, machining, fasteners, or bonding, for example.

Referring to FIG. 14a, another aspect of the receiver assembly 1 comprises at least one surface of the portion of the elongated horizontal box receiver 20 that is recessed in the notch 75 in the vertical anchor channel 65 is attached to at least one adjacent surface of the vertical anchor channel 65 as indicated, for example, by the hash marks 76 on the illustration. Typically, the recessed portion of the elongated horizontal box receiver 20 attached to the vertical anchor channel 65 is attached by welding. Alternatively, the elongated horizontal box receiver 20 may be attached to the vertical anchor channel by any suitable method such as but not limited to casting, injection molding, machining, fasteners, or bonding, for example.

Referring to FIGS. 14b and 14c, another aspect of the receiver assembly 1 comprises at least one attachment member 80 affixed to at least one surface of the vertical anchor channel 65 and may be affixed to any adjacent components such as but not limited to the elongated horizontal box receiver 20 (see FIG. 14b) with the attachment member(s) 80 comprising a bar of any geometric shape and size or any combination of geometric shapes, with at least one fastener aperture 80a being of a size and shape into which a fastener such as but not limited to a quick link can be placed. Typically, the attachment member 80 is affixed between the channel top leg 65c, channel body 65b, and channel bottom leg 65d. Alternatively, the attachment member 80 can be affixed as a plate or fish-plate around an aperture(s) to strengthen a component. The attachment member may increase the strength of the receiver assembly. Typically, the attachment member(s) 80 is made of mild steel material. Alternatively, the attachment member(s) can be made of any suitable metallic or composite materials. Typically, the attachment member(s) is affixed by welding. Alternatively, the attachment member(s) may be affixed or integrated by any suitable method such as but not limited to casting, injection molding, or bonding, for example. Typically, a fastener such as but not limited to a quick link or a tie down such as but not limited to a ratchet strap, for example, can be attached to the attachment member(s) to secure cargo, cargo carriers, or cargo carrier accessories.

Referring to FIG. 14c, another aspect of the receiver assembly 1 comprises at least one reinforcement member 85, designed to increase strength, attached to at least one surface of the vertical anchor channel 65 and may be attached to any adjacent components, with the reinforcement member(s) 85 comprising a bar of any geometric shape and size or any combination of geometric shapes. Typically, the reinforcement member 85 is affixed between the channel top leg 65c, channel body 65b, and channel bottom leg 65d. Alternatively, the reinforcement member 85 can be affixed as a plate or fish-plate to strengthen a component. Typically, the reinforcement member(s) is made of mild steel material. Alternatively, the reinforcement member(s) can be made of any suitable metallic or composite materials. Typically, the reinforcement member(s) is attached by welding. Alternatively, the reinforcement member(s) may be attached or integrated by any suitable method such as but not limited to casting, injection molding, or bonding, for example.

Figure 15:
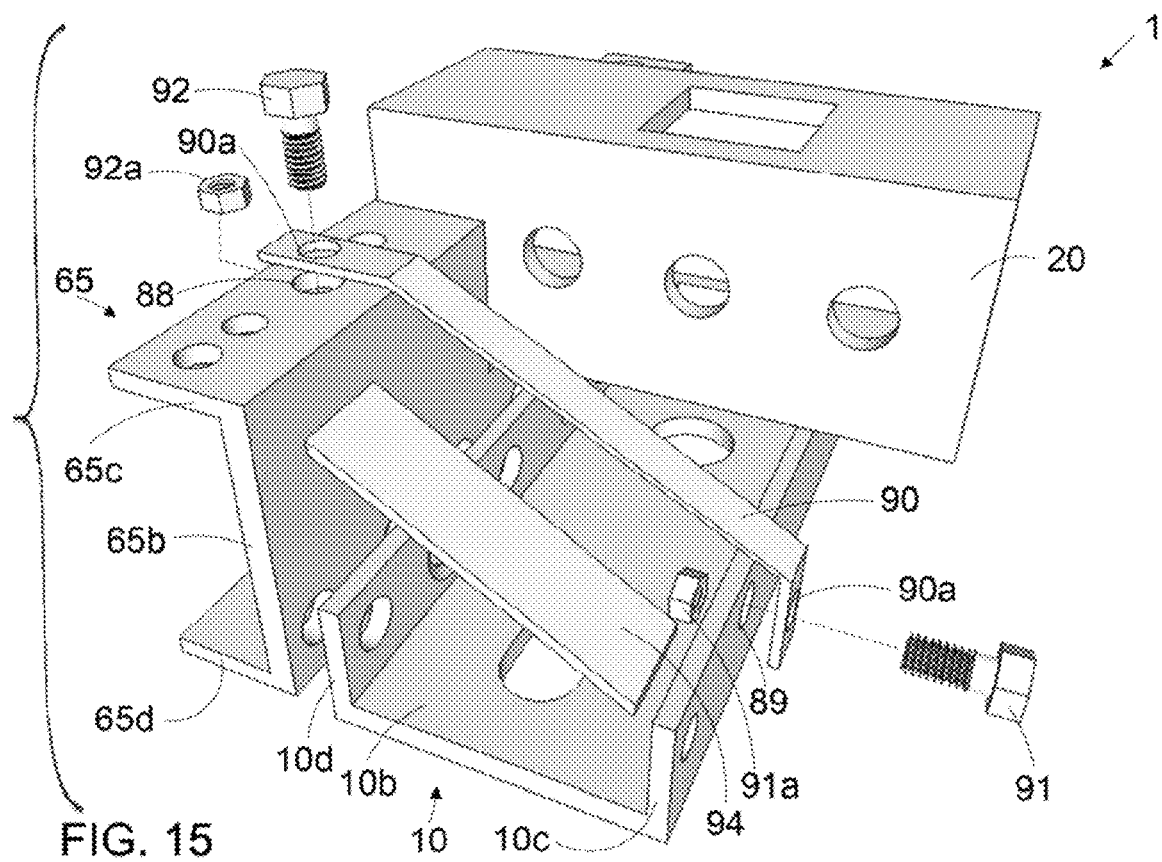
FIG. 15 is an exploded perspective view of the present invention showing a brace member with fastener apertures attached with bolts and nuts between the channel top leg of the vertical anchor channel and the channel front leg of the channel mounting base, and also showing a brace member without apertures attached at an angle between the vertical anchor channel and channel mounting base.

Referring to FIG. 15, another aspect of the receiver assembly 1 comprises a plurality of fastener apertures 88 in the channel top leg 65c of the vertical anchor channel 65 into which a fastener such as but not limited to a bolt 92 can be placed, a plurality of fastener apertures 89 in at least one of the parallel channel legs 10c/10d of the channel mounting base 10 into which a fastener such as but not limited to a bolt 91 can be placed, and a plurality of brace members 90 designed to increase the strength of the receiver assembly 1, with at least one fastener aperture 90a in each end of the brace members 90, and the brace members 90 being of a size and shape to connect one of the parallel channel legs 10c/10d of the channel mounting base 10 to the channel top leg 65c of the vertical anchor channel 65. The illustrated example of the brace member 90 comprises a bar attached to a vertical surface of the channel front leg 10c of the channel mounting base 10, angling towards and extending to the top edge of the channel top leg 65c of the vertical anchor channel 65, angling to extend along and being attached to the top horizontal surface of the channel top leg 65c of the vertical anchor channel 65, and the brace member 90 has a fastener aperture 90a in each end to align with a fastener aperture 89 in the channel front leg 10c and a fastener aperture 88 in the channel top leg 65c. The brace member 90 is attached to the channel top leg 65c with a bolt 92 placed through apertures 90a and 88 and secured with a nut 92a. The brace member 90 is also attached to the channel front leg 10c with a bolt 91 placed through apertures 90a and 89 and secured with a nut 91a. Alternatively to the illustrated example, the brace member 90 may be of any geometric shape and size, or combination of geometric shapes suitable to connect one of the parallel channel legs 10c/10d of the channel mounting base 10 to the channel top leg 65c of the vertical anchor channel 65. Typically, the brace members 90 are constructed from a single bar of mild steel material shaped by bending. Alternatively, the brace members may be made of any suitable metallic or composite materials. Alternatively to being shaped by bending, the brace members may be constructed by but not limited to several individual bars welded together, or may be constructed by but not limited to a single cast, injection molded, or machined component, for example. Typically, the fastener apertures 89 in the parallel channel leg(s) 10c/10d, fastener apertures 88 in the vertical anchor channel 65, and fastener apertures in the brace members 90 are cut using a machine such as but not limited to a water jet cutting machine. Alternatively, the fastener apertures can be made by any suitable tool or method such as but not limited to casting, injection molding, drilling, machining, or plasma cutting, for example. Typically, the brace members are attached with a bolt and nut. Alternatively, the brace members may be attached by any other suitable types of fasteners and hardware or welding, for example.

Referring to FIG. 15, another aspect of the receiver assembly 1 comprises a plurality of brace members 94 designed to increase the strength of the receiver assembly 1 and being of a size and shape to connect the vertical anchor channel 65 to the channel mounting base 10, with the brace members 94 comprising a typically rectangular shaped bar attached at an angle between the channel mounting base 10 and the vertical anchor channel 65. Alternatively, the typically rectangular shaped bar of the brace members 94 may be of any geometric shape and size, or any combination of geometric shapes. Typically, the brace members 94 are made of mild steel material. Alternatively, the brace members 94 can be made of any suitable metallic or composite materials. Typically, the brace members 94 are attached to the vertical anchor channel 65 and channel mounting base 10 by welding. Alternatively, the brace members 94 may be attached or integrated by but not limited to casting, injection molding, or bonding, for example.

Figures 16A, 16B:
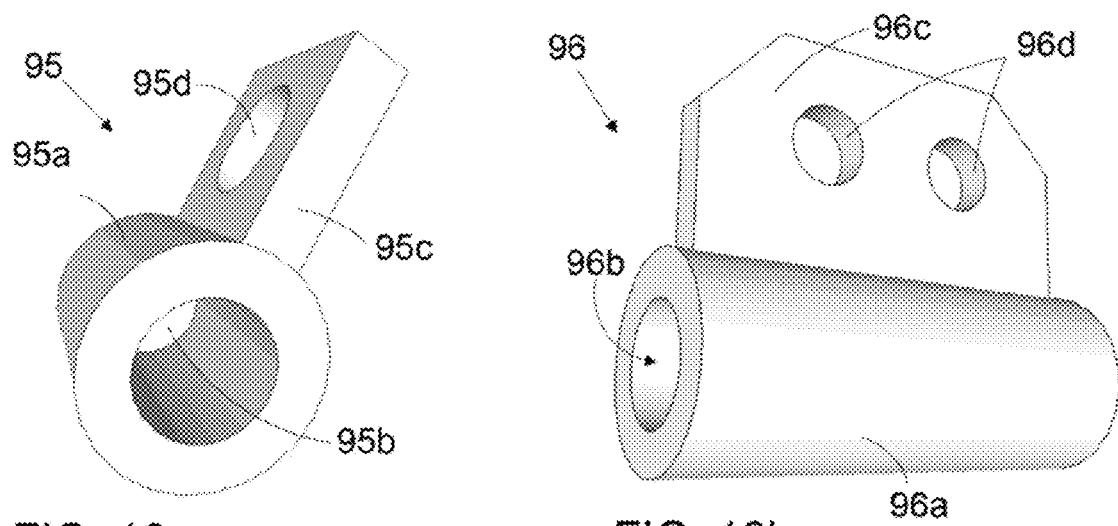
FIGS. 16*a*-16*b* are perspective views of the present invention showing two examples of the design of a pivoting bolt sleeve anchor, with FIG. 16*a* showing a pivoting bolt sleeve anchor designed with one fastener aperture in the attachment member, and with FIG. 16*b* showing a pivoting bolt sleeve anchor designed with two fastener apertures in the attachment member along with the corners being shaped by angling.
Figure 16C:
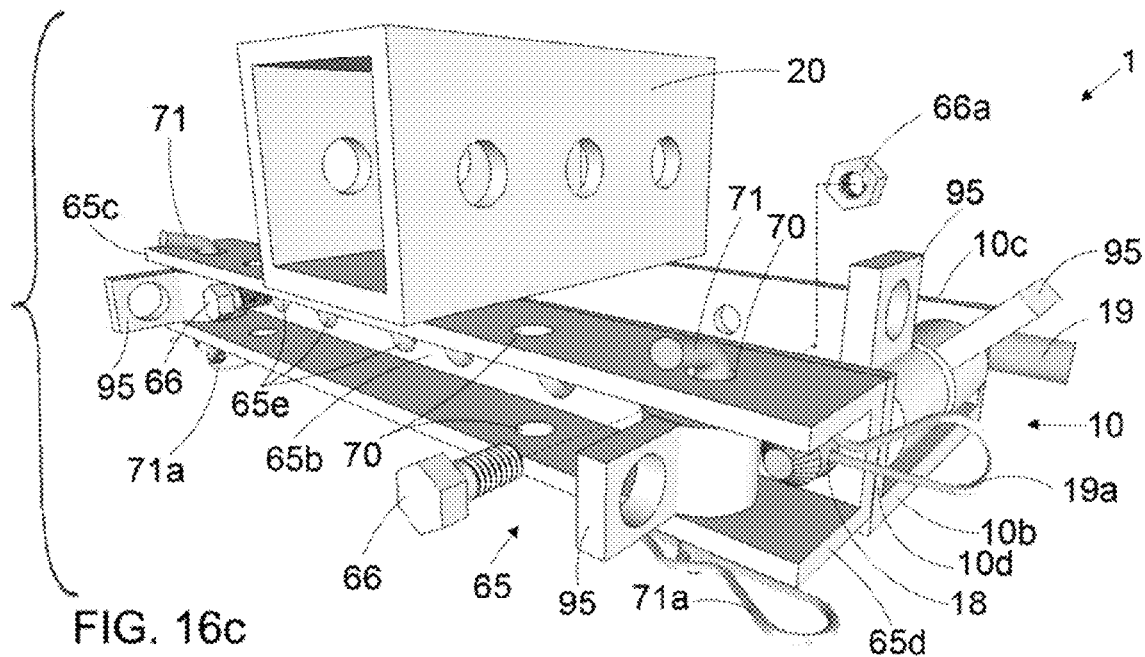
FIGS. 16*c*-16*d* are perspective views of the present invention showing pivoting bolt sleeve anchors placed between transverse aperture pairs in the parallel channel legs of the channel mounting base, and also showing pivoting bolt sleeve anchors placed between transverse aperture pairs in the parallel channel legs of the vertical anchor channel, with the pivoting bolt sleeve anchors attached using receiver pins and clips as examples of suitable types of fasteners.
Figure 16D:
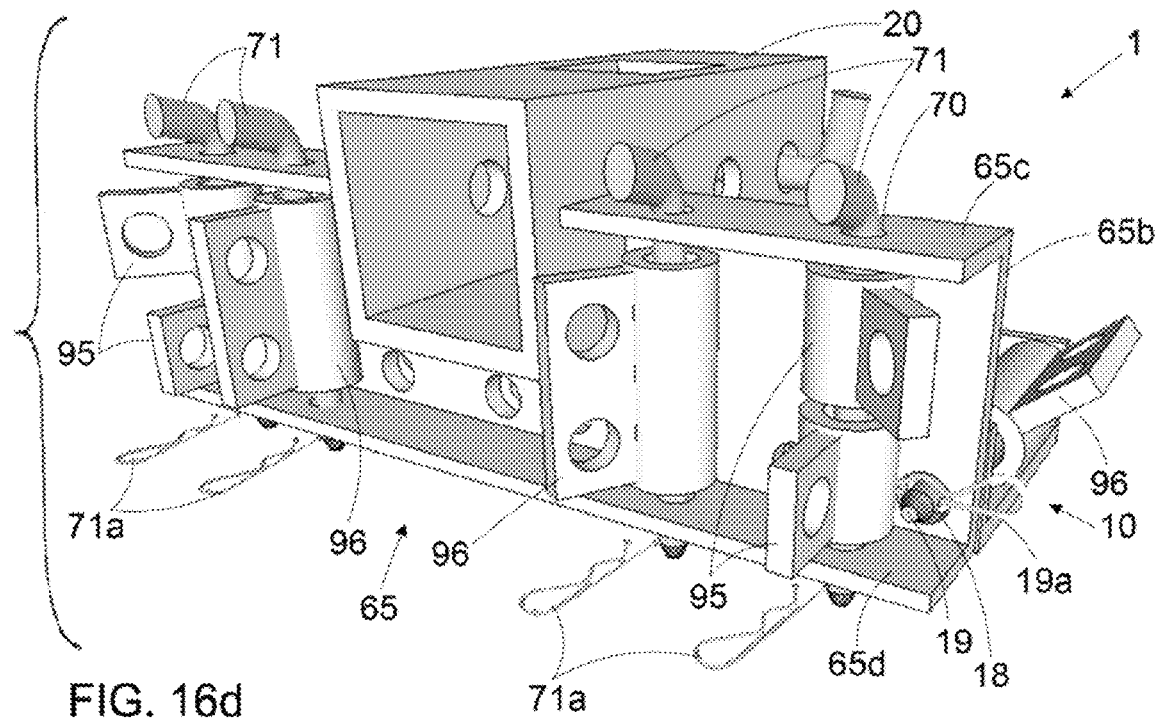

Referring to FIGS. 16a-16b, two examples of a pivoting bolt sleeve anchor are illustrated and described. The pivoting bolt sleeve anchors described here will be used in aspects of the invention discussed later. The pivoting bolt sleeve anchor 95 illustrated in FIG. 16a comprises a cylindrical bolt sleeve 95a with a cylindrical aperture 95b and at least one attachment member 95c with one fastener aperture 95d, with the attachment member(s) 95c being affixed perpendicular to the outer surface of the cylindrical bolt sleeve 95a. The cylindrical bolt sleeve 95a can be of any suitable geometric shape or size. The attachment member 95c can be of any suitable geometric shape and size, or any combination of geometric shapes. The pivoting bolt sleeve anchor 96 illustrated in FIG. 16b comprises a cylindrical bolt sleeve 96a with a cylindrical aperture 96b and at least one attachment member 96c with two fastener apertures 96d, with the attachment member(s) 96c being affixed perpendicular to the outer surface of the cylindrical bolt sleeve 96a. The cylindrical bolt sleeve 96a can be of any suitable geometric shape or size. The attachment member 96c can be of any suitable geometric shape and size, or any combination of geometric shapes. The design of the pivoting bolt sleeve anchor is not limited to the two illustrated examples and other designs may include a plurality of fastener apertures in any position in the attachment member of the pivoting bolt sleeve anchor. Typically, the attachment member 95c/96c is attached parallel to the central axis of the cylindrical aperture 95b/96b, as is illustrated in the examples. Alternatively, one or more attachment members 95c/96c may be attached at any angle in relation to the central axis of the cylindrical aperture 95b/96b. If two or more attachment members are affixed to one cylindrical bolt sleeve, each attachment member may be affixed parallel, perpendicular, or at any angle in relation to one another. As illustrated in the example in FIG. 16b, the attachment member of a pivoting bolt sleeve anchor may be shaped such as but not limited to angling the corners. Typically, the attachment member of a pivoting bolt sleeve anchor may be shaped to reduce right-angle corners. Alternatively, the attachment member of a pivoting bolt sleeve anchor may be shaped for aesthetics. Typically, the pivoting bolt sleeve anchors are made of mild steel material. Alternatively, the pivoting bolt sleeve anchors can be made of any suitable metallic or composite materials. The attachment member is typically affixed to the cylindrical bolt sleeve by welding. Alternatively, the pivoting bolt sleeve anchor may be constructed by bonding individual components together, or made as a single integrated component such as but not limited to casting, injection molding, or machining, for example. The pivoting bolt sleeve anchors may be of any suitable geometric shape and size, or any combination of geometric shapes.

Referring to FIGS. 16a-16d, another aspect of the receiver assembly 1 comprises at least one pivoting bolt sleeve anchor 95/96 (see FIGS. 16a and 16b) being of a size and shape that at least one can be placed between a transverse aperture pair 18 (see FIGS. 16c and 16d) of the channel front leg 10c and channel rear leg 10d of the channel mounting base 10 and attached by a fastener such as but not limited to a retainer pin 19 inserted through both apertures of a transverse aperture pair 18 and through the cylindrical aperture 95b/96b of the pivoting bolt sleeve anchor(s) 95/96 and secured with clip 19a. A fastener and hardware such as but not limited to a bolt and nut, for example, can be used in place of the retainer pin 19 and clip 19a. The pivoting bolt sleeve anchors 95/96 may be of any suitable geometric shape and size, or any combination of geometric shapes.

Referring to FIGS. 16a-16d, another aspect of the receiver assembly 1 comprises at least one pivoting bolt sleeve anchor 95/96 (see FIGS. 16a and 16b) being of a size and shape that at least one can be placed between a transverse aperture pair 70 (see FIGS. 16c and 16d) of the channel top leg 65c and channel bottom leg 65d of the vertical anchor channel 65 and attached by a fastener such as but not limited to a retainer pin 71 inserted through both apertures of a transverse aperture pair 70 and through the cylindrical aperture 95b/96b of the pivoting bolt sleeve anchor(s) 95/96 and secured with clip 71a. A fastener and hardware such as but not limited to a bolt and nut can be used in place of the retainer pin 71 and clip 71a. The pivoting bolt sleeve anchors 95/96 may be of any suitable geometric shape and size, or any combination of geometric shapes.

Figure 17:
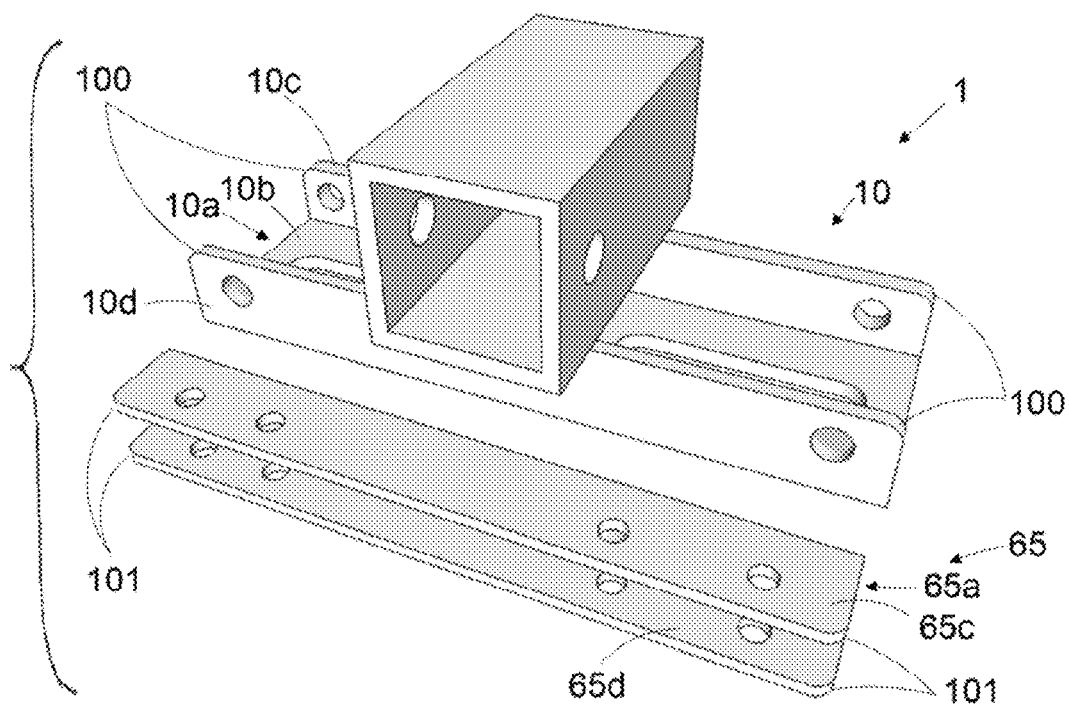
FIG. 17 is an exploded perspective view of the present invention showing the corners of the parallel channel legs of the channel mounting base shaped by curving, and also showing the corners of the parallel channel legs of the vertical anchor channel shaped by curving.

Referring to FIG. 17, another aspect of the receiver assembly 1 comprises shaping such as but not limited to curving 100, angling, or any geometric design along at least one component of the horizontal channel structure 10a, with the illustrated example showing the corners of both the channel front leg 10c and channel rear leg 10d being shaped by curving. Typically, the components are shaped using a machine such as but not limited to a water jet cutting machine. Alternatively, the components can be shaped by any suitable tool or method such as but not limited to casting, injection molding, machining, or plasma cutting, for example. The components are typically shaped to reduce right-angle corners. Alternatively, the corners may be shaped for aesthetics.

Referring to FIG. 17, another aspect of the receiver assembly 1 comprises shaping such as but not limited to curving 101, angling, or any geometric design along at least one component of the channel structure 65a, with the illustrated example showing the corners of both the channel top leg 65c and channel bottom leg 65d being shaped by curving. Typically, the components of the channel structure 65a of the vertical anchor channel 65 are shaped using a machine such as but not limited to a water jet cutting machine. Alternatively, the components can be shaped by any suitable tool or method such as but not limited to casting, injection molding, machining, or plasma cutting, for example. The components are typically shaped to reduce right-angle corners. Alternatively, the components may be shaped for aesthetics.

Figure 18:
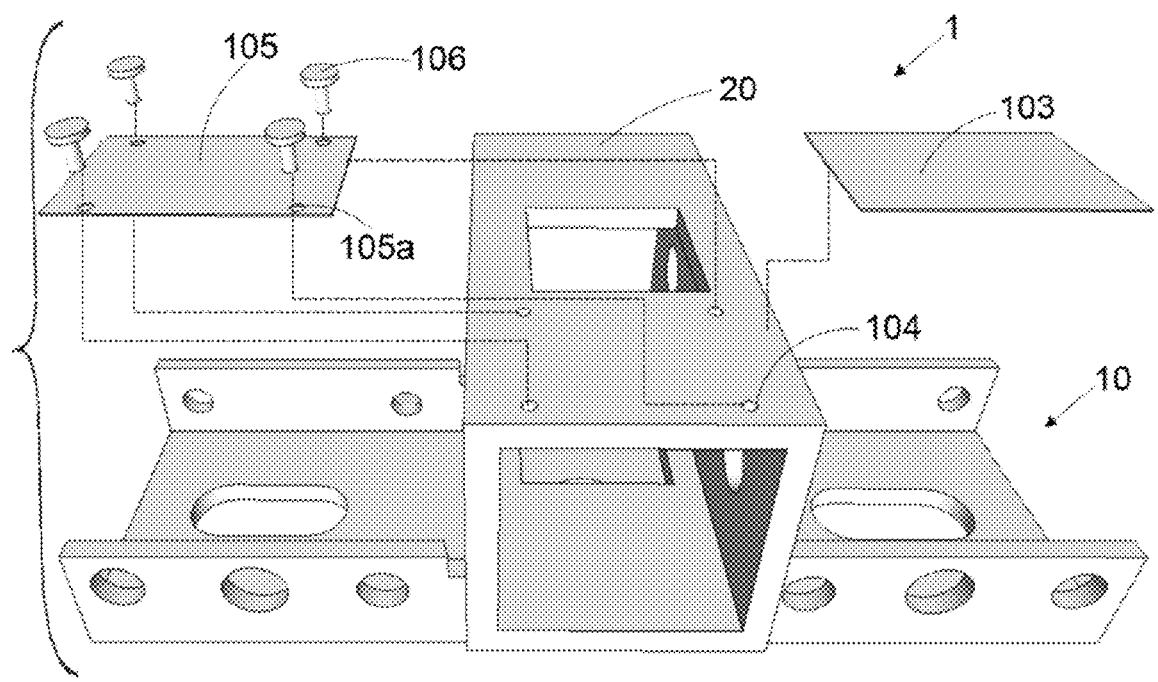
FIG. 18 is an exploded perspective view of the present invention showing a solid data plate attached such as by bonding to the elongated horizontal box receiver, and also showing an alternative data plate with fastener apertures and being attached to corresponding fastener apertures in the elongated horizontal box receiver using rivets.

Referring to FIG. 18, another aspect of the receiver assembly 1 comprises a data plate 103 being of a size and shape to be attached to a surface of the elongated horizontal box receiver 20. Typically, the data plate 103 is attached by welding. Alternatively, the data plate 103 may be attached or integrated by any suitable method, such as but not limited to bonding, casting, injection molding, machining, or fasteners, for example. Typically, the data plate 103 is made of mild steel material. Alternatively, the data plate 103 can be made of any suitable metallic, composite, or plastic materials.

Referring to FIG. 18, another aspect of the receiver assembly 1 comprises a data plate 105 being of a size and shape to be attached to a surface of the elongated horizontal box receiver 20. The data plate 105 has at least one fastener aperture 105a (with four fastener apertures 105a shown in the illustrated example) and there is at least one corresponding aperture 104 (with four fastener apertures 104 shown in the illustrated example) in the elongated horizontal box receiver 20, with the aperture(s) 105a/104 being of a size and shape to place a fastener such as but not limited to a rivet 106 to attach the data plate 105 to the elongated horizontal box receiver 20. The fastener aperture(s) 105a can be at any position in the data plate 105. The fastener aperture(s) 104 can be at any position in the elongated horizontal box receiver 20. Typically, the fastener apertures are cut using a machine such as but not limited to a water jet cutting machine. Alternatively, the fastener apertures can be made by any suitable tool or method such as but not limited to casting, injection molding, drilling, machining, or plasma cutting, for example. Typically, the data plate 105 is attached by a fastener(s). Alternatively, the data plate 105 may be attached by but not limited to bonding or welding, or a combination of fastener(s) and bonding or welding, for example. Typically, the data plate 105 is made of mild steel material. Alternatively, the data plate 105 can be made of any suitable metallic, composite, or plastic materials.

Figure 19:
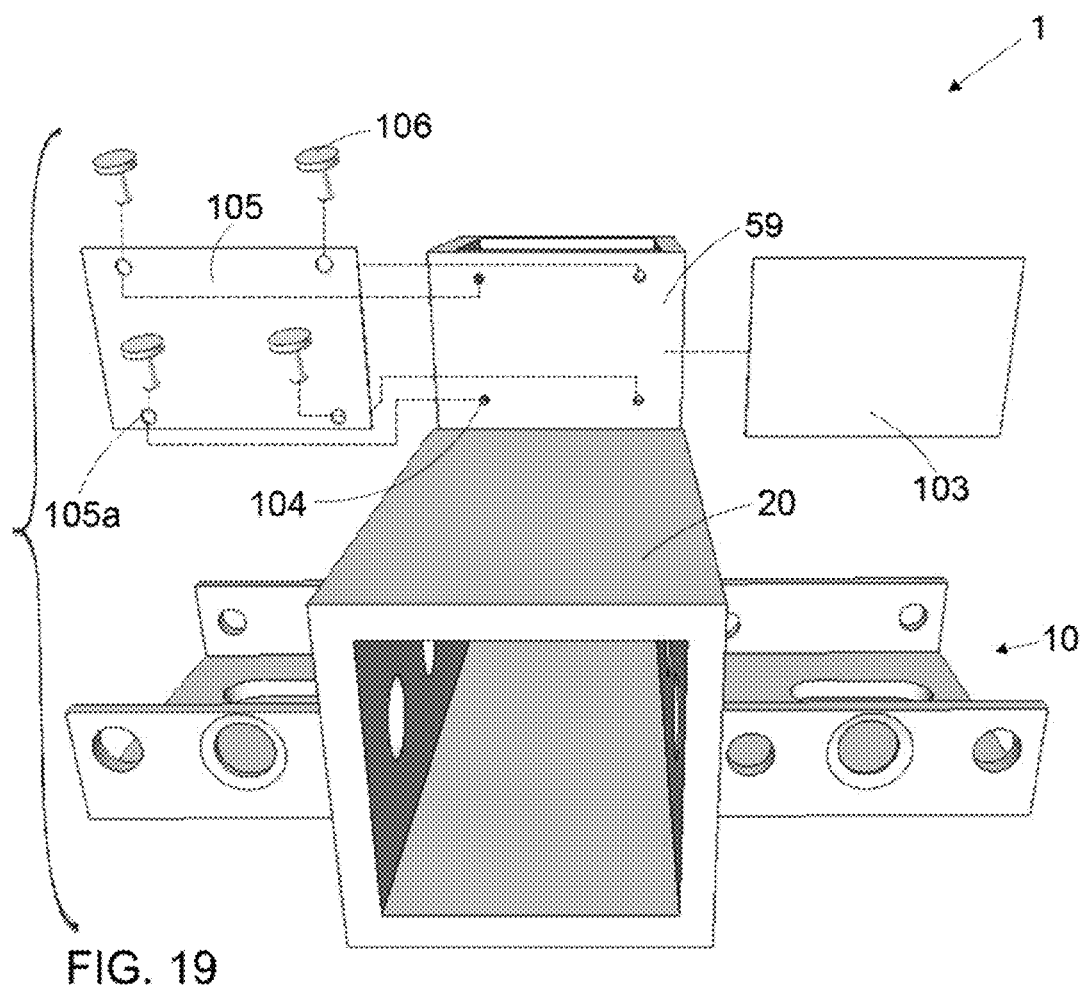
FIG. 19 is an exploded perspective view of the present invention showing a solid data plate attached such as by bonding to the elongated vertical box receiver, and also showing an alternative data plate with fastener apertures and being attached to corresponding fastener apertures in the elongated vertical box receiver using rivets.

Referring to FIG. 19, another aspect of the receiver assembly 1 comprises a data plate 103 being of a size and shape to be attached to a surface of the elongated vertical box receiver 59. Typically, the data plate 103 is attached by welding. Alternatively, the data plate 103 may be attached by but not limited to bonding, casting, injection molding, machining, or fasteners, for example. Typically, the data plate 103 is made of mild steel material. Alternatively, the data plate 103 can be made of any suitable metallic, composite, or plastic materials.

Referring to FIG. 19, another aspect of the receiver assembly 1 comprises a data plate 105 being of a size and shape to be attached to a surface of the elongated vertical box receiver 59. The data plate 105 has at least one fastener aperture 105a (with four fastener apertures 105a shown in the illustrated example) and there is at least one corresponding fastener aperture(s) 104 (with four fastener apertures 104 shown in the illustrated example) in the elongated vertical box receiver 59, with the aperture(s) 105a/104 being of a size and shape to place a fastener such as but not limited to a rivet 106 to attach the data plate 105 to the elongated vertical box receiver 59. The fastener aperture(s) 105a can be at any position in the data plate 105. The fastener aperture(s) 104 can be at any position in the elongated vertical box receiver 59. Typically, the fastener apertures are cut using a machine such as but not limited to a water jet cutting machine. Alternatively, the fastener apertures can be made by any suitable tool or method such as but not limited to casting, injection molding, drilling, machining, or plasma cutting, for example. Typically, the data plate 105 is attached by a fastener(s). Alternatively, the data plate 105 may be attached by but not limited to bonding or welding, or a combination of fastener(s) and bonding or welding, for example. Typically, the data plate 105 is made of mild steel material. Alternatively, the data plate 105 can be made of any suitable metallic, composite, or plastic materials.

The foregoing descriptions and accompanying drawings incorporated in and forming a part of the specification illustrate the preferred embodiment of the present invention and together with all descriptions of the Invention serve to explain certain principles of the invention, and have been presented for purposes of illustration and description. The descriptions and illustrations of the preferred embodiment of the invention are not intended to be a comprehensive representation of the invention or to limit the invention to the precise form disclosed and it is to be understood that the invention is capable of other different embodiments and is capable of design changes, modifications, and variations being made without departing from the spirit or scope of the invention. The invention is not limited to the exact details described or illustrated in the examples.

What is claimed is:
1. A receiver and anchor point assembly that attaches to a vehicle, said receiver and anchor point assembly comprising:
  a. a channel mounting base, said channel mounting base comprising;
    i. a horizontal channel structure, said horizontal channel structure comprising;
      a channel body; said channel body further comprising;
        aa. an acircular plate;
        bb. least one fastener mounting aperture in said channel body;

two parallel channel legs attached to said channel body, said parallel channel legs comprising;
aaa. a channel front leg;
bbb. a channel rear leg;
b. an elongated horizontal box receiver attached to at least one intermediate component located between said channel body of said horizontal channel structure and said elongated horizontal box receiver, and with said elongated horizontal box receiver being oriented perpendicular to said parallel channel legs of said horizontal channel structure, said elongated horizontal box receiver comprising;
a tubular shape;
an elongated center aperture;
at least one transverse aperture pair in at least one set of opposing sides;
c. an acircular horizontal aperture defined by the space between said channel body of said channel mounting base, said elongated horizontal box receiver, and the at least one intermediate component between said channel body and said elongated horizontal box receiver;
d. at least one cargo anchor point comprising at least one horizontal transverse aperture pair in said parallel channel legs of said channel mounting base with one aperture of said horizontal transverse aperture pair(s) being on said channel front leg and the second aperture of said horizontal transverse aperture pair(s) being on said channel rear leg.

2. The said receiver assembly set forth in claim 1, further comprising:
a. at least one of said fastener mounting aperture(s) in said channel body is an acircular shape.

3. The said receiver assembly set forth in claim 1, further comprising:
a. at least one of said fastener mounting aperture(s) in said channel body is a combination of at least two geometric shapes.

4. The said receiver assembly set forth in claim 1, further comprising:
a. at least one fastener aperture in at least one of said parallel channel legs of said channel mounting base.

5. The said receiver assembly set forth in claim 1, further comprising:
a. at least one tapered fastener aperture in at least one of said parallel channel legs of said channel mounting base, said tapered fastener aperture(s) comprising;
i. an aperture tapered along at least part of at least one opening of said aperture.

6. The said receiver assembly set forth in claim 1, further comprising:
a. at least one reinforcement member attached to at least one component of said horizontal channel structure.

7. The said receiver assembly set forth in claim 1, further comprising:
a. at least one reinforcement member attached to at least one component of said horizontal channel structure and being attached to at least one adjacent component of said receiver assembly.

8. The said receiver assembly set forth in claim 1, further comprising:
a. at least one attachment member affixed to at least one component of said horizontal channel structure.

9. The said receiver assembly set forth in claim 1, further comprising:
a. at least one attachment member affixed to at least one component of said horizontal channel structure and being attached to at least one adjacent component of said receiver assembly.

10. The receiver assembly set forth in claim 1, further comprising:
a. at least one cargo anchor point comprising at least one fastener attached through at least one aperture in at least one of said transverse aperture pair(s) in said parallel channel legs of said channel mounting base.

11. The said receiver assembly set forth in claim 1, further comprising:
a. at least one fastener aperture in at least one of said parallel channel legs of said channel mounting base;
b. at least one cargo anchor point comprising at least one manufactured bolt on type anchor component attached through at least one aperture in at least one of said parallel channel legs of said channel mounting base, with said cargo anchor point providing at least one attachment aperture.

12. The said receiver assembly set forth in claim 1, further comprising:
a. at least one cargo anchor point comprising at least one manufactured anchor component attached to at least one of said parallel channel legs of said channel mounting base, with said cargo anchor point providing at least one attachment aperture.

13. The said receiver assembly set forth in claim 1, further comprising:
a. at least one cargo anchor point comprising at least one fabricated anchor component attached to at least one of said parallel channel legs of said channel mounting base, with said cargo anchor point providing at least one attachment aperture.

14. The said receiver assembly set forth in claim 1, further comprising:
a. at least one cargo anchor point comprising at least one manufactured anchor component attached to at least one side of said elongated horizontal box receiver, with said cargo anchor point providing at least one attachment aperture.

15. The said receiver assembly set forth in claim 1, further comprising:
a. at least one cargo anchor point comprising at least one fabricated anchor component attached to at least one side of said elongated horizontal box receiver, with said cargo anchor point providing at least one attachment aperture.

16. The said receiver assembly set forth in claim 1, further comprising:
a. at least one vertical transverse aperture pair in said elongated horizontal box receiver with said vertical transverse aperture pair(s) being of a size and shape to allow an entire fastener to be passed vertically through said elongated horizontal box receiver.

17. The said receiver assembly set forth in claim 1, further comprising:
a. at least one notch beginning in the top surface of at least one of said parallel channel legs of said channel mounting base and extending down towards said channel body and being of a size and shape that said elongated horizontal box receiver is at least partially recessed within said notch(s).

18. The said receiver assembly set forth in claim 1, further comprising:
a. at least one vertical transverse aperture pair in said elongated horizontal box receiver with said vertical transverse aperture pair(s) being of a size and shape to allow an entire fastener to be passed vertically through said elongated horizontal box receiver;
b. at least one notch beginning in the top surface of at least one of said parallel channel legs of said channel mounting base and extending down towards said channel body and being of a size and shape that said elongated horizontal box receiver is at least partially recessed within said notch(s).

19. The said receiver assembly set forth in claim 1, further comprising:
a. an elongated vertical box receiver with one end shaped to be attached to at least one component of and perpendicular to said horizontal channel structure of said channel mounting base and one side of said elongated vertical box receiver attached perpendicular to one end of said elongated horizontal box receiver, said elongated vertical box receiver comprising;
   i. a tubular shape;
   ii. an elongated center aperture;
   iii. at least one transverse aperture pair in at least one set of opposing sides.

20. The said receiver assembly set forth in claim 19, further comprising:
a. at least one attachment member affixed to at least one surface of said elongated vertical box receiver.

21. The said receiver assembly set forth in claim 19, further comprising:
a. at least one attachment member affixed to at least one surface of said elongated vertical box receiver and being attached to at least one adjacent component of said receiver assembly.

22. The said receiver assembly set forth in claim 19, further comprising:
a. at least one reinforcement member attached to at least one surface of said elongated vertical box receiver and being attached to at least one adjacent component of said receiver assembly.

23. The said receiver assembly set forth in claim 19, further comprising:
a. at least one cargo anchor point comprising at least one manufactured anchor component attached to at least one side of said elongated vertical box receiver, with said cargo anchor point providing at least one attachment aperture.

24. The said receiver assembly set forth in claim 19, further comprising:
a. at least one cargo anchor point comprising at least one fabricated anchor component attached to at least one side of said elongated vertical box receiver, with said cargo anchor point providing at least one attachment aperture.

25. The said receiver assembly set forth in claim 1, further comprising:
a. at least one vertical anchor channel attached to at least one of said parallel channel legs of said channel mounting base, said vertical anchor channel comprising;
   i. a channel structure, said channel structure comprising;
      a channel body, said channel body further comprising;
         a. an acircular plate;
         b. a plurality of fastener apertures in said channel body;
      two parallel channel legs, said parallel channel legs comprising;
         aa. a channel top leg;
         bb. a channel bottom leg;
         cc. a plurality of transverse aperture pairs in said parallel channel legs with one aperture of said transverse aperture pair being on said channel top leg and the second aperture of said transverse aperture pair being on said channel bottom leg;
   the said channel body of a said vertical anchor channel is attached perpendicular to a vertical surface of at least one of said parallel channel legs of said channel mounting base with the said channel top leg and said channel bottom leg of said vertical anchor channel being parallel to said parallel channel legs of said channel mounting base.

26. The said receiver assembly set forth in claim 25, further comprising:
a. a plurality of fastener apertures in said channel top leg of at least one of said vertical anchor channel(s);
b. a plurality of brace members attached between the said channel top legs of a plurality of said vertical anchor channels, said brace members further comprising;
   i. at least one fastener aperture in each end of said brace members.

27. The said receiver assembly set forth in claim 25, further comprising:
a. a plurality of brace members attached to a plurality of said vertical anchor channels.

28. The said receiver assembly set forth in claim 25, further comprising:
a. at least one notch beginning in the top horizontal surface of said channel top leg of at least one of said vertical anchor channel(s) and extending down into said channel body of said vertical anchor channel towards said channel bottom leg of said vertical anchor channel with said notch(s) being of a size and shape that said elongated horizontal box receiver of said receiver assembly is at least partially recessed within said notch(s);
b. the said vertical anchor channel(s) is attached to at least one adjacent component of said receiver assembly.

29. The said receiver assembly set forth in claim 25, further comprising:
a. at least one notch beginning in the top surface of at least one of said parallel channel legs of said channel mounting base and extending down towards said channel body and being of a size and shape that said elongated horizontal box receiver is at least partially recessed within said notch(s);
b. at least one notch beginning in the top horizontal surface of said channel top leg of at least one of said vertical anchor channel(s) and extending down into said channel body of said vertical anchor channel towards said channel bottom leg of said vertical anchor channel with said notch(s) being of a size and shape that said elongated horizontal box receiver of said receiver assembly is at least partially recessed within said notch(s);
c. the said vertical anchor channel(s) is attached to at least one adjacent component of said receiver assembly.

30. The said receiver assembly set forth in claim 25, further comprising:
a. at least one attachment member affixed to at least one component of said vertical anchor channel.

31. The said receiver assembly set forth in claim 25, further comprising;
a. at least one attachment member affixed to at least one component of said vertical anchor channel and being attached to at least one adjacent component of said receiver assembly.

32. The said receiver assembly set forth in claim 25, further comprising:
   a. at least one reinforcement member attached to at least one component of said vertical anchor channel.

33. The said receiver assembly set forth in claim 25, further comprising:
   a. at least one reinforcement member attached to at least one component of said vertical anchor channel and being attached to at least one adjacent component of said receiver assembly.

34. The said receiver assembly set forth in claim 25, further comprising:
   a. a plurality of fastener apertures in said channel top leg of said vertical anchor channel;
   b. a plurality of fastener apertures in at least one of said parallel channel legs of said channel mounting base;
   c. a plurality of brace members of a size and shape to connect at least one of said parallel channel legs of said channel mounting base to said channel top leg of said vertical anchor channel, said brace members comprising;
      i. being attached to a substantially vertical surface of at least one side of at least one of said parallel channel legs of said channel mounting base, angling from the vertical plane at an angle less than 355 degrees to extend to the top edge of the channel top leg of said vertical anchor channel, and angling to extend along and being attached to the top horizontal surface of said channel top leg of said vertical anchor channel;
      ii. at least one fastener aperture in each end of said brace members to align with at least one of said fastener apertures in said parallel channel leg of said channel mounting base and said channel top leg of said vertical anchor channel.

35. The said receiver assembly set forth in claim 25, further comprising:
   a. a plurality of brace members attached to at least one component of said vertical anchor channel and extending outwardly from the vertical plane at an angle less than 180 degrees and attached to at least one component of said horizontal channel structure.

36. The said receiver assembly set forth in claim 25, further comprising:
   a. the said vertical anchor channel(s) is attached to at least one adjacent component of said receiver assembly.

37. The said receiver assembly set forth in claim 1, further comprising:
   a. at least one pivoting bolt sleeve anchor being of a size and shape that at least one can be placed between a said transverse aperture pair of said parallel channel legs of said channel mounting base and attached by a fastener inserted through both apertures of said transverse aperture pair and through said pivoting bolt sleeve anchor(s), said pivoting bolt sleeve anchor(s) comprising;
      i. a cylindrical bolt sleeve with a cylindrical aperture;
      ii. an attachment member with at least one fastener aperture and being affixed to the outer surface of said cylindrical bolt sleeve.

38. The said receiver assembly set forth in claim 25, further comprising:
   a. at least one pivoting bolt sleeve anchor being of a size and shape that at least one can be placed between a said transverse aperture pair of said parallel channel legs of said vertical anchor channel and attached by a fastener inserted through both apertures of said transverse aperture pair and through said pivoting bolt sleeve anchor(s), said pivoting bolt sleeve anchor(s) comprising;
      i. a cylindrical bolt sleeve with a cylindrical aperture;
      ii. an attachment member with at least one fastener aperture and being affixed to the outer surface of said cylindrical bolt sleeve.

39. The said receiver assembly set forth in claim 1, further comprising:
   a. at least one component of said channel mounting base is at least partially shaped with at least one of curves and oblique angles.

40. The said receiver assembly set forth in claim 25, further comprising:
   a. at least one component of said vertical anchor channel is at least partially shaped with at least one of curves and oblique angles.

41. The said receiver assembly set forth in claim 1, further comprising:
   a. a data plate comprising a flat plate attached to at least one side of said elongated horizontal box receiver.

42. The said receiver assembly set forth in claim 1, further comprising:
   a. at least one fastener aperture in at least one surface of said elongated horizontal box receiver;
   b. a data plate attached to at least one side of said elongated horizontal box receiver, said data plate comprising a flat plate with at least one fastener aperture.

43. The said receiver assembly set forth in claim 19, further comprising:
   a. a data plate comprising a flat plate attached to at least one side of said elongated vertical box receiver.

44. The said receiver assembly set forth in claim 19, further comprising:
   a. at least one fastener aperture in at least one side of said elongated vertical box receiver;
   b. a data plate attached to at least one side of said elongated vertical box receiver, said data plate comprising a flat plate with at least one fastener aperture.

* * * * *